US012614069B2

(12) United States Patent
Choi et al.

(10) Patent No.: US 12,614,069 B2
(45) Date of Patent: Apr. 28, 2026

(54) METHOD OF OPTIMIZING NEURAL NETWORK MODEL THAT IS PRE-TRAINED, METHOD OF PROVIDING A GRAPHICAL USER INTERFACE RELATED TO OPTIMIZING NEURAL NETWORK MODEL, AND NEURAL NETWORK MODEL PROCESSING SYSTEM PERFORMING THE SAME

(71) Applicant: SAMSUNG ELECTRONICS CO., LTD., Suwon-si (KR)

(72) Inventors: Jungmin Choi, Suwon-si (KR); Kyoungyoung Kim, Suwon-si (KR); Byeoungsu Kim, Suwon-si (KR); Jaegon Kim, Suwon-si (KR); Changgwun Lee, Suwon-si (KR); Hanyoung Yim, Suwon-si (KR); Sanghyuck Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 729 days.

(21) Appl. No.: 17/672,204

(22) Filed: Feb. 15, 2022

(65) Prior Publication Data

US 2022/0335293 A1 Oct. 20, 2022

(30) Foreign Application Priority Data

Apr. 19, 2021 (KR) ........................ 10-2021-0050659
Jun. 28, 2021 (KR) ........................ 10-2021-0083716

(51) Int. Cl.
*G06N 3/08* (2023.01)

(52) U.S. Cl.
CPC ..................................... *G06N 3/08* (2013.01)

(58) Field of Classification Search
CPC .......... G06N 3/08; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS 7,966,246 B2 6/2011 Ingargiola et al.
8,699,566 B2 4/2014 Ananthanarayanan et al.
(Continued)

FOREIGN PATENT DOCUMENTS

CN 112148276 A * 12/2020 ........... G06F 3/0486
JP 4-190461 A 7/1992
(Continued)

OTHER PUBLICATIONS

Communication dated Oct. 11, 2022 issued by the European Patent Office in European Patent Application No. 22167840.2.
(Continued)

*Primary Examiner* — Mariela Reyes
*Assistant Examiner* — Alexandria Josephine Miller
(74) *Attorney, Agent, or Firm* — Sughrue Mion, PLLC

(57) ABSTRACT

A method of optimizing a neural network model includes receiving original model information about a first neural network model that is pre-trained; generating a second neural network model and compressed model information about the second neural network model by performing a compression on the first neural network model; and outputting, on a screen, at least a part of the original model information and at least a part of the compressed model information.

19 Claims, 41 Drawing Sheets

(56)                References Cited

U.S. PATENT DOCUMENTS

| | | | |
|---|---|---|---|
| 10,083,347 | B2 | 9/2018 | Kuharenko et al. |
| 10,192,001 | B2 | 1/2019 | Leeman-Munk et al. |
| 10,489,126 | B2 | 11/2019 | Kumar et al. |
| 11,657,284 | B2 | 5/2023 | Kim et al. |
| 11,704,570 | B2 | 7/2023 | Tantzawa et al. |
| 2016/0328647 | A1* | 11/2016 | Lin ......................... G06N 3/08 |
| 2018/0095632 | A1* | 4/2018 | Leeman-Munk ... G06F 3/04812 |
| 2019/0228294 | A1 | 7/2019 | Hwang |
| 2020/0097847 | A1 | 3/2020 | Convertino et al. |
| 2021/0012209 | A1* | 1/2021 | Sikka .................... G06N 3/084 |
| 2021/0055915 | A1 | 2/2021 | Guo et al. |
| 2021/0264278 | A1* | 8/2021 | Liu ........................ G06N 3/082 |

FOREIGN PATENT DOCUMENTS

| | | |
|---|---|---|
| JP | 2021-39640 A | 3/2021 |
| KR | 10-2193469 B1 | 12/2020 |
| KR | 10-2212966 B1 | 2/2021 |
| WO | 2017/141517 A1 | 8/2017 |
| WO | 2020/231049 A1 | 11/2020 |
| WO | 2021/014986 A1 | 1/2021 |

OTHER PUBLICATIONS

Nayak et al., "Bit Efficient Quantization for Deep Neural Networks", 2019 Fifth Workshop on Energy Efficient Machine Learning and Cognitive Computing—NeurIPS Edition (EMC2-NIPS), IEEE, Dec. 13, 2019, XP033935236, DOI: 10.1109/EMC2-NIPS53020. 2019.00020, (5 pages total).

O'Neill, "An Overview of Neural Network Compression", arxiv. org, Cornell University Library, XP081692374, arXiv:2006. 03669v1 [cs.LG] Jun. 5, 2020, (53 total pages).

Search Report issued on Sep. 15, 2025 by the Singapore Patent Office in corresponding SG Patent Application No. 10202203275P.

Written Opinion issued on Sep. 17, 2025 by the Singapore Patent Office in corresponding SG Patent Application No. 10202203275P.

Office Action dated Nov. 11, 2025, issued by Japanese Patent Office in Japanese Patent Application No. 2022-055088.

* cited by examiner

1000

2000

FIG. 5A
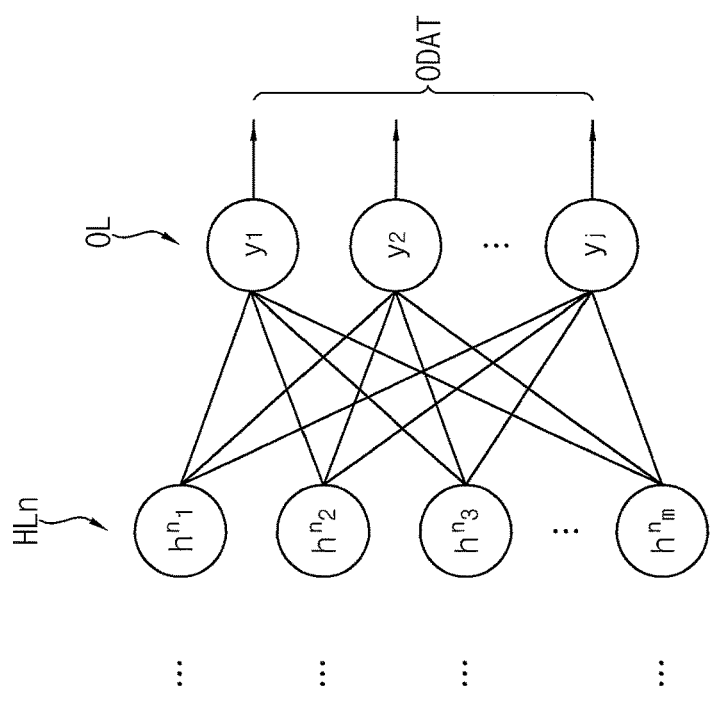
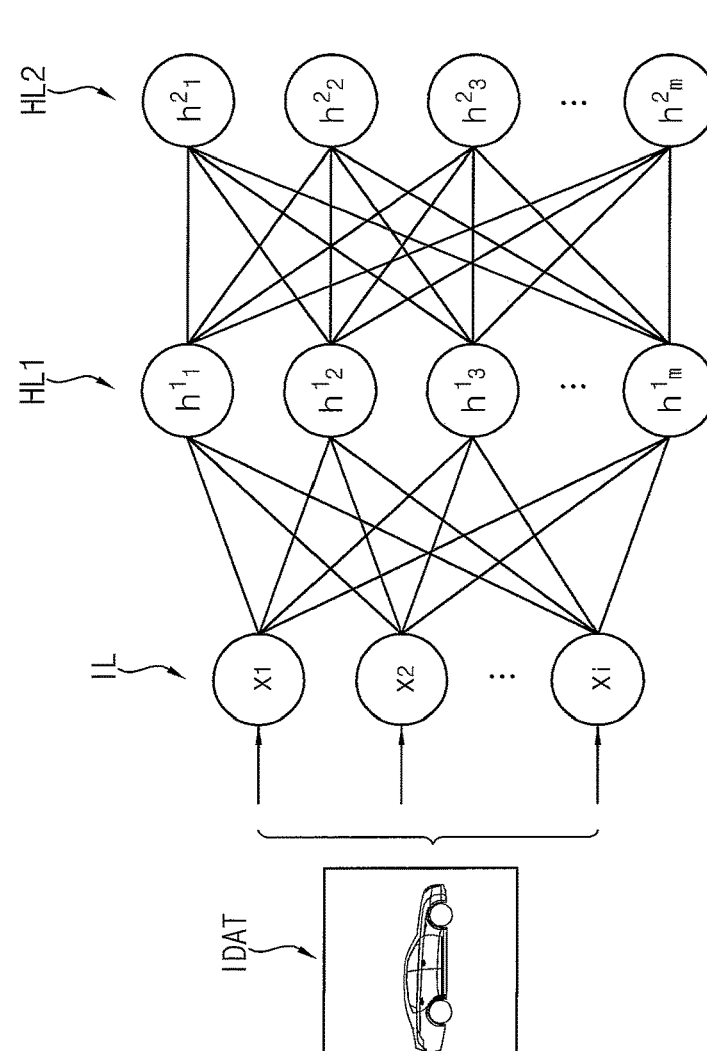

F I G. 5B
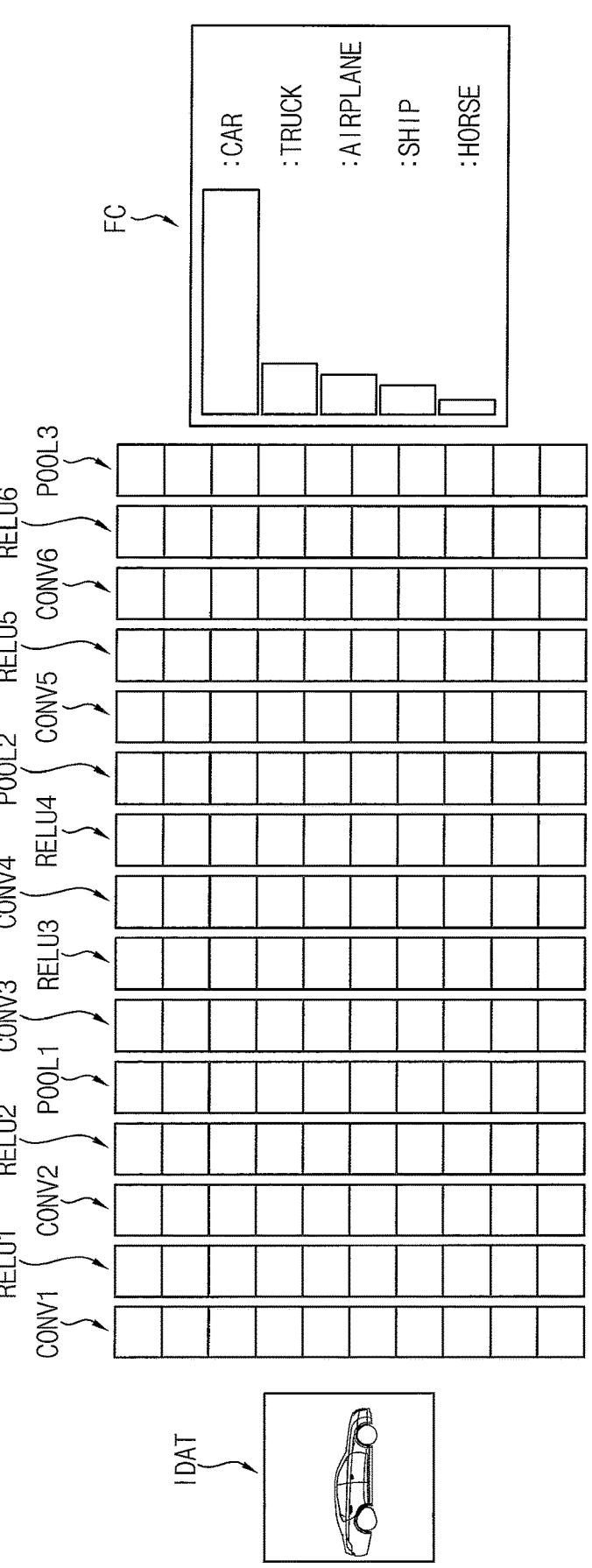

FIG. 7

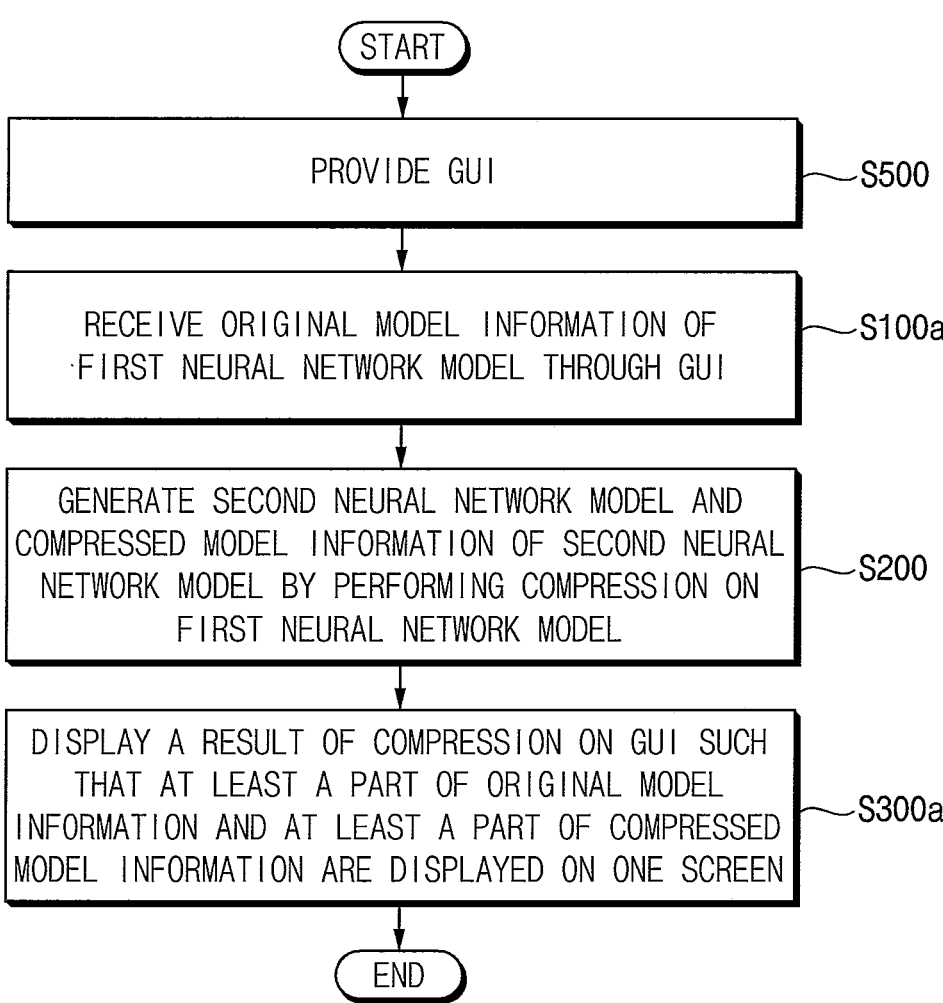

START

PROVIDE GUI — S500

RECEIVE ORIGINAL MODEL INFORMATION OF FIRST NEURAL NETWORK MODEL THROUGH GUI — S100a

GENERATE SECOND NEURAL NETWORK MODEL AND COMPRESSED MODEL INFORMATION OF SECOND NEURAL NETWORK MODEL BY PERFORMING COMPRESSION ON FIRST NEURAL NETWORK MODEL — S200

DISPLAY A RESULT OF COMPRESSION ON GUI SUCH THAT AT LEAST A PART OF ORIGINAL MODEL INFORMATION AND AT LEAST A PART OF COMPRESSED MODEL INFORMATION ARE DISPLAYED ON ONE SCREEN — S300a

END

FIG. 8

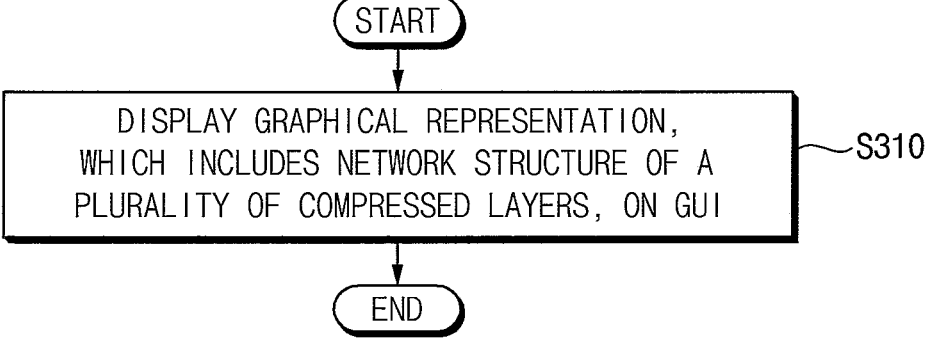

START

DISPLAY GRAPHICAL REPRESENTATION, WHICH INCLUDES NETWORK STRUCTURE OF A PLURALITY OF COMPRESSED LAYERS, ON GUI — S310

END

FIG. 11B  GR22
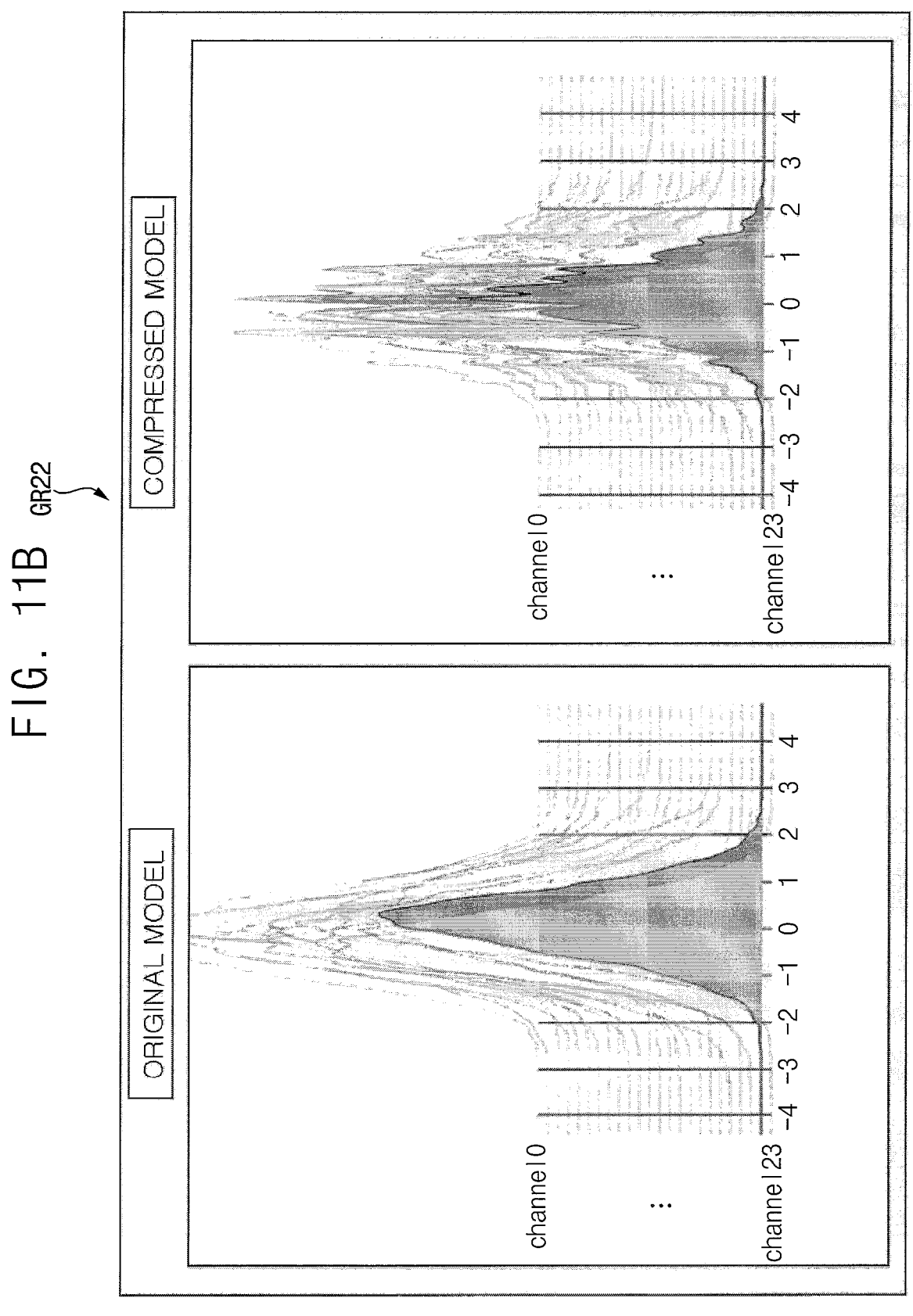

FIG. 11C GR23
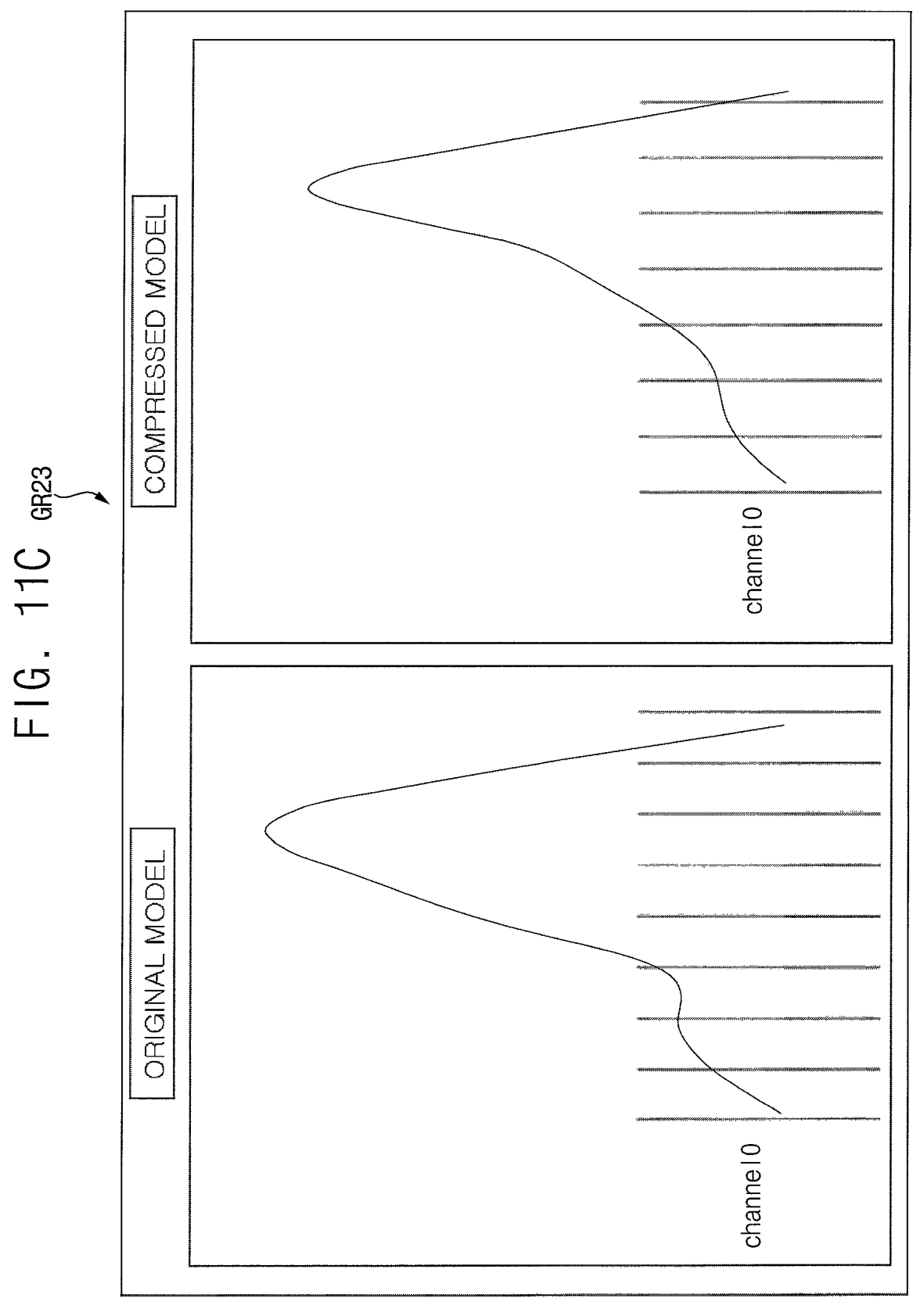

FIG. 13

GRC1

INPUT

LAYER21

LAYER22

LAYER23

LAYER24

LAYER25

LAYER26

OUTPUT

LAYER GROUPING

PERF

FUNC

INPUT

LAYER_GROUP11

LAYER_GROUP12

LAYER26

OUTPUT

LAYER
GROUPING

PERF

SQNR

LTC

PWR

UTIL

FUNC

Figure 15C:
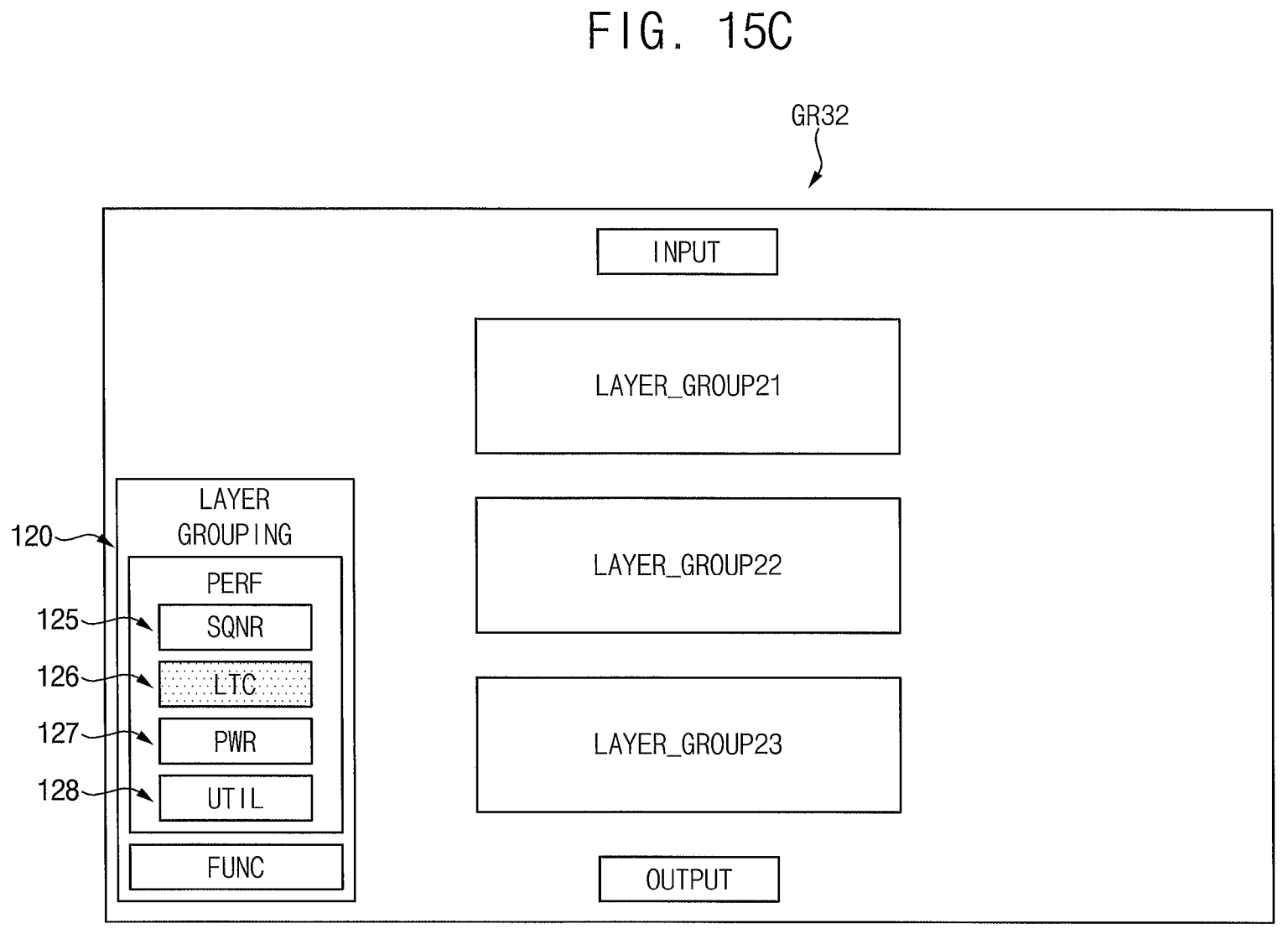

INPUT

LAYER_GROUP21

LAYER_GROUP22

LAYER_GROUP23

OUTPUT

LAYER GROUPING

PERF

SQNR

LTC

PWR

UTIL

FUNC

INPUT

LAYER_GROUP31

LAYER_GROUP32

OUTPUT

LAYER
GROUPING

120

PERF

SQNR 125

LTC 126

PWR 127

UTIL 128

FUNC

INPUT

LAYER21

LAYER22

LAYER_GROUP12

LAYER26

OUTPUT

LAYER
GROUPING

PERF

SQNR

LTC

PWR

UTIL

FUNC

INPUT

LAYER31

LAYER32

LAYER33

LAYER34

LAYER35

LAYER36

OUTPUT

TARGET DEVICE

NPU

GPU

DSP

INPUT

LAYER31

LAYER32

LAYER33

LAYER34

LAYER35

LAYER36

OUTPUT

TARGET DEVICE

NPU

GPU

DSP

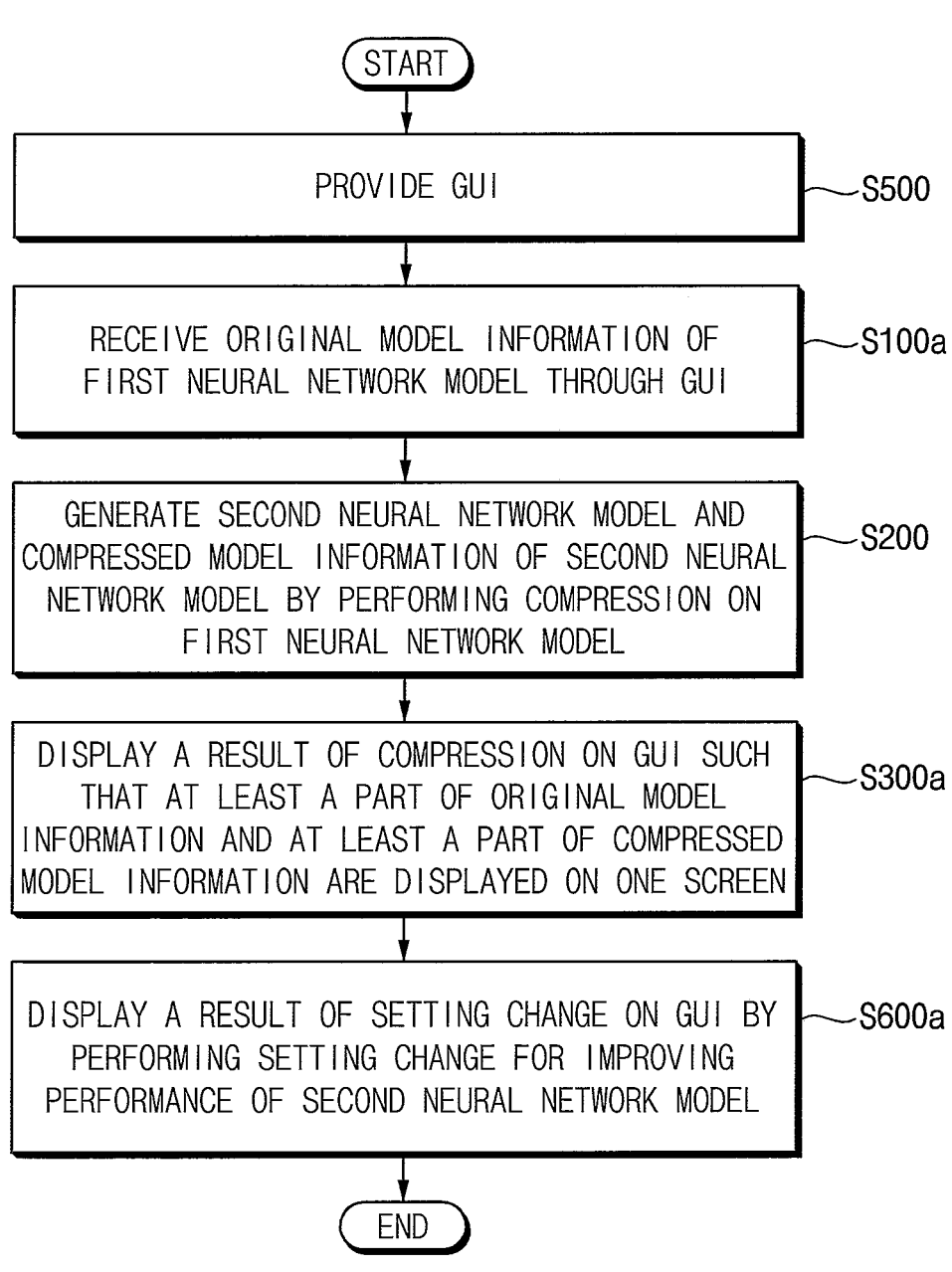

START

PROVIDE GUI ——S500

RECEIVE ORIGINAL MODEL INFORMATION OF FIRST NEURAL NETWORK MODEL THROUGH GUI ——S100a

GENERATE SECOND NEURAL NETWORK MODEL AND COMPRESSED MODEL INFORMATION OF SECOND NEURAL NETWORK MODEL BY PERFORMING COMPRESSION ON FIRST NEURAL NETWORK MODEL ——S200

DISPLAY A RESULT OF COMPRESSION ON GUI SUCH THAT AT LEAST A PART OF ORIGINAL MODEL INFORMATION AND AT LEAST A PART OF COMPRESSED MODEL INFORMATION ARE DISPLAYED ON ONE SCREEN ——S300a

DISPLAY A RESULT OF SETTING CHANGE ON GUI BY PERFORMING SETTING CHANGE FOR IMPROVING PERFORMANCE OF SECOND NEURAL NETWORK MODEL ——S600a

END

FIG. 24

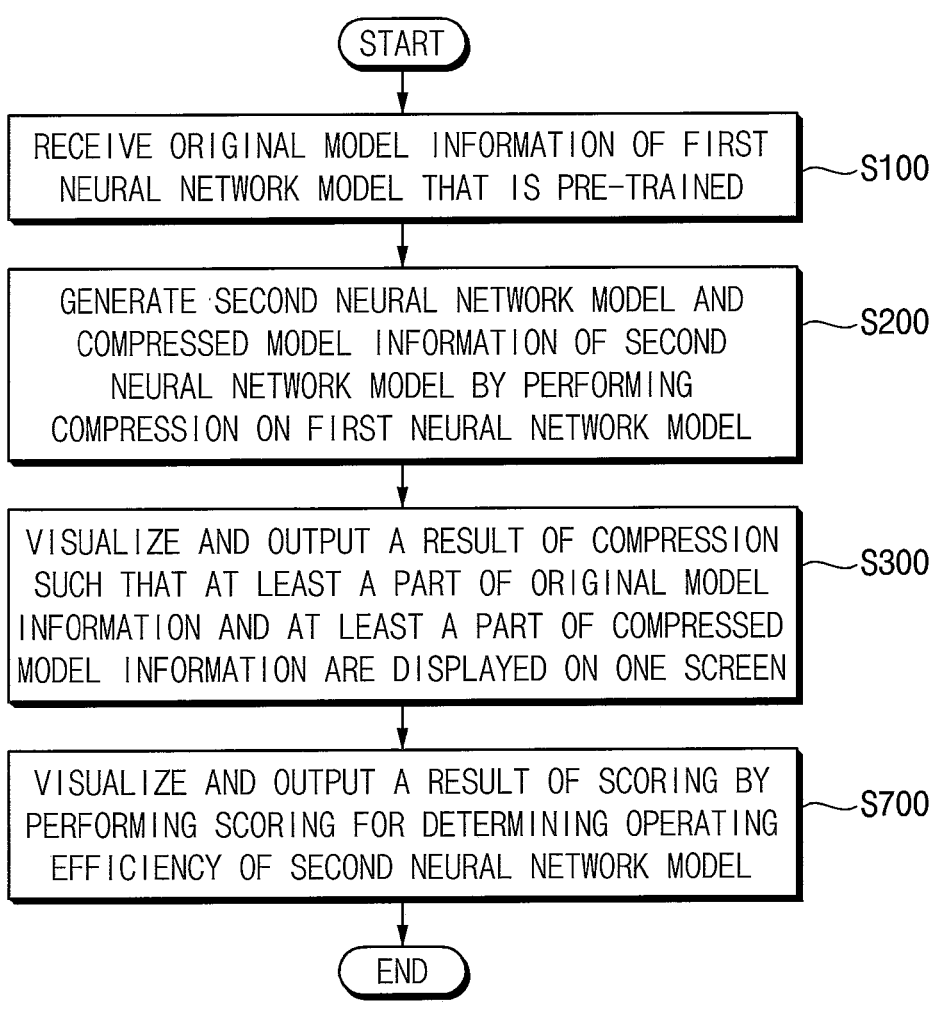

START

RECEIVE ORIGINAL MODEL INFORMATION OF FIRST NEURAL NETWORK MODEL THAT IS PRE-TRAINED ～S100

GENERATE SECOND NEURAL NETWORK MODEL AND COMPRESSED MODEL INFORMATION OF SECOND NEURAL NETWORK MODEL BY PERFORMING COMPRESSION ON FIRST NEURAL NETWORK MODEL ～S200

VISUALIZE AND OUTPUT A RESULT OF COMPRESSION SUCH THAT AT LEAST A PART OF ORIGINAL MODEL INFORMATION AND AT LEAST A PART OF COMPRESSED MODEL INFORMATION ARE DISPLAYED ON ONE SCREEN ～S300

VISUALIZE AND OUTPUT A RESULT OF SCORING BY PERFORMING SCORING FOR DETERMINING OPERATING EFFICIENCY OF SECOND NEURAL NETWORK MODEL ～S700

END

INPUT

LAYER51

LAYER52

LAYER53

LAYER54

LAYER55

LAYER56

OUTPUT

INPUT

LAYER51    (SV51)

LAYER52    (SV52)

LAYER53    (SV53)

LAYER54    (SV54)

LAYER55    (SV55)

LAYER56    (SV56)

OUTPUT

INPUT

LAYER51

LAYER52

LAYER53

LAYER54

LAYER55

LAYER56

OUTPUT

150

152

154

LAYER CHANGE

LAYER61

LAYER62

INPUT

LAYER51    (SV51)

LAYER52    (SV52)

LAYER53    (SV53)

LAYER54    (SV54)

LAYER55    (SV55)

LAYER61    (SV61)

OUTPUT

METHOD OF OPTIMIZING NEURAL NETWORK MODEL THAT IS PRE-TRAINED, METHOD OF PROVIDING A GRAPHICAL USER INTERFACE RELATED TO OPTIMIZING NEURAL NETWORK MODEL, AND NEURAL NETWORK MODEL PROCESSING SYSTEM PERFORMING THE SAME

CROSS-REFERENCE TO THE RELATED APPLICATION(S)

This application claims priority under 35 USC § 119 to Korean Patent Application No. 10-2021-0050659 filed on Apr. 19, 2021 and to Korean Patent Application No. 10-2021-0083716 filed on Jun. 28, 2021 in the Korean Intellectual Property Office (KIPO), the contents of which are herein incorporated by reference in their entireties.

BACKGROUND

1. Field

Example embodiments relate generally to machine learning techniques, and more particularly to methods of optimizing neural network models, and neural network model processing systems performing the methods of optimizing the neural network models.

2. Description of the Related Art

There are various methods of classifying data based on machine learning. Among them, a method of classifying data using a neural network or an artificial neural network (ANN) is one example. The ANN is obtained by engineering a cell structure model of a human brain that performs a process of efficiently recognizing a pattern. The ANN refers to a calculation model that is based on software or hardware and is designed to imitate biological calculation abilities by applying many artificial neurons interconnected through connection lines. The human brain consists of neurons that are basic units of a nerve, and encrypts or decrypts information according to different types of dense connections between these neurons. Artificial neurons in the ANN are obtained through simplification of biological neuron functionality. The ANN performs a cognition or learning process by interconnecting the artificial neurons having connection intensities.

Recently, deep learning processes and services have been researched to overcome limitation of the ANN, and researches are conducting various research projects of analyzing, optimizing, and improving neural network models as the deep learning processes and services have been developed. For example, there are various attempts to provide interfaces to improve accuracy or shorten execution time by providing model information to users.

SUMMARY

At least one example embodiment of the disclosure provides a method of efficiently optimizing a neural network model that is pre-trained or in which a training has been completed.

At least one example embodiment of the disclosure provides a neural network model processing system that performs the method of optimizing the neural network model that is pre-trained or in which a training has been completed.

At least one example embodiment of the disclosure provides a method of providing a graphical user interface (GUI) associated with a neural network model and an electronic system that performs the method of providing the GUI.

According to aspects of example embodiments, provided is a method of optimizing a neural network model, the method including: receiving original model information about a first neural network model that is pre-trained; generating a second neural network model and compressed model information about the second neural network model by performing a compression on the first neural network model; and outputting, on a screen, at least a part of the original model information and at least a part of the compressed model information.

According to aspects of example embodiments, there is provided a computer-based neural network model processing system including: an input device configured to receive original model information about a first neural network model that is pre-trained; a storage device configured to store program code; a processor configured to execute the program code to generate a second neural network model and compressed model information about the second neural network model by performing a compression on the first neural network model; and an output device configured to, under a control of the processor, output, on a screen, at least a part of the original model information and at least a part of the compressed model information.

According to aspects of example embodiments, there is provided a method of optimizing a neural network model, the method including: receiving original model information about a first neural network model that is pre-trained and includes a plurality of original layers; generating a second neural network model and compressed model information about the second neural network model by performing a compression on the first neural network model, the second neural network model including a plurality of compressed layers; displaying a first graphical representation on a graphical user interface (GUI), the first graphical representation including a network structure of the plurality of compressed layers; receiving, through the GUI, a first user input with respect to a first compressed layer among the plurality of compressed layers; displaying a second graphical representation on the GUI based on the first user input, the second graphical representation including a comparison of a characteristic of a first original layer among the plurality of original layers and a characteristic of the first compressed layer, the first original layer corresponding to the first compressed layer; receiving, through the GUI, a second user input for changing a setting of a second compressed layer among the plurality of compressed layers; updating a characteristic of the second compressed layer based on the second user input; displaying a third graphical representation on the GUI based on the second user input, the third graphical representation including a comparison of a characteristic of a second original layer among the plurality of original layers and the updated characteristic of the second compressed layer, the second original layer corresponding to the second compressed layer; generating a plurality of score values for the plurality of compressed layers; displaying a fourth graphical representation on the GUI, the fourth graphical representation including the plurality of compressed layers that are displayed according to different schemes based on the plurality of score values; and displaying a fifth graphical representation on the GUI, the fifth graphical representation including the plurality of compressed layers at least one of which is changeable based on the plurality of score values.

According to aspects of example embodiments, there is provided a method of providing a graphical user interface (GUI) related to optimizing a neural network model, the method including: receiving first model information about a first neural network model that is pre-trained; generating a second neural network model and second model information about the second neural network model by performing a data processing on the first neural network model; and providing a graphical user interface (GUI), which displays a graphical representation including at least a part of the first model information and at least a part of the second model information in comparison with each other.

According to aspects of example embodiments, there is provided a computer-based electronic system including: an input device configured to receive first model information about a first neural network model that is pre-trained; a storage device configured to store program code; a processor configured to execute the program code to generate a second neural network model and second model information about the second neural network model by performing a data processing on the first neural network model; and an output device configured to, under a control of the processor, provide a graphical user interface (GUI), which display a graphical representation including at least a part of the first model information and at least a part of the second model information in comparison with each other.

BRIEF DESCRIPTION OF THE DRAWINGS

Illustrative, non-limiting example embodiments will be more clearly understood from the following detailed description taken in conjunction with the accompanying drawings.

FIGS. 5A, 5B, 5C and 6 are diagrams for describing examples of a neural network model that is a target of a method of optimizing a neural network model according to example embodiments.

FIG. 7 is a flowchart illustrating an example of a method of optimizing a neural network model of FIG. 1.

FIG. 8 is a flowchart illustrating an example of displaying a result of a compression in FIG. 7.

FIGS. 11A, 11B and 11C are diagrams for describing examples of an operation of FIG. 10.

FIG. 13 is a diagram for describing an example of an operation of FIG. 12.

FIGS. 15A, 15B, 15C and 15D are diagrams for describing examples of an operation of FIG. 14.

FIG. 17 is a diagram for describing an example of an operation of FIG. 16.

FIGS. 19A, 19B and 19C are diagrams for describing examples of an operation of FIG. 18.

FIG. 21 is a flowchart illustrating an example of a method of optimizing a neural network model of FIG. 20.

FIG. 24 is a flowchart illustrating a method of optimizing a neural network model according to example embodiments.

FIGS. 27A and 27B are diagrams for describing examples of an operation of FIG. 26.

FIGS. 29A and 29B are diagrams for describing examples of an operation of FIG. 28.

DETAILED DESCRIPTION

Figure 1:
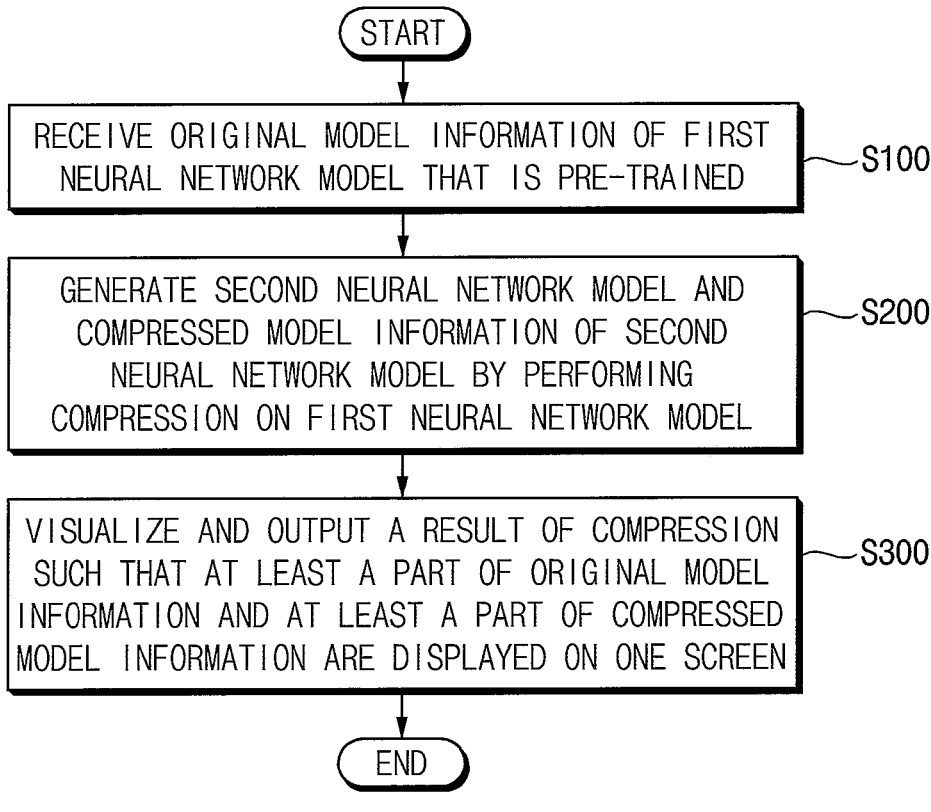
FIG. 1 is a flowchart illustrating a method of optimizing a neural network model according to example embodiments.

Various example embodiments will be described more fully with reference to the accompanying drawings, in which embodiments are shown. The disclosure may, however, be embodied in many different forms and should not be construed as limited to the embodiments set forth herein. Like reference numerals refer to like elements throughout this application.

FIG. 1 is a flowchart illustrating a method of optimizing a neural network model according to example embodiments.

Referring to FIG. 1, a method of optimizing a neural network model according to example embodiments is performed and/or executed by a computer-based neural network model processing system in which at least some of components are implemented with hardware and/or software. A detailed configuration of the neural network model processing system will be described with reference to FIGS. 2, 3 and 4. Detailed configurations of the neural network model and a neural network system executing the neural network model will be described with reference to FIGS. 5A, 5B, 5C and 6.

In the method of optimizing the neural network model according to example embodiments, original model information (or first model information) of a first neural network model is received (step S100). The first neural network model is a neural network model that is pre-trained or in which a training has been completed, and may be referred to as an original neural network model. A second neural network model and compressed model information (or second model information) of the second neural network model are generated by performing a compression on the first neural network model (step S200). The second neural network model is generated by modifying at least a part of the first neural network model, and may be referred to as a compressed neural network model. However, example embodiments are not limited thereto, and the second neural network model and the second model information may be generated by performing at least one of various data processings including the compression on the first neural network model.

A training (or training operation) on a neural network model indicates a process of solving a task in an optimized manner when the task to be solved and a set of functions for the task are given, and indicates a process for improving or enhancing the performance and/or accuracy of the neural network model. For example, the training on the neural network model may include an operation of determining a network structure of the neural network model, an operation of determining parameters, such as weights, used in the neural network model, or the like. In addition, during the training on the neural network model, parameters other than an architecture and data type may be changed while the architecture and data type are maintained.

In contrast, a compression (or compressing operation) on a neural network model indicates a process for reducing the size and amount of computation of the neural network model while the performance and/or accuracy of the neural network model that is pre-trained are maintained as much as possible. To improve the performance and/or accuracy of the neural network model, the number of layers and parameters in the neural network model may increase, the size and amount of computation of the neural network model may increase, and there may be limitations to apply or employ the neural network model on environments where computation, memory and power are limited, such as mobile and embedded systems. Thus, to solve such limitations and reduce the complexity of the neural network model, the compression may be performed on the neural network model that is pre-trained. During the compression on the neural network model, all parameters including the architecture and data type may be changed.

In some example embodiments, a compression technique for a neural network model may include quantization, pruning, matrix decomposition, or the like. A quantization may indicate a technique for reducing a size in which a neural network model is actually stored by decreasing weights, which are generally expressed in floating points, to the specific number of bits. A pruning may indicate a technique for reducing a size of a neural network model by disconnecting a connection between a node and a weight, which is determined to be relatively unnecessary among trained weights due to its low importance to the performance of the neural network model. A matrix decomposition may indicate a technique for reducing the number of weights and the amount of computation by decomposing one weight matrix of each layer of two or more dimensions into two or more matrices. For example, the matrix decomposition may include a low-rank approximation that decomposes a two-dimensional matrix into two matrices using singular value decomposition (SVD), a canonical polyadic (CP) decomposition that decomposes a three-dimensional or higher matrix into a linear combination of multiple rank-1 tensors, or the like.

A result of the compression is visualized and output such that at least a part of the original model information and at least a part of the compressed model information are displayed on one screen (step S300). For example, step S300 may be performed using a graphical user interface (GUI). For example, a graphical representation, which includes a comparison of at least a part of the first model information and at least a part of the second model information, may be displayed on the GUI. The GUI will be described with reference to FIGS. 9A, 9B, 11A, 11B, 11C, 13, 15A, 15B, 15C, 15D, 17, 19A, 19B, 19C, 23A, 23B, 23C, 27A, 27B, 29A and 29B.

In the method of optimizing the neural network model according to example embodiments, the neural network model may be optimized by performing the compression on the neural network model that is pre-trained, rather than by performing the training on the neural network model. In addition, the result of the compression may be visually displayed, characteristics before and after the compression may be compared and displayed on one screen, and the GUI for such displays may be provided. Accordingly, various data for optimizing the neural network model may be provided, information in granular units may be visually provided, and a user may perform fine adjustments or tunings to the neural network model that is pre-trained.

Figure 2:
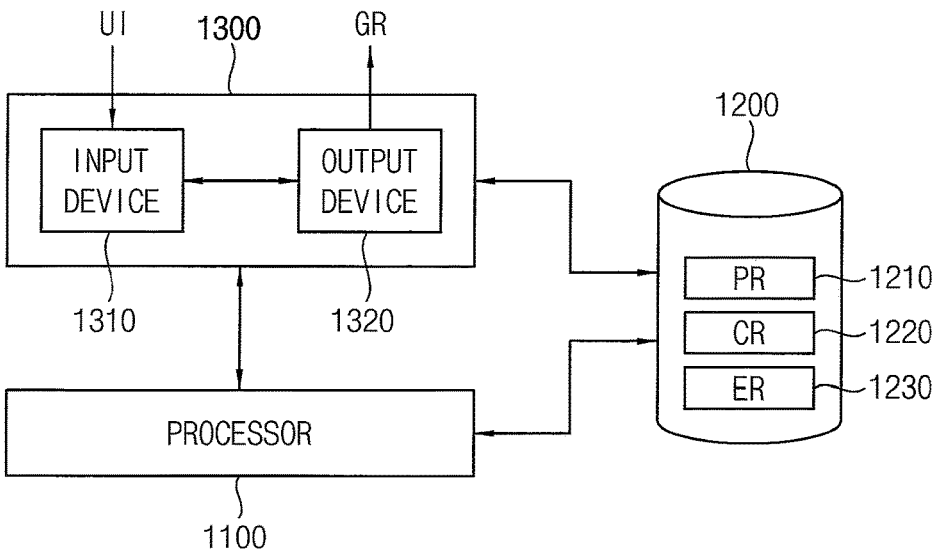
FIGS. 2, 3 and 4 are block diagrams illustrating a neural network model processing system according to example embodiments.
Figure 3:
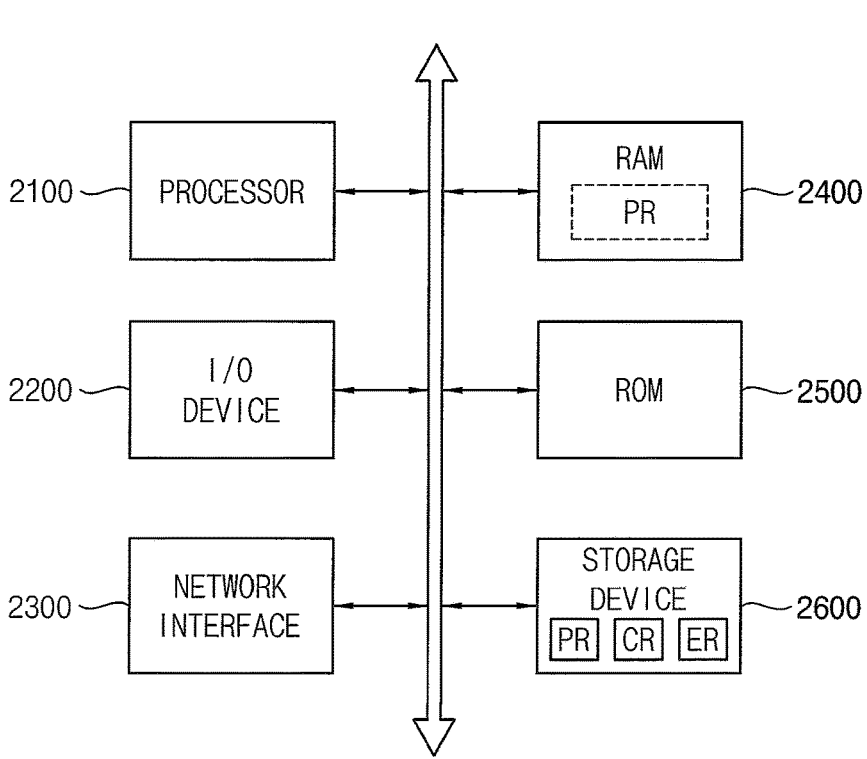
Figure 4:
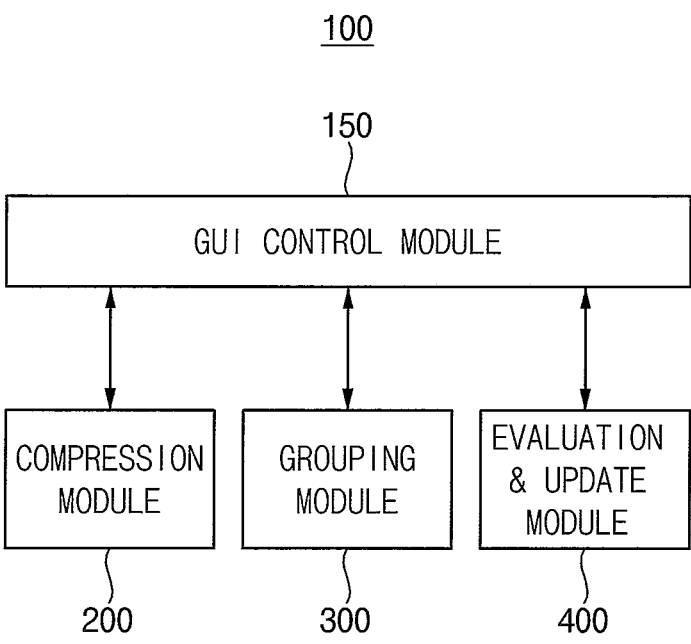

FIGS. 2, 3 and 4 are block diagrams illustrating a neural network model processing system according to example embodiments.

Referring to FIG. 2, a neural network model processing system 1000 is a computer-based neural network model processing system, and includes a processor 1100, a storage device 1200 and an input/output (I/O) device 1300. The I/O device 1300 includes an input device 1310 and an output device 1320.

The processor 1100 may be used to perform the method of optimizing the neural network model according to example embodiments. For example, the processor 1100 may include a microprocessor, an application processor (AP), a digital signal processor (DSP), a graphic processing unit (GPU), or the like. Although only one processor 1100 is illustrated in FIG. 2, example embodiments are not limited thereto. For example, a plurality of processors may be included in the neural network model processing system 1000. In addition, the processor 1100 may include cache memories to increase computation capacity.

The storage device 1200 may store and/or include a program (PR) 1210 for the method of optimizing the neural network model according to example embodiments. The storage device 1200 may further store and/or include a compression rule (CR) 1220 and an evaluation rule (ER) 1230 that are used to perform the method of optimizing the neural network model according to example embodiments. The program 1210, the compression rule 1220 and the evaluation rule 1230 may be provided from the storage device 1200 to the processor 1100.

In some example embodiments, the storage device 1200 may include at least one of various non-transitory computer-readable storage mediums used to provide commands and/or data to a computer. For example, the non-transitory computer-readable storage mediums may include a volatile memory such as a static random access memory (SRAM), a dynamic random access memory (DRAM), or the like, and/or a nonvolatile memory such as a flash memory, a magnetoresistive random access memory (MRAM), a phase-change random access memory (PRAM), a resistive random access memory (RRAM), or the like. The non-transitory computer-readable storage mediums may be inserted into the computer, may be integrated in the computer, or may be connected to the computer through a communication medium such as a network and/or a wireless link.

The input device 1310 may be used to receive an input for the method of optimizing the neural network model according to example embodiments. For example, the input device 1310 may include at least one of various input means for receiving a user input UI, such as a keyboard, a keypad, a touch pad, a touch screen, a mouse, a remote controller, or the like.

The output device 1320 may be used to provide an output for the method of optimizing the neural network model according to example embodiments. For example, the output device 1320 may include an output means for outputting a graphical representation GR, such as a display device, and may further include at least one of various output means, such as a speaker, a printer, or the like.

The neural network model processing system 1000 may perform the method of optimizing the neural network model according to example embodiments, which is described with reference to FIG. 1. For example, the input device 1310 may receive original model information of a first neural network model that is pre-trained. The storage device 1200 may store information of program routines, and the program routines may be configured to generate a second neural network model and compressed model information of the second neural network model by performing a compression on the first neural network model and generate a result of the compression such that at least a part of the original model information and at least a part of the compressed model information are displayed on one screen. The output device 1320 may visualize and output the result of the compression. The processor 1100 may be connected to the input device 1310, the storage device 1200 and the output device 1320, and may control execution of the program routines. In addition, the neural network model processing system 1000 may perform a method of optimizing a neural network model according to example embodiments, which will be described with reference to FIGS. 20 and 24.

Referring to FIG. 3, a neural network model processing system 2000 includes a processor 2100, an I/O device 2200, a network interface 2300, a random access memory (RAM) 2400, a read only memory (ROM) 2500 and a storage device 2600.

In some example embodiments, the neural network model processing system 2000 may be a computing system. For example, the computing system may be a fixed computing system such as a desktop computer, a workstation or a server, or may be a portable computing system such as a laptop computer.

The processor 2100 may be substantially the same as the processor 1100 in FIG. 2. For example, the processor 2100 may include a core or a processor core for executing an arbitrary instruction set (for example, intel architecture-32 (IA-32), 64 bit extension IA-32, x86-64, PowerPC, Sparc, MIPS, ARM, IA-64, etc.). For example, the processor 2100 may access a memory (e.g., the RAM 2400 or the ROM 2500) through a bus, and may execute instructions stored in the RAM 2400 or the ROM 2500. As illustrated in FIG. 3, the RAM 2400 may store a program PR for the method of optimizing the neural network model according to example embodiments or at least some elements of the program PR, and the program PR may allow the processor 2100 to perform operations of optimizing the neural network model.

In other words, the program PR may include a plurality of instructions and/or procedures executable by the processor 2100, and the plurality of instructions and/or procedures included in the program PR may allow the processor 2100 to perform the method of optimizing the neural network model according to example embodiments. Each of the procedures may denote a series of instructions for performing a certain task. A procedure may be referred to as a function, a routine, a subroutine, or a subprogram. Each of the procedures may process data provided from the outside and/or data generated by another procedure.

The storage device 2600 may be substantially the same as the storage device 1200 in FIG. 2. For example, the storage device 2600 may store the program PR, and may store a compression rule CR and an evaluation rule ER. The program PR or at least some elements of the program PR may be loaded from the storage device 2600 to the RAM 2400 before being executed by the processor 2100. The storage device 2600 may store a file written in a program language, and the program PR generated by a compiler or at least some elements of the program PR may be loaded to the RAM 2400.

The storage device 2600 may store data, which is to be processed by the processor 2100, or data obtained through processing by the processor 2100. The processor 2100 may process the data stored in the storage device 2600 to generate new data, based on the program PR and may store the generated data in the storage device 2600.

The I/O device 2200 may be substantially the same as the I/O device 1300 in FIG. 2. The I/O device 2200 may include an input device, such as a keyboard, a pointing device, or the like, and may include an output device such as a display device, a printer, or the like. For example, a user may trigger, through the I/O devices 2200, execution of the program PR by the processor 2100 or may input the user input UI in FIG. 2, and may check the graphical representation GR in FIG. 2.

The network interface 2300 may provide access to a network outside the neural network model processing system 2000. For example, the network may include a plurality of computing systems and communication links, and the communication links may include wired links, optical links, wireless links, or arbitrary other type links. The user input UI in FIG. 2 may be provided to the neural network model processing system 2000 through the network interface 2300, and the graphical representation GR in FIG. 2 may be provided to another computing system through the network interface 2300.

Referring to FIG. 4, a neural network model optimizing module 100 may be executed and/or controlled by the neural network model processing systems 1000 and 2000 of FIGS. 2 and 3, and may include a GUI control module 150 and a compression module 200. The neural network model optimizing module 100 may further include a grouping module 300, and an evaluation and update module 400.

Herein, the term "module" may indicate, but is not limited to, a software and/or hardware component, such as a field programmable gate array (FPGA) or an application specific integrated circuit (ASIC), which performs certain tasks. A module may be configured to reside in a tangible addressable storage medium and be configured to execute on one or more processors. For example, a "module" may include components such as software components, object-oriented software components, class components and task components, and processes, functions, routines, segments of program code, drivers, firmware, microcode, circuitry, data, databases, data structures, tables, arrays, and variables. A "module" may be divided into a plurality of "modules" that perform detailed functions.

The compression module 200 may perform a compression on a neural network model. For example, the compression module 200 may perform the compression based on a compression rule (e.g., the compression rule CR in FIGS. 2 and 3).

The grouping module 300 may perform a grouping (or grouping operation) on layers included in a neural network model. The grouping will be described with reference to FIGS. 14 and 16.

The evaluation and update module 400 may perform an evaluation (or evaluating operation) and an update (or updating operation) on a neural network model. For example, the update on the neural network model may include a setting change, a layer change, or the like. For example, the evaluation and update module 400 may perform the evaluation based on an evaluation rule (e.g., the evaluation rule ER in FIGS. 2 and 3). The evaluation and the update will be described with reference to FIGS. 20 and 24.

The GUI control module 150 may control a GUI to perform an optimization on the neural network model. For example, the GUI control module 150 may control the GUI to receive a user input (e.g., the user input UI in FIG. 2) and output a graphical representation (e.g., the graphical representation GR in FIG. 2).

In some example embodiments, at least some elements of the neural network model optimizing module 100 may be implemented as instruction codes or program routines (e.g., a software program). For example, the instruction codes or the program routines may be executed by a computer-based electronic system, and may be stored in any storage device located inside or outside the computer-based electronic system. In other example embodiments, at least some elements of the neural network model optimizing module 100 may be implemented as hardware. For example, at least some elements of the neural network model optimizing module 100 may be included in a computer-based electronic system.

FIGS. 5A, 5B, 5C and 6 are diagrams for describing examples of a neural network model that is a target of a method of optimizing a neural network model according to example embodiments.

Figure 5C:
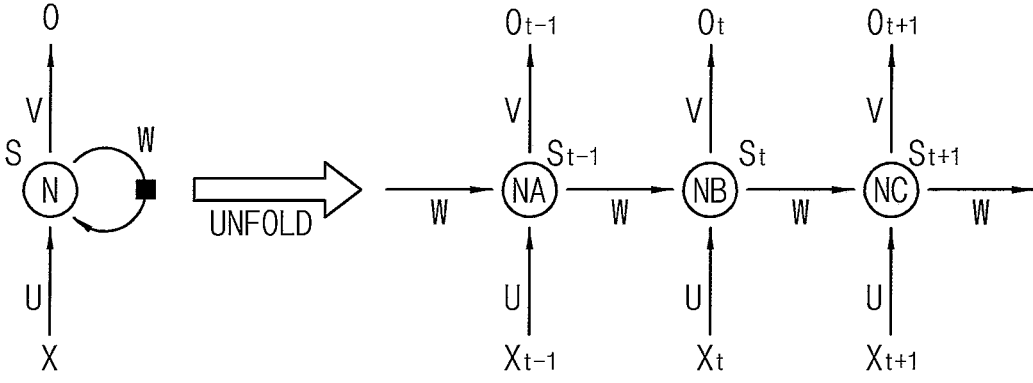
Figure 6:
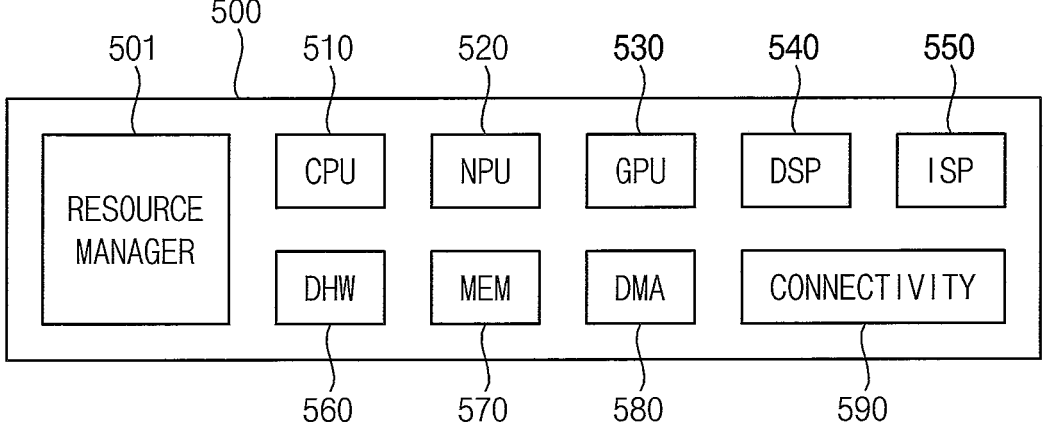

FIGS. 5A, 5B and 5C illustrate examples of a network structure of a neural network model, and FIG. 6 illustrates an example of a neural network system that is used to execute and/or drive the neural network model. For example, the neural network model may include at least one of an artificial neural network (ANN) model, a convolutional neural network (CNN) model, a recurrent neural network (RNN) model, a deep neural network (DNN) model, or the like. However, example embodiments are not limited thereto. For another example, the neural network model may include a variety of learning models, such as deconvolutional neural networks, stacked neural networks (SNN), state-space dynamic neural networks (SSDNN), deep belief networks (DBN), generative adversarial networks (GAN), and/or restricted Boltzmann machines (RBM). Alternatively or additionally, the neural network model may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests.

Referring to FIG. 5A, a general neural network may include an input layer IL, a plurality of hidden layers HL1, HL2, . . . , HLn and an output layer OL.

The input layer IL may include i input nodes $x_1$, $x_2$, . . . , $x_i$, where i is a natural number. Input data (e.g., vector input data) IDAT whose length is i may be input to the input nodes $x_1$, $x_2$, . . . , $x_i$ such that each element of the input data IDAT is input to a respective one of the input nodes $x_1$, $x_2$, . . . , $x_i$.

The plurality of hidden layers HL1, HL2, . . . , HLn may include n hidden layers, where n is a natural number, and may include a plurality of hidden nodes $$h_1^1, h_2^1, h_3^1, \ldots, h_m^1, h_1^2, h_2^2, h_3^2, \ldots, h_m^2, h_1^n, h_2^n, h_3^n, \ldots, h_m^n.$$

For example, the hidden layer HL1 may include m hidden nodes $$h_1^1, h_2^1, h_3^1, \ldots, h_m^1,$$

the hidden layer HL2 may include m hidden nodes $$h_1^2, h_2^2, h_3^2, \ldots, h_m^2,$$

and the hidden layer HLn may include m hidden nodes $$h_1^n, h_2^n, h_3^n, \ldots, h_m^n,$$

where m is a natural number.

The output layer OL may include j output nodes $y_1$, $y_2$, . . . , $y_j$, where j is a natural number. Each of the output nodes $y_1$, $y_2$, . . . , $y_j$ may correspond to a respective one of classes to be categorized. The output layer OL may generate output values (e.g., class scores or numerical output such as a regression variable) and/or output data ODAT associated with the input data IDAT for each of the classes. In some example embodiments, the output layer OL may be a fully-connected layer and may indicate, for example, a probability that the input data IDAT corresponds to a car.

A structure of the neural network illustrated in FIG. 5A may be represented by information on branches (or connections) between nodes illustrated as lines, and a weighted value assigned to each branch, which is not illustrated. In some neural network models, nodes within one layer may not be connected to one another, but nodes of different layers may be fully or partially connected to one another. In some other neural network models, such as unrestricted Boltzmann machines, at least some nodes within one layer may also be connected to other nodes within one layer in addition to (or alternatively with) one or more nodes of other layers.

Each node (e.g., the node $$h_1^1$$

may receive an output of a previous node (e.g., the node $x_1$), may perform a computing operation, computation or calculation on the received output, and may output a result of the computing operation, computation or calculation as an output to a next node (e.g., the node $$h_1^2$$

). Each node may calculate a value to be output by applying the input to a specific function, e.g., a nonlinear function.

In some example embodiments, the structure of the neural network is set in advance, and the weighted values for the connections between the nodes are set appropriately using data having an already known answer of which class the data belongs to (sometimes referred to as a "label"). The data with the already known answer is sometimes referred to as "training data", and a process of determining the weighted value is sometimes referred to as "training". The neural network "learns" to associate the data with corresponding labels during the training process. A group of an independently trainable structure and the weighted value is sometimes referred to as a "model", and a process of predicting, by the model with the determined weighted value, which class the input data belongs to, and then outputting the predicted value, is sometimes referred to as a "testing" process.

The general neural network illustrated in FIG. 5A may not be suitable for handling input image data (or input sound data) because each node (e.g., the node $$h_1^1$$

) is connected to all nodes of a previous layer (e.g., the nodes $x_1, x_2, \ldots, x_i$ included in the layer IL) and then the number of weighted values drastically increases as the size of the input image data increases. Thus, a CNN, which is implemented by combining the filtering technique with the general neural network, has been researched such that two-dimensional image (e.g., the input image data) is efficiently trained by the CNN.

Referring to FIG. 5B, a CNN may include a plurality of layers CONV1, RELU1, CONV2, RELU2, POOL1, CONV3, RELU3, CONV4, RELU4, POOL2, CONV5, RELU5, CONV6, RELU6, POOL3 and FC.

Unlike the general neural network, each layer of the CNN may have three dimensions of width, height and depth, and thus data that is input to each layer may be volume data having three dimensions of width, height and depth. For example, if an input image in FIG. 5B has a size of 32 widths (e.g., 32 pixels) and 32 heights and three color channels R, G and B, input data IDAT corresponding to the input image may have a size of 32*32*3. The input data IDAT in FIG. 5B may be referred to as input volume data or input activation volume.

Each of convolutional layers CONV1, CONV2, CONV3, CONV4, CONV5 and CONV6 may perform a convolutional operation on input volume data. In an image processing, the convolutional operation indicates an operation in which image data is processed based on a mask with weighted values and an output value is obtained by multiplying input values by the weighted values and adding up the total multiplied values. The mask may be referred to as a filter, window or kernel.

Parameters of each convolutional layer may include a set of learnable filters. Every filter may be spatially small (along width and height), but may extend through the full depth of an input volume. For example, during the forward pass, each filter may be slid (e.g., convolved) across the width and height of the input volume, and dot products may be computed between the entries of the filter and the input at any position. As the filter is slid over the width and height of the input volume, a two-dimensional activation map that provides responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of rectified linear unit (RELU) layers RELU1, RELU2, RELU3, RELU4, RELU5 and RELU6 may perform a RELU operation that corresponds to an activation function defined by, e.g., a function f(x)=max(0, x) (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2 and POOL3 may perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the CNN, pairs of the CONV/RELU layers may be repeatedly arranged in the CNN, and the pooling layer may be periodically inserted in the CNN, thereby reducing a spatial size of image and extracting a characteristic of image.

An output layer or fully-connected layer FC may output results (e.g., class scores) of the input volume data IDAT for each of the classes. For example, the input volume data IDAT corresponding to the two-dimensional image may be converted into a one-dimensional matrix or vector as the convolutional operation and the down-sampling operation are repeated. For example, the fully-connected layer FC may indicate probabilities that the input volume data IDAT corresponds to a car, a truck, an airplane, a ship and a horse.

The types and number of layers included in the CNN may not be limited to an example described with reference to FIG. 5B and may be changed according to example embodiments. In addition, although not illustrated in FIG. 5B, the CNN may further include other layers such as a softmax layer for converting score values corresponding to predicted results into probability values, a bias adding layer for adding at least one bias, or the like.

Referring to FIG. 5C, a RNN may include a repeating structure using a specific node or cell N illustrated on the left side of FIG. 5C.

A structure illustrated on the right side of FIG. 5C may indicate that a recurrent connection of the RNN illustrated on the left side is unfolded (or unrolled). The term "unfolded" means that the network is written out or illustrated for the complete or entire sequence including all nodes NA, NB and NC. For example, if the sequence of interest is a sentence of 3 words, the RNN may be unfolded into a 3-layer neural network, one layer for each word (e.g., without recurrent connections or without cycles).

In the RNN in FIG. 5C, X indicates an input of the RNN. For example, $X_t$ may be an input at time step t, and $X_{t-1}$ and $X_{t+1}$ may be inputs at time steps t−1 and t+1, respectively.

In the RNN in FIG. 5C, S indicates a hidden state. For example, $S_t$ may be a hidden state at the time step t, and $S_{t-1}$ and $S_{t+1}$ may be hidden states at the time steps t−1 and t+1, respectively. The hidden state may be calculated based on a previous hidden state and an input at a current step. For example, $S_t=f(UX_t+WS_{t-1})$. For example, the function f may be generally a nonlinearity function such as tan h or RELU. $S_{-1}$, which is required to calculate a first hidden state, may be typically initialized to all zeroes.

In the RNN in FIG. 5C, O indicates an output of the RNN. For example, $O_t$ may be an output at the time step t, and $O_{t-1}$ and $O_{t+1}$ may be outputs at the time steps t−1 and t+1, respectively. For example, if it is required to predict a next word in a sentence, the output would be a vector of probabilities across a vocabulary. For example, $O_t$=softmax $(VS_t)$.

In the RNN in FIG. 5C, the hidden state may be a "memory" of the network. For example, the RNN may have a "memory" which captures information about what has been calculated so far. The hidden state $S_t$ may capture information about what happened in all the previous time steps. The output $O_t$ may be calculated solely based on the memory at the current time step t. In addition, unlike a traditional neural network, which uses different parameters at each layer, the RNN may share the same parameters (e.g., U, V and W in FIG. 5C) across all time steps. This may indicate the fact that the same task may be performed at each step, only with different inputs. This may greatly reduce the total number of parameters required to be trained or learned.

Referring to FIG. 6, a neural network system 500 may include a plurality of heterogeneous resources for executing and/or driving a neural network model, and a resource manager 501 for managing and/or controlling the plurality of heterogeneous resources.

The plurality of heterogeneous resources may include a central processing unit (CPU) 510, a neural processing unit (NPU) 520, a graphic processing unit (GPU) 530, a digital signal processor (DSP) 540 and an image signal processor (ISP) 550, and may further include a dedicated hardware (DHW) 560, a memory (MEM) 570, a direct memory access unit (DMA) 580 and a connectivity 590. The CPU 510, the NPU 520, the GPU 530, the DSP 540, the ISP 550 and the dedicated hardware 560 may be referred to as processors, processing units (PE), computing resources, etc. The DMA 580 and the connectivity 590 may be referred to as communication resources.

The CPU 510, the NPU 520, the GPU 530, the DSP 540, the ISP 550 and the dedicated hardware 560 may perform various computational functions such as particular calculations and tasks, and may be used to execute a neural network model. For example, the dedicated hardware 560 may include a vision processing unit (VPU), a vision intellectual property (VIP), etc. The memory 570 may operate as a working memory or a data storage for data processed by the plurality of heterogeneous resources, and may store data associated with the neural network model. The DMA 580 may control an access to the memory 570. For example, the DMA 580 may include a memory DMA (MDMA), a peripheral DMA (PDMA), a remote DMA (RDMA), a smart DMA (SDMA), etc. The connectivity 590 may perform wire/ wireless communication with an internal element and/or an external device. For example, the connectivity 590 may include an internal bus that supports an internal communication such as a system bus, peripheral component interconnect (PCI), PCI express (PCIe), etc., and/or may support an external communication such as a mobile telecommunication, universal serial bus (USB), Ethernet, WiFi, Bluetooth, near field communication (NFC), radio frequency identification (RFID), etc.

Although not illustrated in FIG. 6, the computing resources may further include a microprocessor, an application processor (AP), a customized hardware, a compression hardware, etc., and the communication resources may further include resources capable of copying memory, etc.

In some example embodiments, the neural network system 500 may be included in any computing device and/or mobile device.

In some example embodiments, at least one of various services and/or applications, e.g., a computer vision (e.g., image classifying, image detection, image segmentation, image tracking, etc.) service, a user authentication service based on bio-information or biometric data, an advanced driver assistance system (ADAS) service, a voice assistant service, an automatic speech recognition (ASR) service, or the like, may be performed, executed and/or processed by the neural network model described with reference to FIGS. 5A, 5B and 5C and the neural network system 500 described with reference to FIG. 6.

FIG. 7 is a flowchart illustrating an example of a method of optimizing a neural network model of FIG. 1. The descriptions repeated with FIG. 1 will be omitted.

Referring to FIG. 7, in the method of optimizing the neural network model according to example embodiments, a GUI for optimizing the neural network model is provided (step S500). However, example embodiments are not limited thereto, and the GUI may be provided to display various information associated with or related to the neural network model. Detailed configurations of the GUI will be described later in detail.

The original model information of the first neural network model that is pre-trained is received through the GUI (step S100a). The second neural network model and the compressed model information of the second neural network model are generated by performing the compression on the first neural network model (step S200). The result of the compression is displayed on the GUI such that the at least the part of the original model information and the at least the part of the compressed model information are displayed on one screen (step S300a). For example, as described with reference to FIGS. 5A, 5B and 5C, each of the first and second neural network models may include a plurality of layers. For example, layers that are included in the first neural network model and correspond to the original model information may be defined as a plurality of original layers, and layers that are included in the second neural network model and correspond to the compressed model information may be defined as a plurality of compressed layers.

Steps S100a and S300a may be similar to steps S100 and S300 in FIG. 1, respectively, and step S200 may be substantially the same as step S200 in FIG. 1.

Figure 9A:
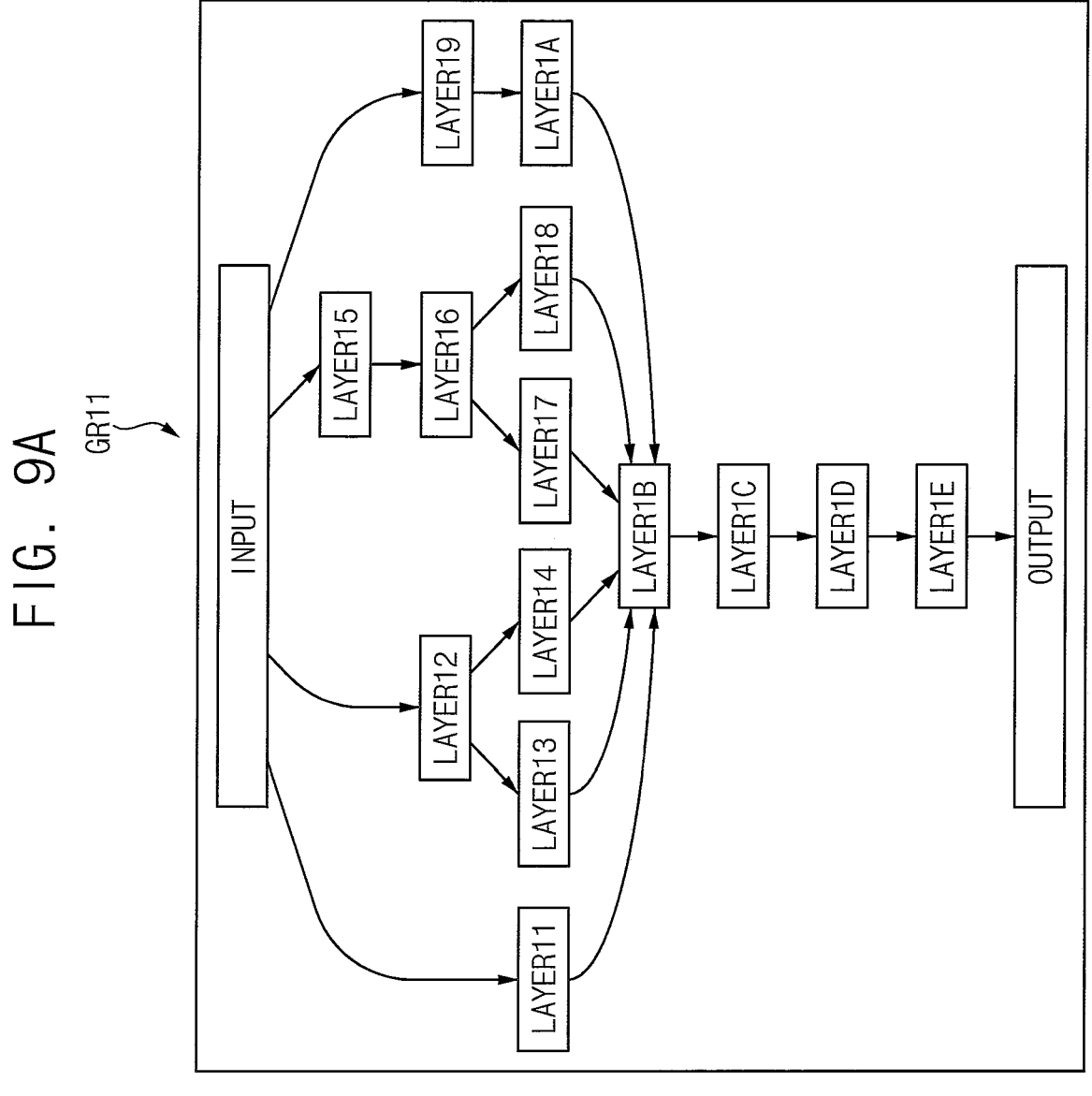
FIGS. 9A and 9B are diagrams for describing examples of an operation of FIG. 8.
Figure 9B:
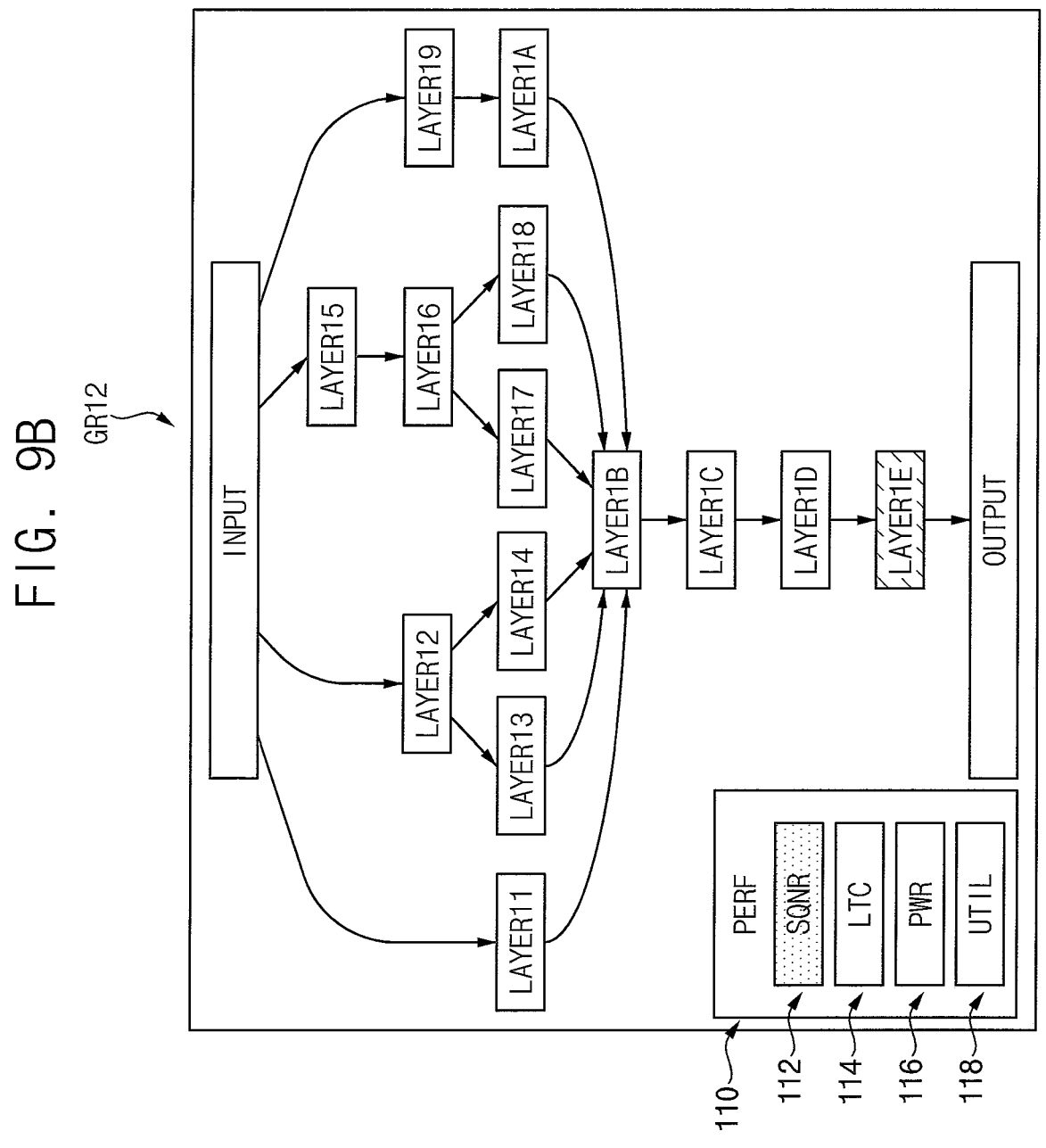

FIG. 8 is a flowchart illustrating an example of displaying a result of a compression in FIG. 7. FIGS. 9A and 9B are diagrams for describing examples of an operation of FIG. 8.

Referring to FIGS. 7, 8, 9A and 9B, when displaying the result of the compression on the GUI (step S300a), a graphical representation, which includes a network structure of the plurality of compressed layers included in the second neural network model, may be displayed on the GUI (step S310). For example, the graphical representation may indicate visual information displayed on one screen of a display device that is included in the output device 1320 included in the neural network model processing system 1000.

For example, as illustrated in FIG. 9A, a graphical representation GR11 may include a network structure of a plurality of compressed layers LAYER11, LAYER12, LAYER13, LAYER14, LAYER15, LAYER16, LAYER17, LAYER18, LAYER19, LAYER1A, LAYER1B, LAYER1C, LAYER1D and LAYER1E between an input and an output of the second neural network model. For example, the graphical representation GR11 may include a plurality of layer boxes (e.g., rectangles) each of which corresponds to a respective one of the plurality of compressed layers and arrows each of which indicates a connection between compressed layers.

For another example, as illustrated in FIG. 9B, a graphical representation GR12 may indicate the network structure of the plurality of compressed layers LAYER11 to LAYER1E and information as to whether each of the plurality of compressed layers satisfies or complies with a predetermined reference value. For example, a layer box that corresponds to a compressed layer satisfying the reference value may be displayed by a first scheme (or manner), and a layer box that corresponds to a compressed layer unsatisfying the reference value may be displayed by a second scheme (or manner) different from the first scheme.

In some example embodiments, as illustrated in FIG. 9B, the first scheme may be implemented by displaying a layer box without any separate indication, and the second scheme may be implemented by displaying hatches in a layer box. In the example of FIG. 9B, the compressed layer LAYER1E may not satisfy the reference value, and the layer box corresponding to the compressed layer LAYER1E may be hatched. In addition, the remaining compressed layers LAYER11 to LAYER1D other than the compressed layer LAYER1E may satisfy the reference value, and the layer boxes corresponding to the compressed layers LAYER11 to LAYER1D may be displayed without any separate indication. However, example embodiments are not limited thereto, and the first and second schemes may be implemented using different colors, shapes, or the like. For example, the first scheme may be implemented by displaying a green layer box, and the second scheme may be implemented by displaying a red layer box.

In some example embodiments, the reference value for displaying the layer boxes by different schemes may be associated with or related to a performance (PERF) criterion. For example, the reference value may be associated with at least one of a plurality of comparison metrics (e.g., indicators against which performance may be compared) that include signal-to-quantization-noise power ratio (SQNR), latency (LTC), power consumption (PWR) and utilization amount (UTIL). When a performance value of each compressed layer is greater than or equal to the reference value, a corresponding layer box may be displayed by the first scheme. When a performance value of each compressed layer is less than the reference value, a corresponding layer box may be displayed by the second scheme. In other words, an index value representing the performance may be displayed on a layer-by-layer basis, and when an index value of a specific layer is less than the reference value, the specific layer may be displayed in a different manner.

In some example embodiments, the reference value may be selectable and/or changeable. For example, as illustrated in FIG. 9B, the reference value may be selected and/or changed by selecting one of buttons 112, 114, 116 and 118 included in a menu 110 included in the graphical representation GR12. In the example of FIG. 9B, the reference value associated with SQNR may be selected by selecting the button 112, and each layer box may be displayed by one of the first and second schemes based on the reference value associated with SQNR. For example, one of the buttons 112, 114, 116 and 118 may be selected by receiving a user input via an input device 1310 (e.g., a mouse or a touch screen included in the input device 1310) included in the neural network model processing system 1000.

Figure 10:
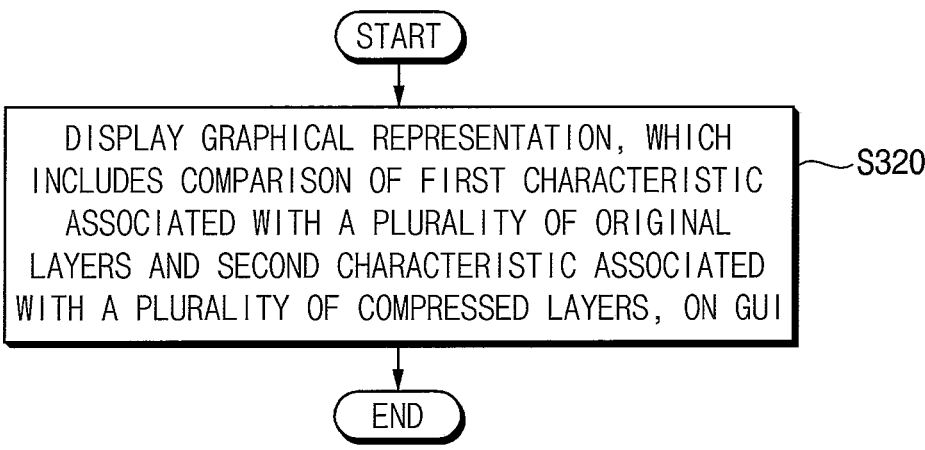
FIG. 10 is a flowchart illustrating an example of displaying a result of a compression in FIG. 7.
Figure 11A:
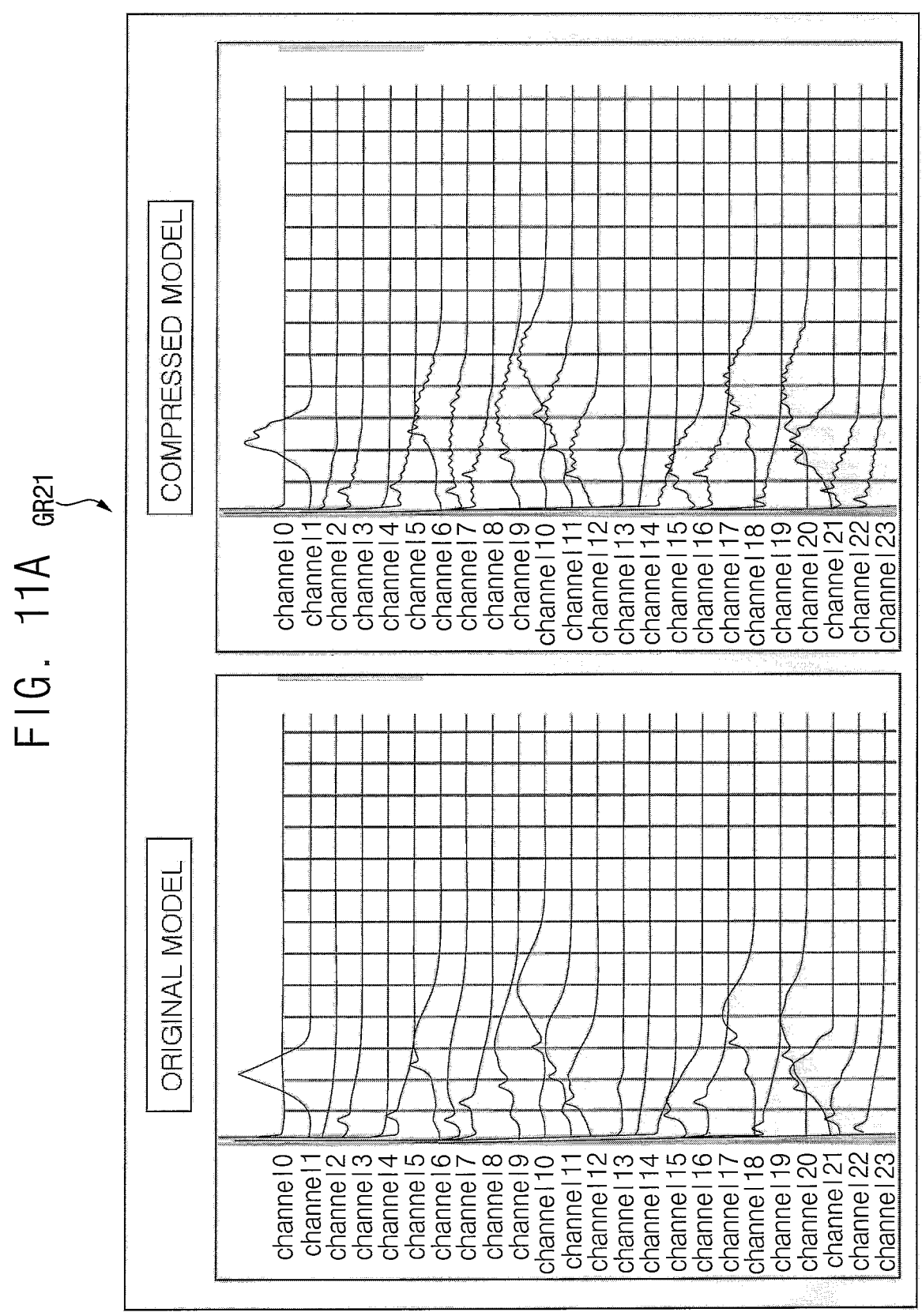

FIG. 10 is a flowchart illustrating an example of displaying a result of a compression in FIG. 7. FIGS. 11A, 11B and 11C are diagrams for describing examples of an operation of FIG. 10. The descriptions repeated with FIGS. 8, 9A and 9B will be omitted.

Referring to FIGS. 7, 10, 11A, 11B and 11C, when displaying the result of the compression on the GUI (step S300a), a graphical representation, which includes a comparison of a first characteristic associated with the plurality of original layers and a second characteristic associated with the plurality of compressed layers, may be displayed on the GUI (step S320). For example, some or all of the first characteristic and some or all of the second characteristic may be displayed on one screen.

For example, as illustrated in FIGS. 11A, 11B and 11C, each of graphical representations GR21, GR22 and GR23 may include a comparison of a distribution characteristic of the plurality of original layers corresponding to the original model information and a distribution characteristic of the plurality of compressed layers corresponding to the compressed model information. For example, the original model information may be floating model information, and the compressed model information may be fixed model information. A distribution characteristic illustrated on the left may indicate the first characteristic associated with the plurality of original layers, and a distribution characteristic illustrated on the right may indicate the second characteristic associated with the plurality of compressed layers. Although not illustrated in detail, each of the graphical representations GR21, GR22 and GR23 may further include additional information such as multiply-accumulate (MAC) count values, normal operation (OP) count values, accuracy values, performance values (e.g., SQNR), or the like.

In some example embodiments, the first characteristic and the second characteristic may be displayed by units of layer and/or by units of channel (e.g., layer-by-layer basis and/or channel-by-channel basis). In the examples of FIGS. 11A and 11B, each of the graphical representations GR21 and GR22 may include a comparison of distribution characteristics of a plurality of channels (e.g., channel0 to channel23) included in one original layer and distribution characteristics of a plurality of channels included in one compressed layer corresponding to the one original layer. In the example of FIG. 11C, the graphical representation GR23 may include a comparison of a distribution characteristic of one channel (e.g., channel0) included in one original layer and a distribution characteristic of one channel included in one compressed layer.

In some example embodiments, only some data may be selectively displayed. For example, when one channel is selected from one of the graphical representations GR21 and GR22 of FIGS. 11A and 11B based on a user input, the graphical representation GR23 of FIG. 11C may be displayed.

In some example embodiments, through the GUI, an output of the original model and an output of the compressed model may be compared and a layer that is changed after the compression is performed on the neural network model is displayed. Additionally, information required for model design, such as model complexity or capacity, may be provided, information whether the model is supported may be provided by analyzing computations or attributes of the model, and memory footprint information may be provided by analyzing the model.

Figure 12:
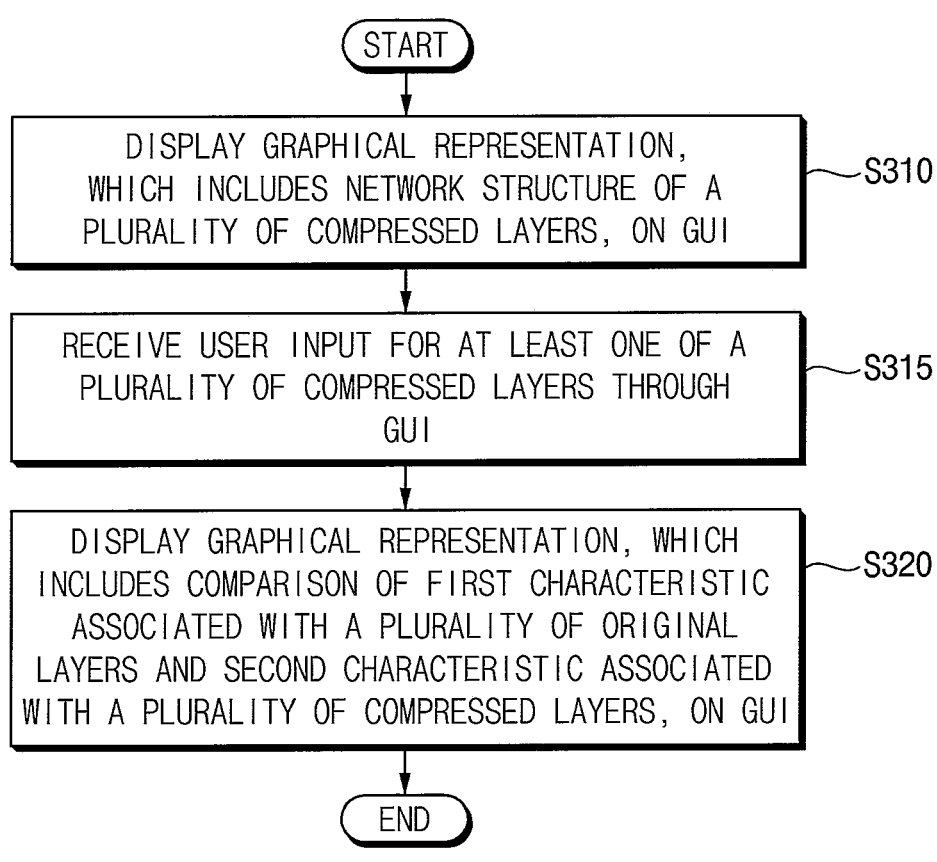
FIG. 12 is a flowchart illustrating an example of displaying a result of a compression in FIG. 7.
Figure 13:
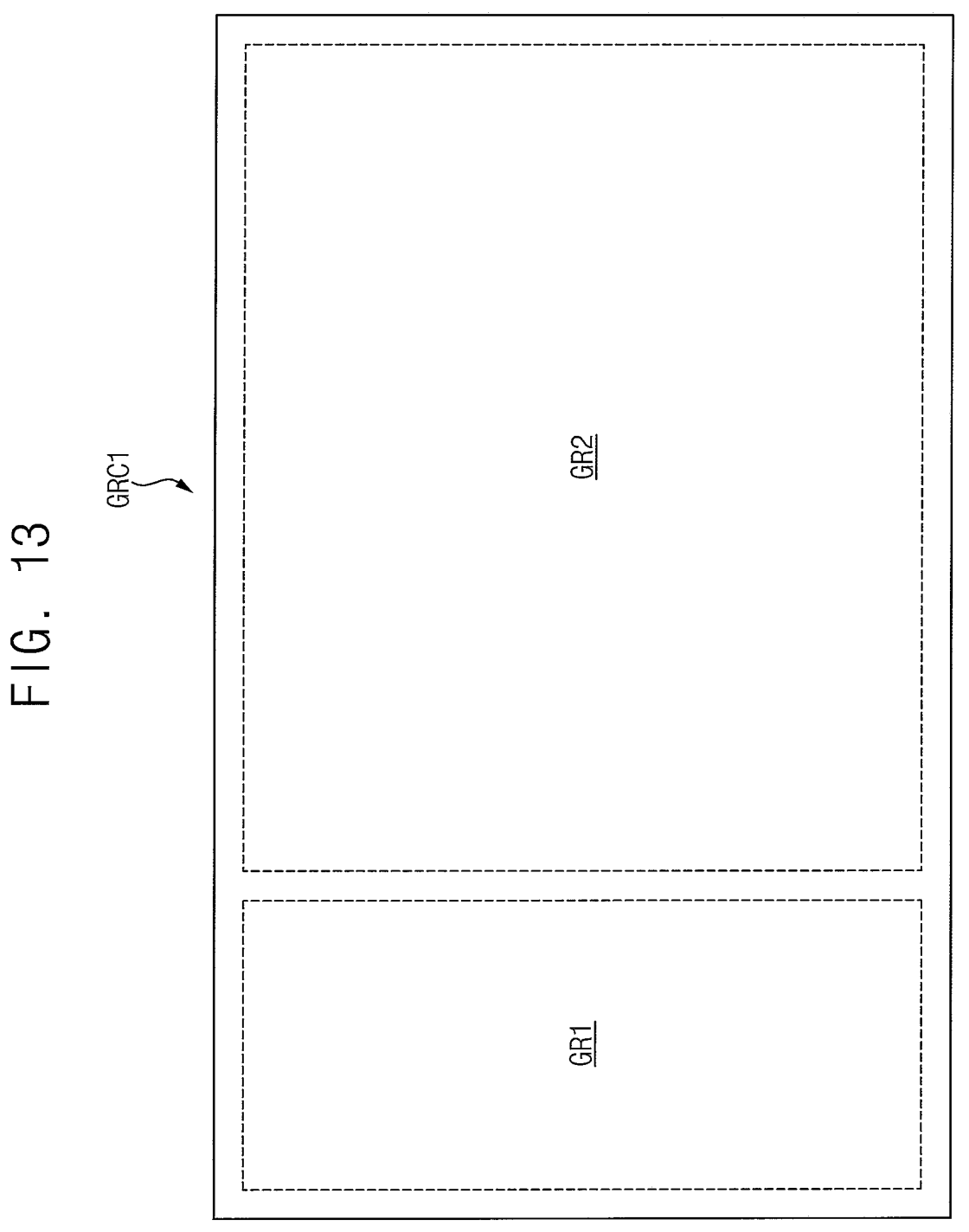

FIG. 12 is a flowchart illustrating an example of displaying a result of a compression in FIG. 7. FIG. 13 is a diagram for describing an example of an operation of FIG. 12. The descriptions repeated with FIGS. 8, 9A, 9B, 10, 11A, 11B and 11C will be omitted.

Referring to FIGS. 7, 12 and 13, when displaying the result of the compression on the GUI (step S300a in FIG. 7), steps S310, S315, and S320 in FIG. 12 may be performed. Step S310 in FIG. 12 may be substantially the same as step S310 in FIG. 8, and step S320 in FIG. 12 may be substantially the same as step S320 in FIG. 10.

A user input for at least one of the plurality of compressed layers may be received through the GUI (step S315). Step S320 may be performed based on the user input received in step S315.

For example, one of the graphical representations GR11 and GR12 of FIGS. 9A and 9B may be displayed by step S310. A user input for a first compressed layer among the plurality of compressed layers LAYER11 to LAYER1E may be received by step S315. One of the graphical representations GR21, GR22 and GR23 of FIGS. 11A, 11B and 11C may be displayed by step S320 such that a characteristic of a first original layer corresponding to the first compressed layer and a characteristic of the first compressed layer are compared and displayed on one screen.

In some example embodiments, as illustrated in FIG. 13, a graphical representation GRC1 may be displayed in a form in which a first graphical representation GR1 and a second graphical representation GR2 are combined. For example, the first graphical representation GR1 may correspond to one of the graphical representations GR11 and GR12 of FIGS. 9A and 9B, and the second graphical representation GR2 may correspond to one of the graphical representations GR21, GR22 and GR23 of FIGS. 11A, 11B and 11C. In other words, the graphical representations of steps S310 and S320 may be displayed on one screen.

Figure 14:
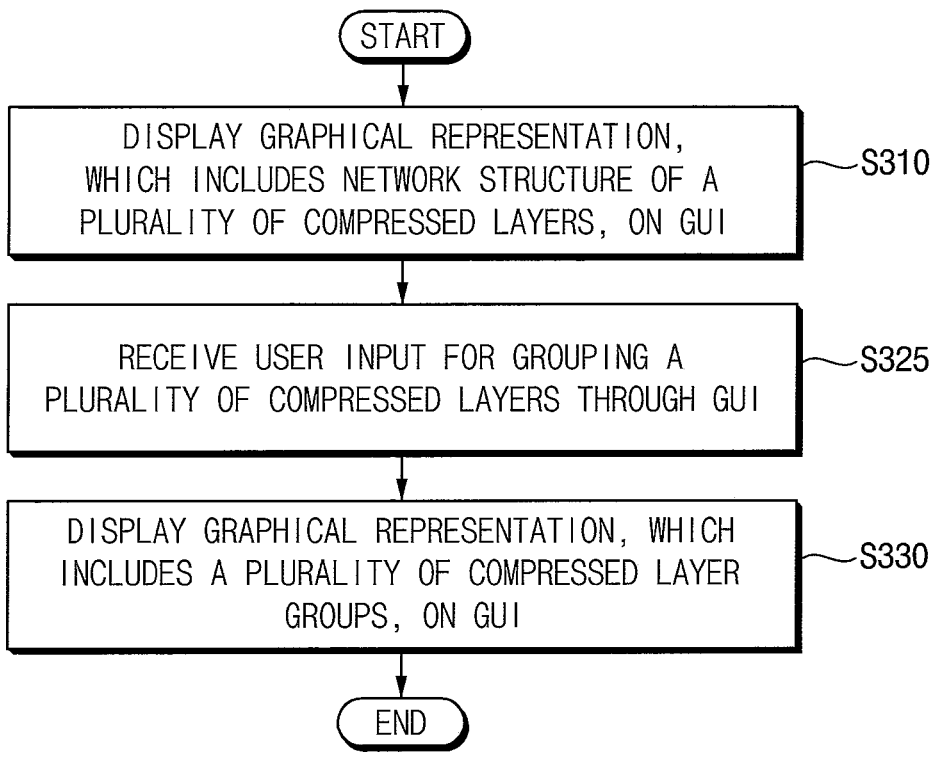
FIG. 14 is a flowchart illustrating an example of displaying a result of a compression in FIG. 7.

FIG. 14 is a flowchart illustrating an example of displaying a result of a compression in FIG. 7. FIGS. 15A, 15B, 15C and 15D are diagrams for describing examples of an operation of FIG. 14. The descriptions repeated with FIGS. 8, 9A and 9B will be omitted.

Referring to FIGS. 7, 14, 15A, 15B, 15C and 15D, when displaying the result of the compression on the GUI (step S300a), steps S310, S325, and S330 in FIG. 14 may be performed. Step S310 in FIG. 14 may be substantially the same as step S310 in FIG. 8.

A user input for grouping the plurality of compressed layers may be received through the GUI (step S325). A graphical representation, which includes a plurality of compressed layer groups, each of which includes at least one of the plurality of compressed layers, may be displayed on the GUI (step S330). Step S330 may be performed based on the user input received in step S325.

A layer grouping indicates an operation of classifying a plurality of layers included in a neural network model based on a specific criterion. When such classification operation is repeatedly performed, a neural network model having N layers may be expressed in a reduced form having M layer groups. For example, the number of layer groups may be less than or equal to the number of layers (e.g., M≤N). Typically, a neural network model may include tens to hundreds of layers, and when the layers are grouped, relevant information is automatically summarized and highlighted using layer groups. This information may be efficiently used for the development of the neural network model, as compared to information provided using layers.

In some example embodiments, a reference value for grouping the plurality of compressed layers may be associated with or related to at least one of a performance criterion and a functional (FUNC) criterion. For example, the performance criterion may include at least one of SQNR, latency, power consumption and utilization amount. For example, the functional criterion may include at least one of CNN, feature-extractor, backbone, RNN, long short term memory (LSTM) and attention module. A scheme of grouping the plurality of compressed layers may be changed based on the reference value.

Figure 15A:
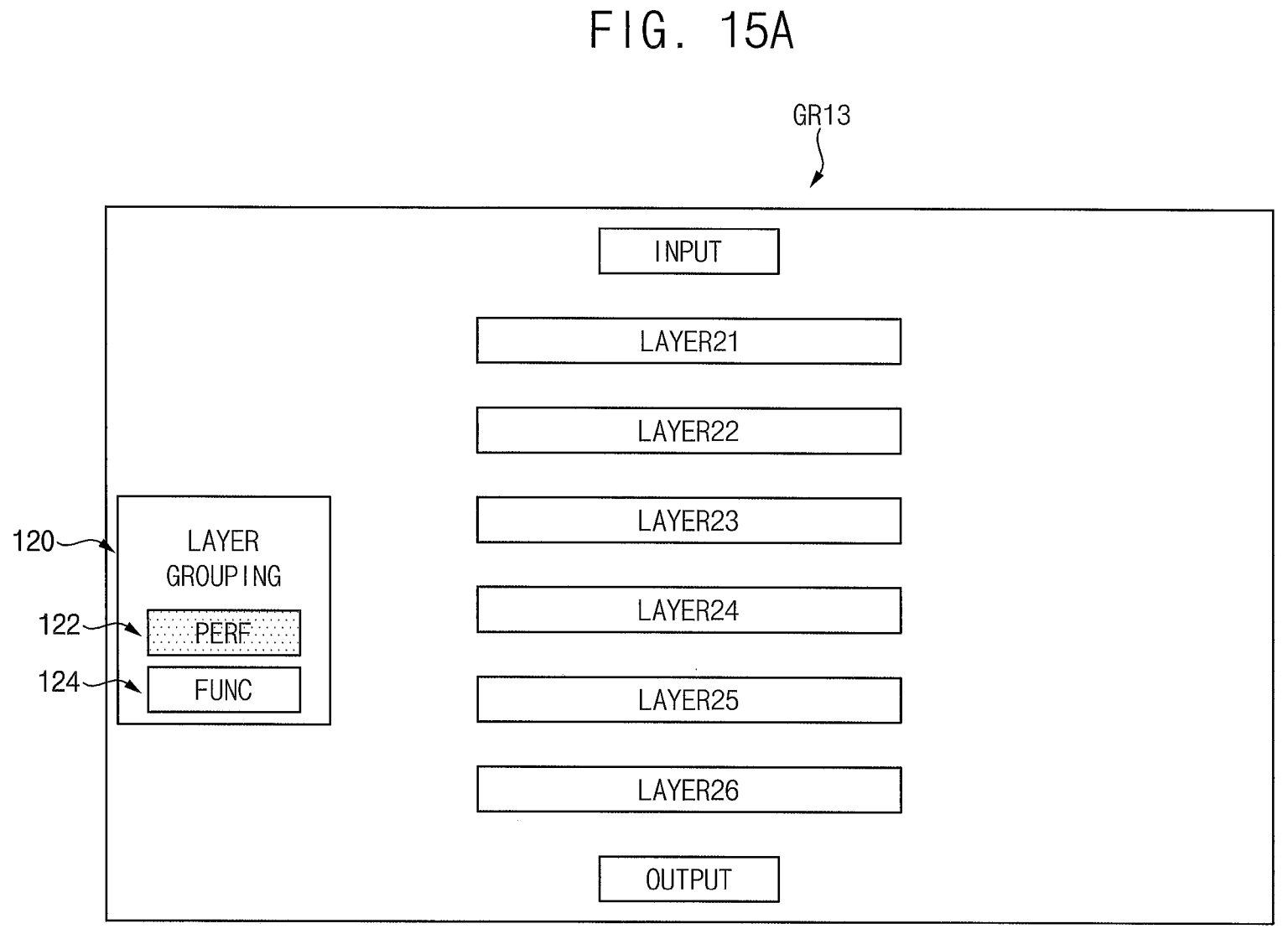

For example, as illustrated in FIG. 15A, a graphical representation GR13, which includes a network structure of a plurality of compressed layers LAYER21, LAYER22, LAYER23, LAYER24, LAYER25 and LAYER26 between an input and an output of the second neural network model, may be displayed by step S310. In other words, the network structure may be displayed by units of layers without grouping.

Figure 15B:
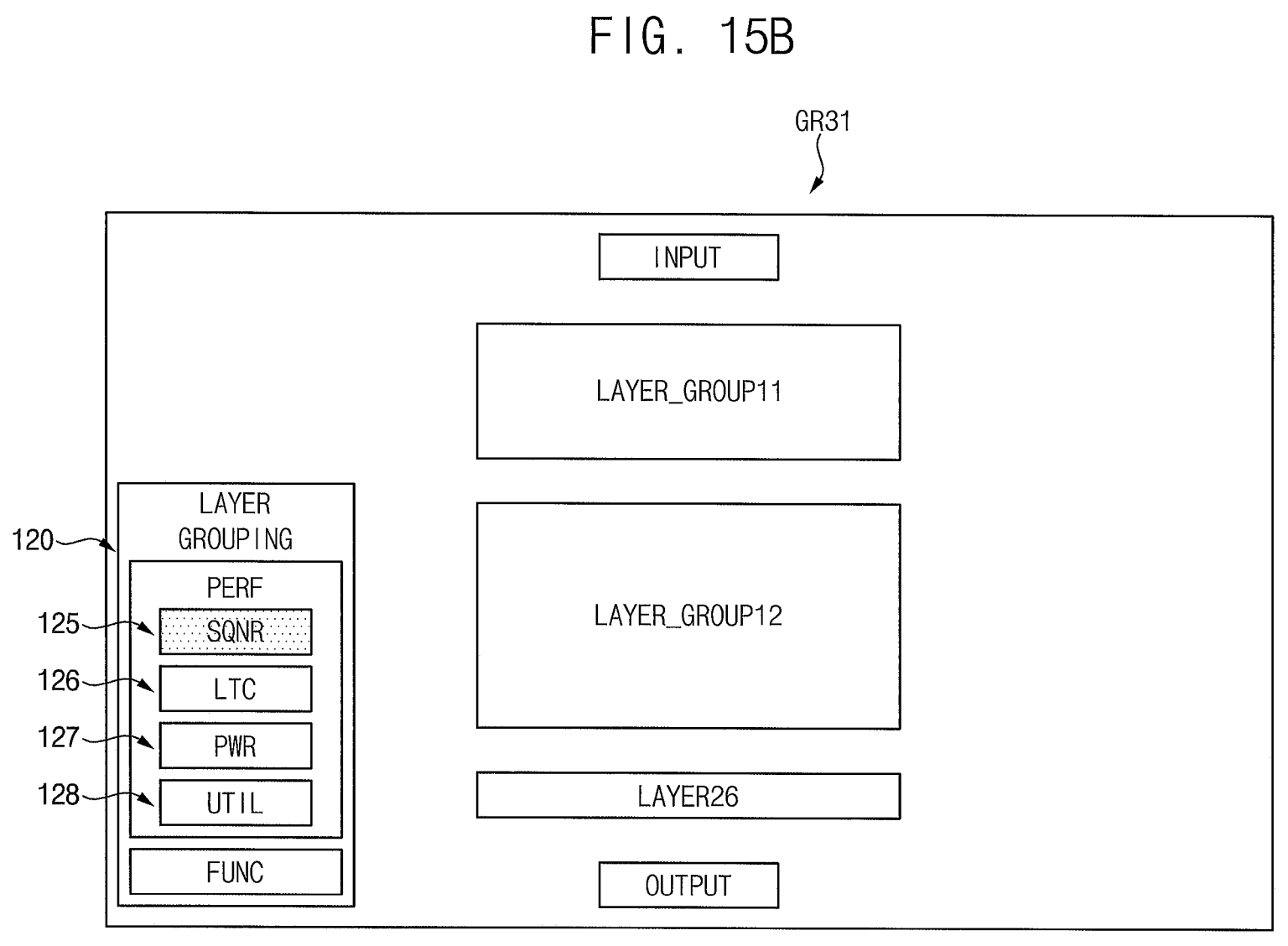
Figure 15D:
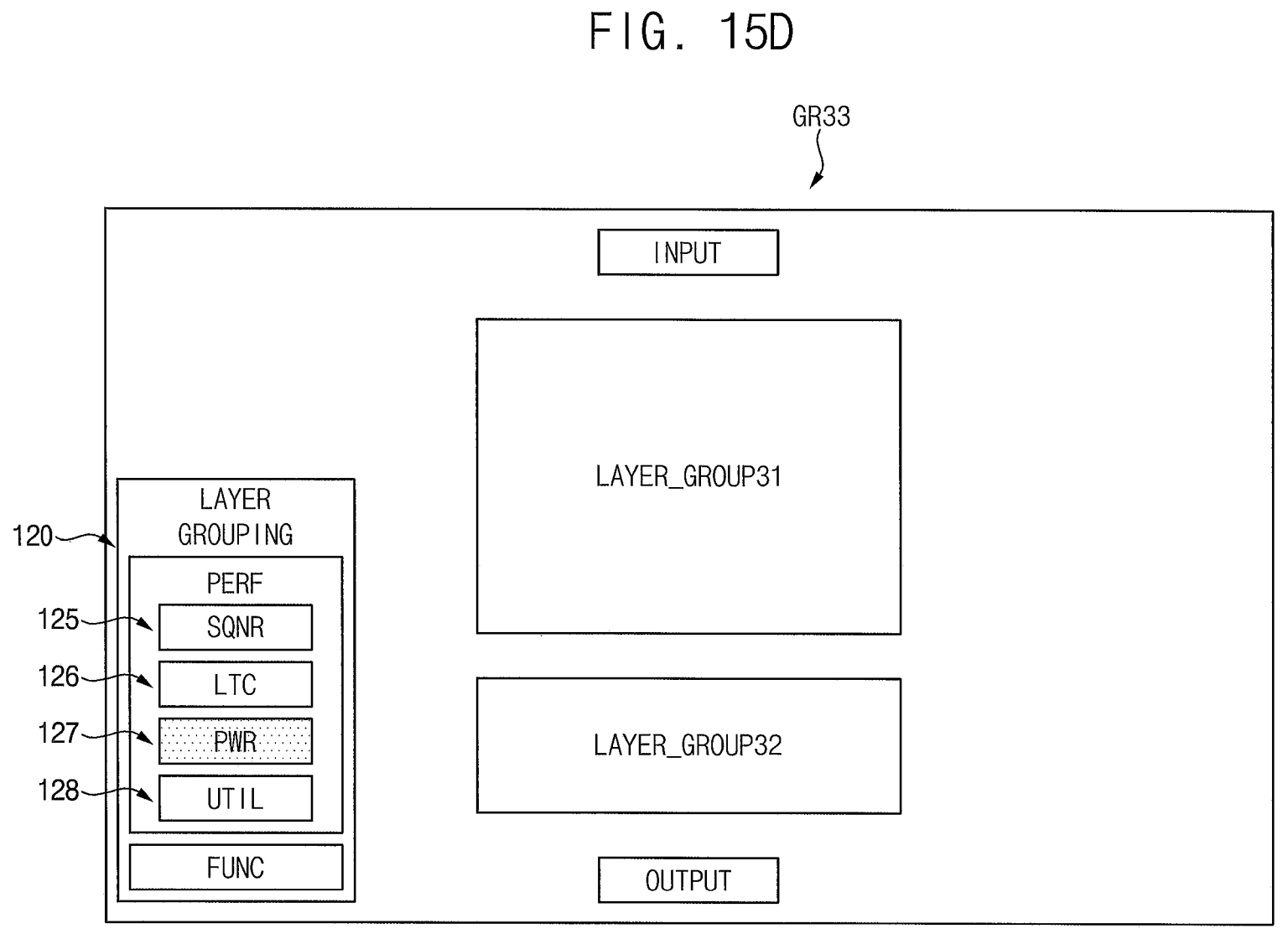

As illustrated in FIGS. 15A, 15B, 15C and 15D, the reference value may be selected and/or changed by step S325 by selecting one of buttons 122, 124, 125, 126, 127 and 128 included in a menu 120 included in graphical representations GR13, GR31, GR32 and GR33. As illustrated in FIGS. 15B, 15C and 15D, the plurality of compressed layers LAYER21 to LAYER26 may be automatically grouped, e.g., based on the reference value, and the graphical representations GR31, GR32 and GR33 including compressed layer groups may be displayed by step S330.

In the example of FIGS. 15A and 15B, the reference value associated with the SQNR may be selected by selecting the buttons 122 and 125, and the graphical representation GR31, which includes compressed layer groups LAYER_GROUP11 and LAYER_GROUP12 and the compressed layer LAYER26, may be displayed based on the reference value associated with the SQNR. For example, the compressed layer group LAYER_GROUP11 may include the compressed layers LAYER21 and LAYER22, and the compressed layer group LAYER_GROUP12 may include the compressed layers LAYER23 to LAYER25.

In some example embodiments, the compressed layer LAYER26 that are not included in the compressed layer groups LAYER_GROUP11 and LAYER_GROUP12 in the graphical representation GR31 may indicate a compressed layer that does not satisfy a predetermined criterion (e.g., the performance criterion of the SQNR).

In the example of FIGS. 15A and 15C, the reference value associated with the latency may be selected by selecting the buttons 122 and 126, and the graphical representation GR32, which includes compressed layer groups LAYER_GROUP21, LAYER_GROUP22 and LAYER_GROUP23 may be displayed based on the reference value associated with the latency. For example, the compressed layer group LAYER_GROUP21 may include the compressed layers LAYER21 and LAYER22, the compressed layer group LAYER_GROUP22 may include the compressed layers LAYER23 and LAYER24, and the compressed layer group LAYER_GROUP23 may include the compressed layers LAYER25 and LAYER26. In some example embodiments, as described with reference to FIG. 15B, a compressed layer that does not satisfy a predetermined criterion (e.g., the performance criterion of the latency) may be displayed by units of layers without being grouped.

In the example of FIGS. 15A and 15D, the reference value associated with the power consumption may be selected by selecting the buttons 122 and 127, and the graphical representation GR33, which includes compressed layer groups LAYER_GROUP31 and LAYER_GROUP32 may be displayed based on the reference value associated with the power consumption. For example, the compressed layer group LAYER_GROUP31 may include the compressed layers LAYER21 to LAYER24, and the compressed layer group LAYER_GROUP32 may include the compressed layers LAYER25 and LAYER26. In some example embodiments, as described with reference to FIG. 15B, a compressed layer that does not satisfy a predetermined criterion (e.g., the performance criterion of the power consumption) may be displayed by units of layers without being grouped.

In some example embodiments, two or more reference values may be selected, and a graphical representation based on two or more reference values may be different from the graphical representation based on one reference value. For example, when two or more reference values are selected, layers to be highlighted depending on different reference values may be displayed by different schemes (e.g., with different colors).

Figure 16:
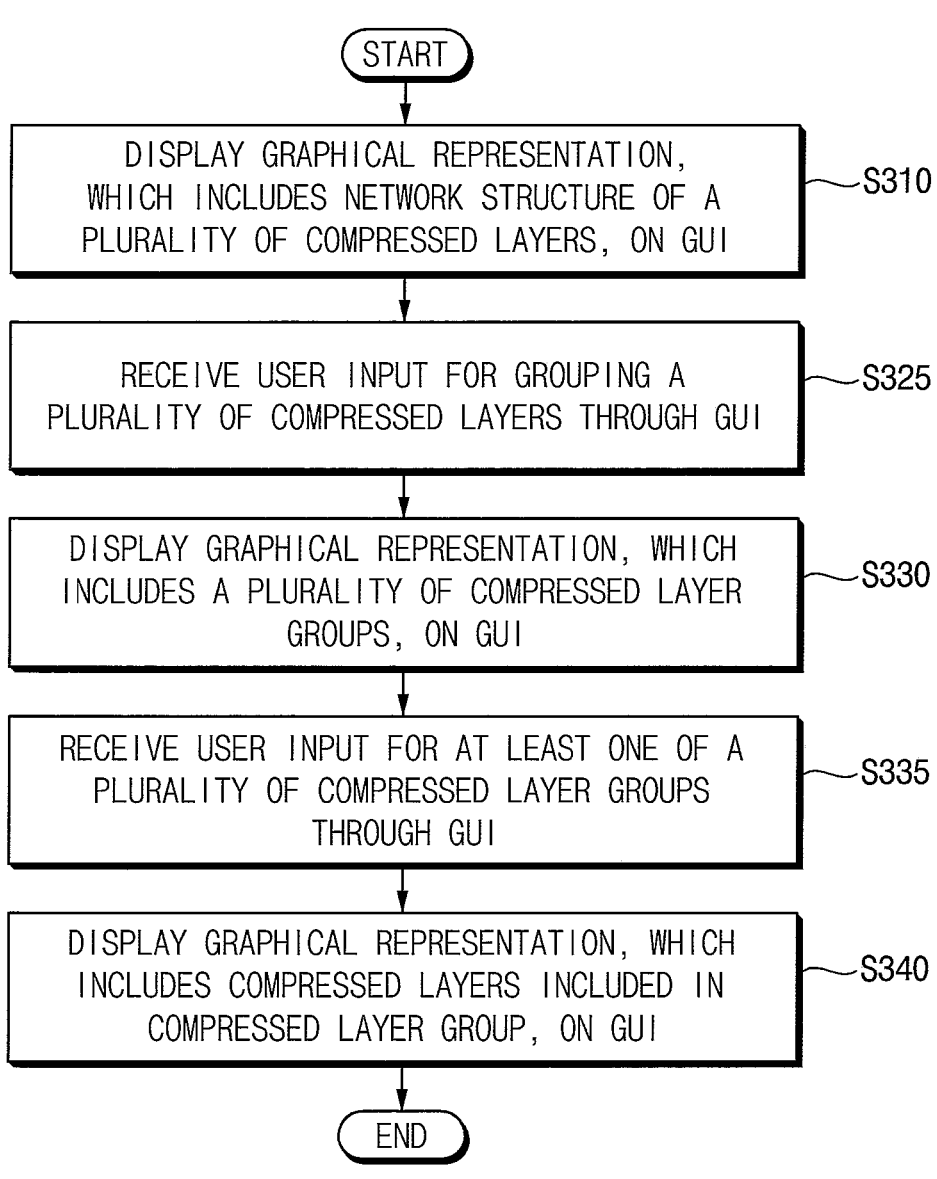
FIG. 16 is a flowchart illustrating an example of displaying a result of a compression in FIG. 7.
Figure 17:
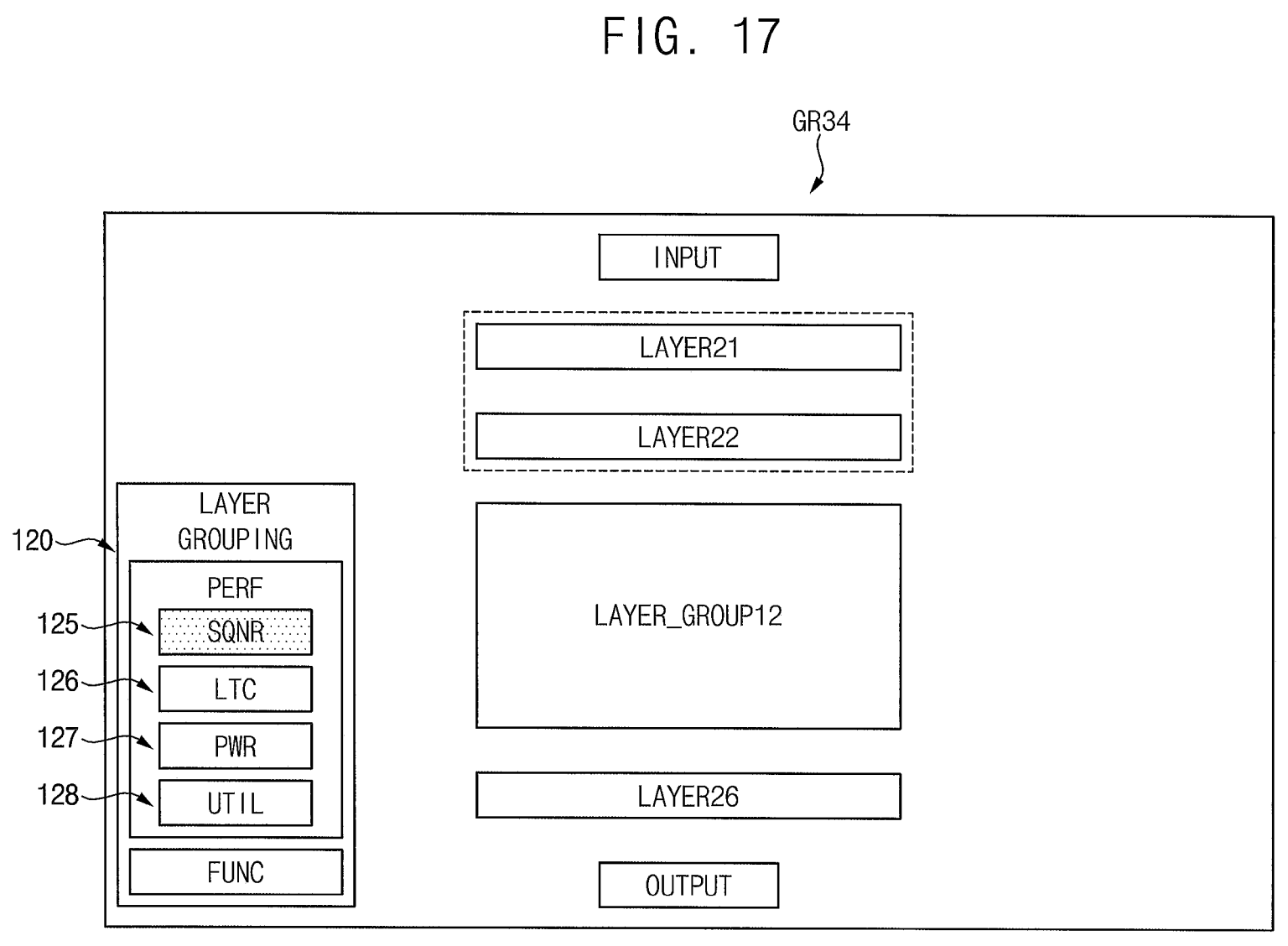

FIG. 16 is a flowchart illustrating an example of displaying a result of a compression in FIG. 7. FIG. 17 is a diagram for describing an example of an operation of FIG. 16. The descriptions repeated with FIGS. 8, 9A, 9B, 14, 15A, 15B, 15C and 15D will be omitted.

Referring to FIGS. 7, 16 and 17, when displaying the result of the compression on the GUI (step S300a), steps S310, S325, S330, S335, and S340 in FIG. 16 may be performed. Steps S310, S325 and S330 in FIG. 16 may be substantially the same as steps S310, S325 and S330 in FIG. 14, respectively.

A user input for at least one of the plurality of compressed layer groups may be received from the graphic user interface (step S335). A graphical representation, which includes compressed layers included in the at least one compressed layer group, may be displayed on the GUI (step S340). Step S340 may be performed based on the user input received in step S335.

For example, the graphical representation GR13 of FIG. 15A may be displayed by step S310, and the graphical representation GR31 of FIG. 15B may be displayed by steps S325 and S330. After that, a user input for the compressed layer group LAYER_GROUP11 may be received by step S335. A graphical representation GR34 of FIG. 17, which includes the compressed layers LAYER21 and LAYER22 in the compressed layer group LAYER_GROUP11, may be displayed as the extended form by step S340.

In some example embodiments, although not illustrated in detail, after the graphical representation GR34 of FIG. 17 is displayed, a user input for the compressed layer group LAYER_GROUP11 may be received again, and then the graphical representation GR31 of FIG. 15B may be displayed again as the reduced form. In other words, the graphical representations GR31 and GR34 of FIGS. 15B and 17 may be switchable each other as the extended or reduced form.

Figure 18:
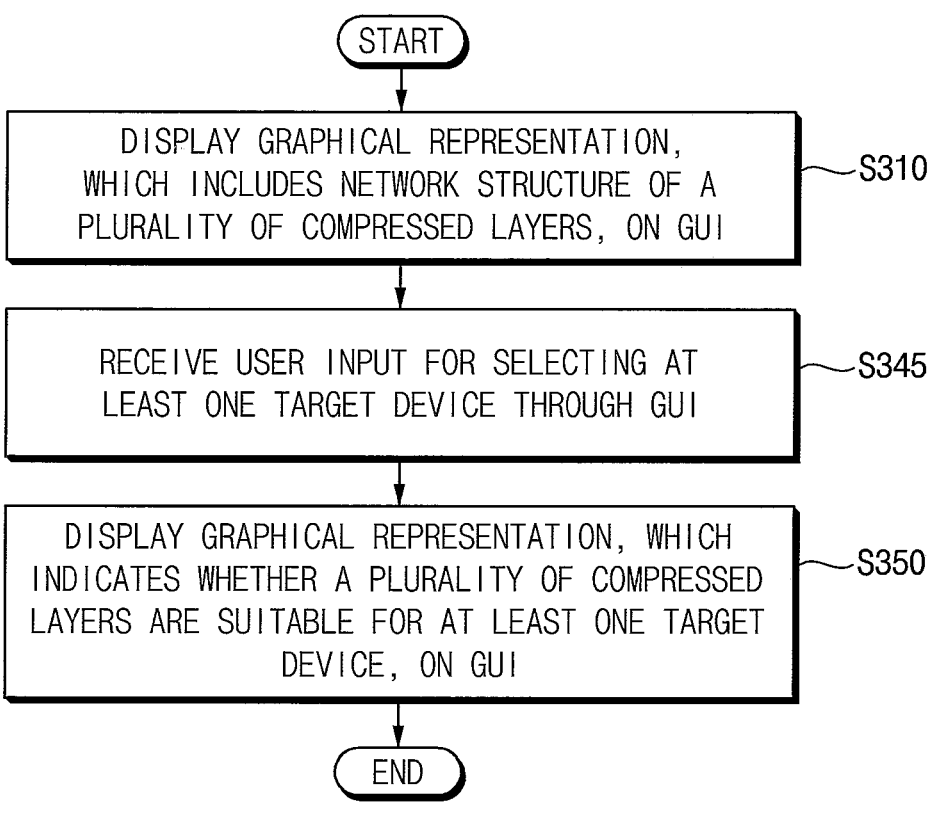
FIG. 18 is a flowchart illustrating an example of displaying a result of a compression in FIG. 7.
Figure 19A:
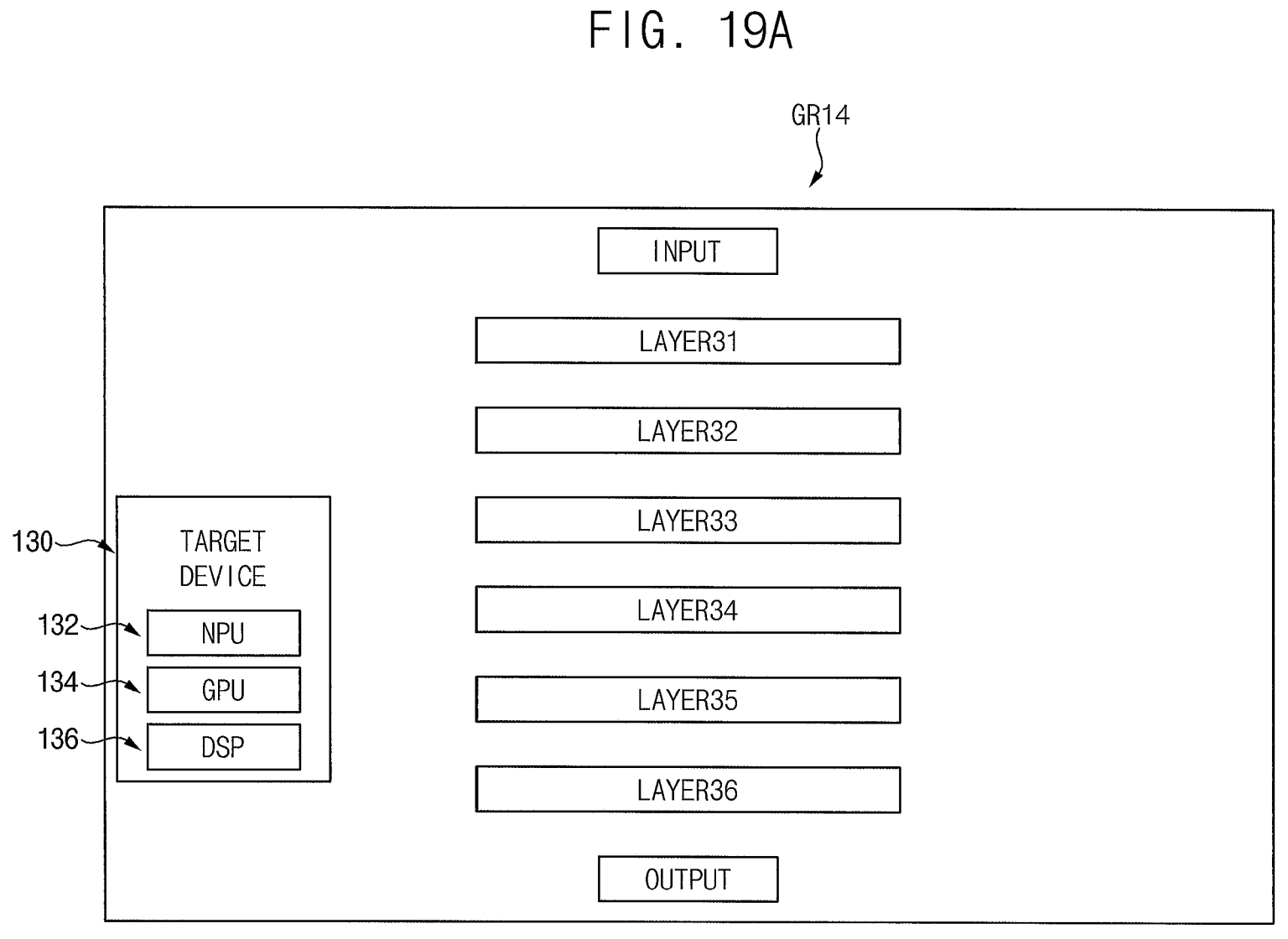
Figure 19B:
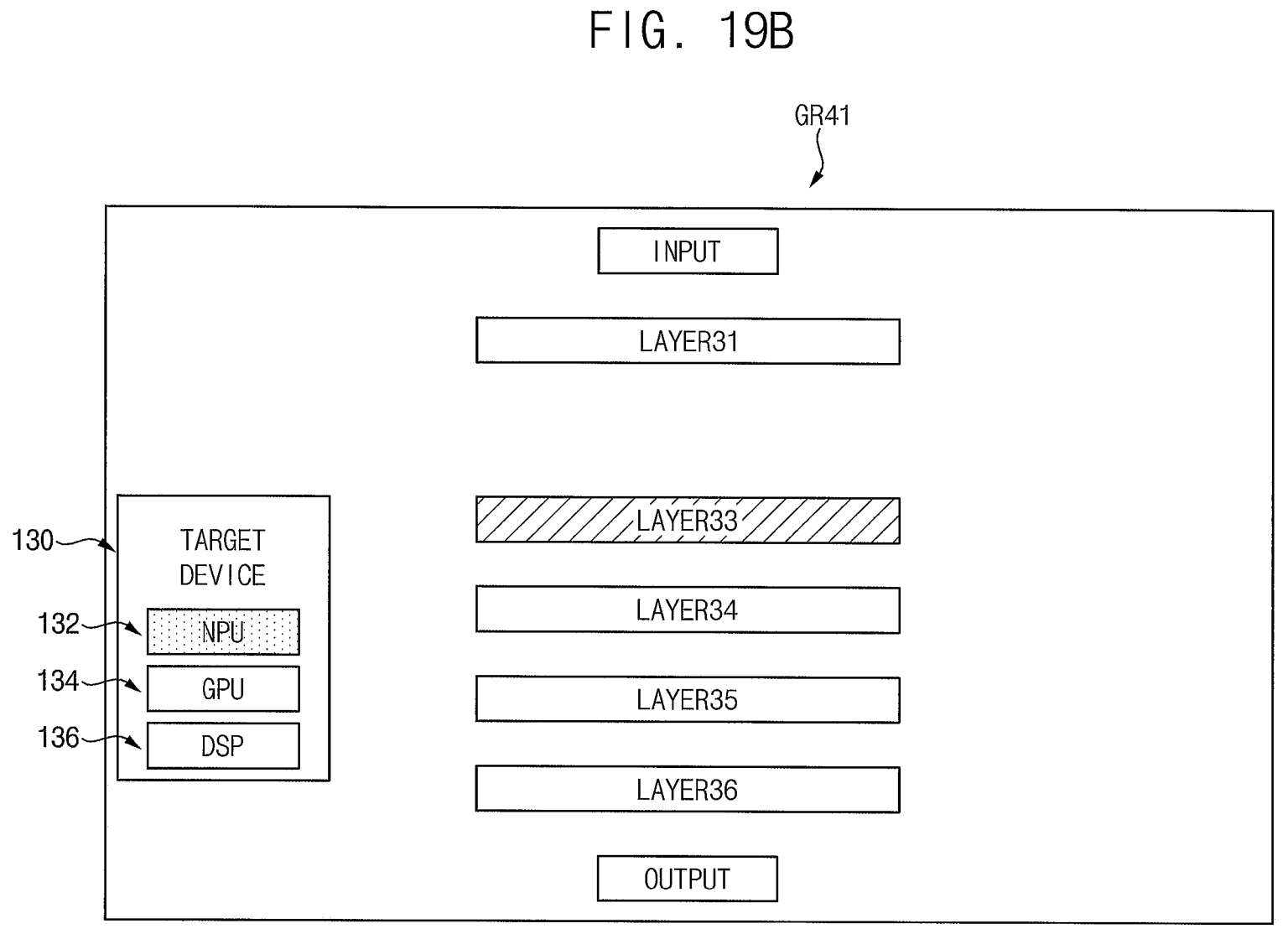
Figure 19C:
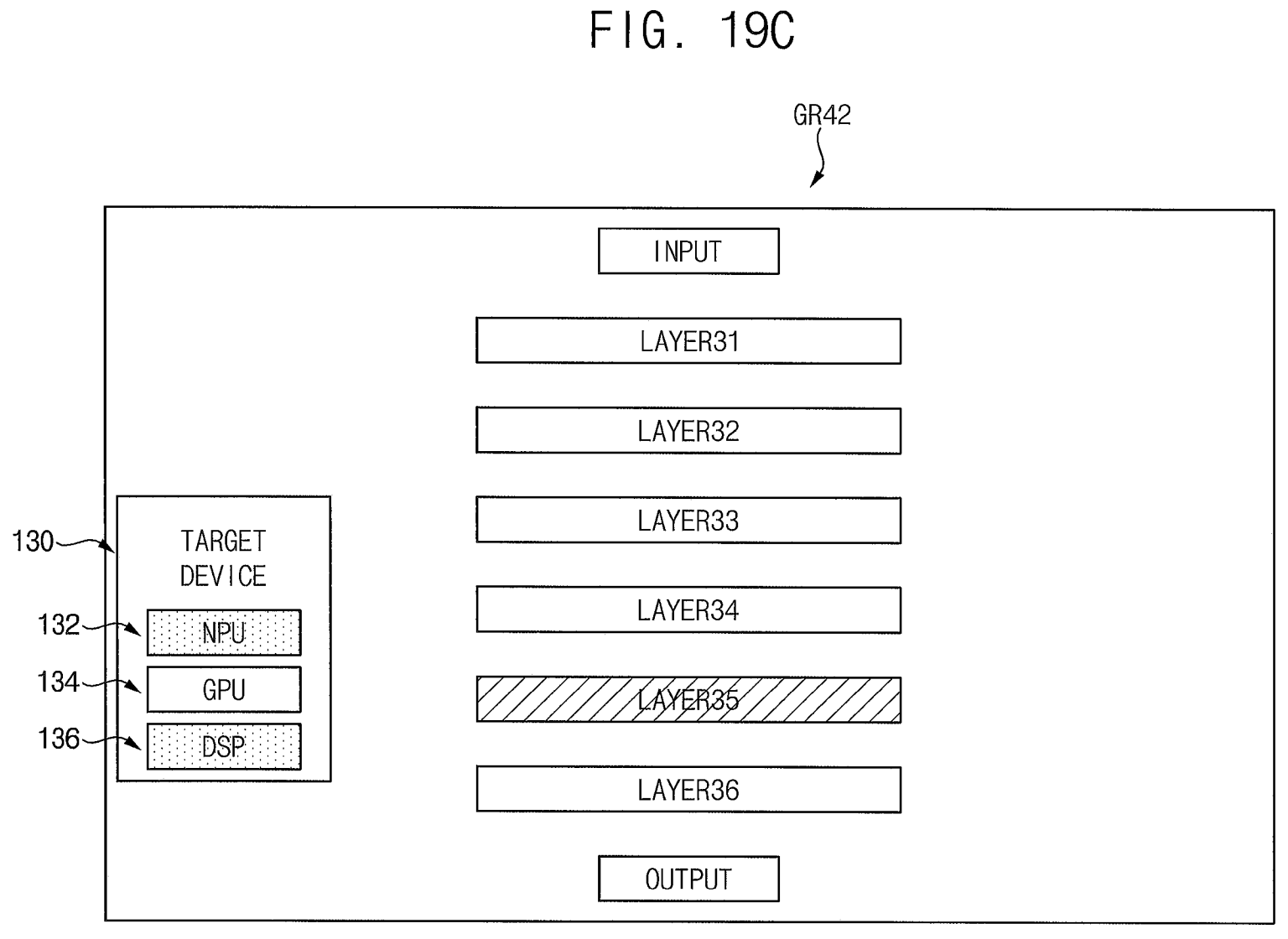

FIG. 18 is a flowchart illustrating an example of displaying a result of a compression in FIG. 7. FIGS. 19A, 19B and 19C are diagrams for describing examples of an operation of FIG. 18. The descriptions repeated with FIGS. 8, 9A and 9B will be omitted.

Referring to FIGS. 7, 18, 19A, 19B and 19C, when displaying the result of the compression on the GUI (step S300a), steps S310, S345, and S350 in FIG. 16 may be performed. Step S310 may be substantially the same as step S310 in FIG. 8.

A user input for selecting at least one target device that executes the plurality of compressed layers may be received through the GUI (step S345). For example, the at least one target device may include at least one of the CPU 510, NPU 520, GPU 530, DSP 540 and ISP 550 in FIG. 6, and may further include at least another resource. A graphical representation, which indicates whether the plurality of compressed layers are suitable or appropriate for the at least one target device, may be displayed on the GUI (step S350). Step S350 may be performed based on the user input received in step S345.

For example, as illustrated in FIG. 19A, a graphical representation GR14, which includes a network structure of a plurality of compressed layers LAYER31, LAYER32, LAYER33, LAYER34, LAYER35 and LAYER36 between an input and an output of the second neural network model, may be displayed by step S310.

As illustrated in FIGS. 19A, 19B and 19C, the target device may be selected and/or changed by step S345 by selecting one of buttons 132, 134 and 136 included in a menu 130 included in graphical representations GR14, GR41 and GR42. As illustrated in FIGS. 19B and 19C, the graphical representations GR41 and GR42, each of which indicates whether the plurality of compressed layers LAYER31 to LAYER36 are suitable for the selected target device, may be displayed by step S350.

In the example of FIG. 19B, the NPU may be selected as the target device by selecting the button 132, and the graphical representation GR41, which indicates whether it is suitable for the plurality of compressed layers LAYER31 to LAYER36 to be driven by the NPU, may be displayed.

In the example of FIG. 19C, the NPU and the DSP may be selected as the target devices by selecting the buttons 132 and 136, and the graphical representation GR42, which indicates whether it is suitable for the plurality of compressed layers LAYER31 to LAYER36 to be driven by the NPU and the DSP, may be displayed.

In some example embodiments, a compressed layer that is deleted or removed from a graphical representation (e.g., the compressed layer LAYER32 that is not included in the graphical representation GR41 of FIG. 19B) may indicate a compressed layer that cannot be driven by the target device (e.g., the NPU). In an example, the graphical representation GR41 of FIG. 19B may include information (e.g., text or image information) indicating that the compressed layer LAYER32 cannot be driven by the target device and thus is deleted. In addition, a compressed layer that is displayed in a different manner than other compressed layers in a graphical representation (e.g., the hatched compressed layer LAYER33 in the graphical representation GR41 of FIG. 19B and the hatched compressed layer LAYER35 in the graphical representation GR42 of FIG. 19C) may indicate a compressed layer that is not suitable for the target device. The graphical representation G41 of FIG. 19B or the graphical representation GR42 of FIG. 19C may include information (e.g., text or image information) that the hatched compression layer LAYER33 or LAYER 35 is not suitable for the target device.

In some example embodiments, a change of a layer that cannot be driven by the target device or is not suitable for the target device may be adopted or proposed. For example, based on the change that would optimize the performance of the neural network model with respect to the target device, the layer may be automatically changed and the changed layer may be displayed, and/or a changeable layer may be displayed as guideline information to the user. In some example embodiments, a first layer that cannot be driven by the target device or is not suitable for the target device may be displayed in a different display manner (e.g., hatched) and when a user selects the first layer, at least one candidate layer to which the first layer may change may be displayed selectable by a user operation. For example, the change of the layer may be proposed based on a scheme that is predetermined based on the target device, or may be proposed by predicting the processing time of the selected layer using the reinforcement learning based on the target device. Since the neural network model is changed based on the selected target device, the neural network model may be changed to suitable for the target device and/or system to be used, and the changed model may be easily compared with the original model by the user. For another example, a change of a target device may be proposed so that the changed target device may be suitable for the plurality of compressed layers.

However, example embodiments are not limited thereto, and a change of a layer group may be proposed and performed as well as a change of a layer.

In some example embodiments, step S320 in FIG. 10 and/or steps S315 and S320 in FIG. 12 may be additionally performed in each of the examples of FIGS. 14, 16 and 18. In some example embodiments, steps S325 and S330 in FIG. 14 may be additionally performed in the example of FIG. 16. In some example embodiments, steps S325, S330, S335 and S340 in FIG. 16 may be additionally performed in the example of FIG. 14.

Figure 20:
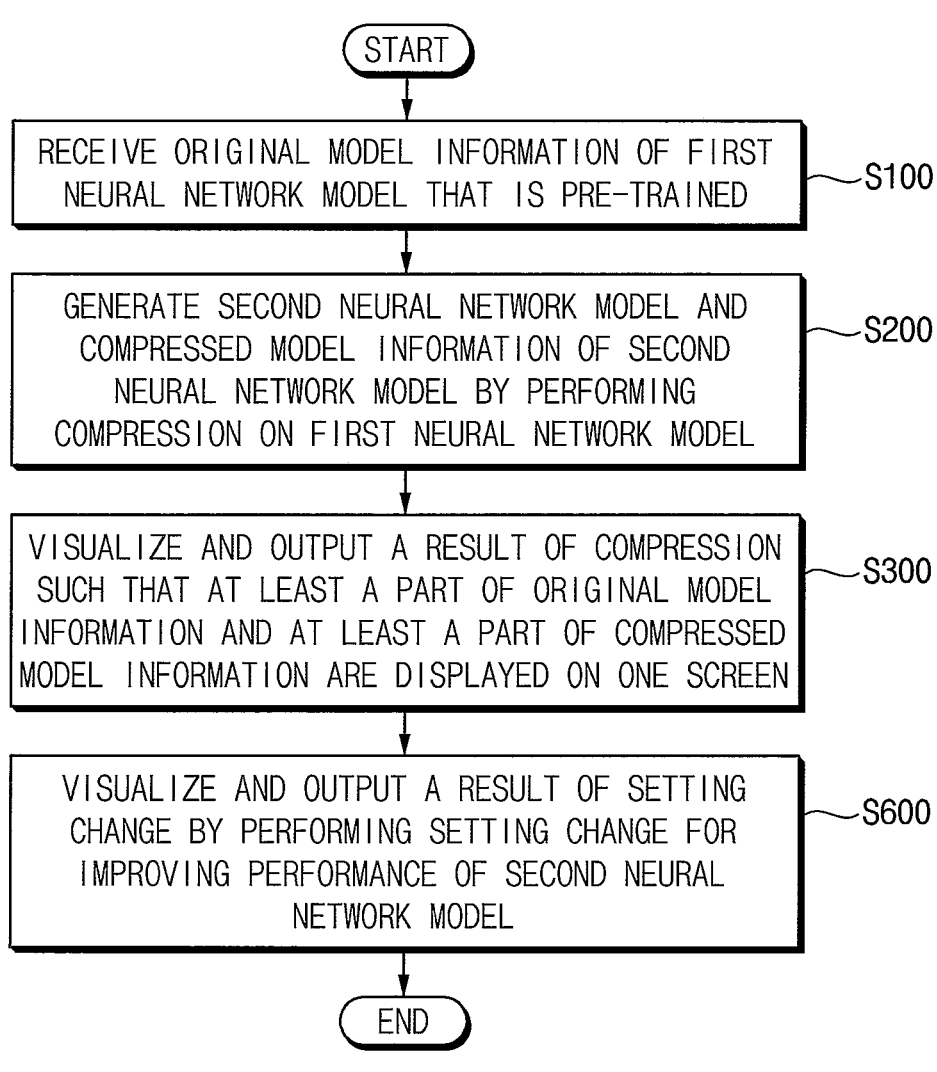
FIG. 20 is a flowchart illustrating a method of optimizing a neural network model according to example embodiments.

FIG. 20 is a flowchart illustrating a method of optimizing a neural network model according to example embodiments. The descriptions repeated with FIG. 1 will be omitted.

Referring to FIG. 20, in a method of optimizing a neural network model according to example embodiments, steps S100, S200 and S300 in FIG. 20 may be substantially the same as steps S100, S200 and S300 in FIG. 1, respectively.

A setting may be changed for improving performance of the second neural network model and a result of changing the setting may be visualized and output (step S600). For example, as with step S300, step S600 may be performed using the GUI.

FIG. 21 is a flowchart illustrating an example of a method of optimizing a neural network model of FIG. 20. The descriptions repeated with FIGS. 7 and 20 will be omitted.

Referring to FIG. 21, in the method of optimizing the neural network model according to example embodiments, steps S500, S100a, S200 and S300a in FIG. 21 may be substantially the same as steps S500, S100a, S200 and S300a in FIG. 7, respectively.

The result of the setting change is displayed on the GUI by performing the setting change for improving the performance of the second neural network model (step S600a). Step S600a may be similar to step S600 in FIG. 20.

Figure 22:
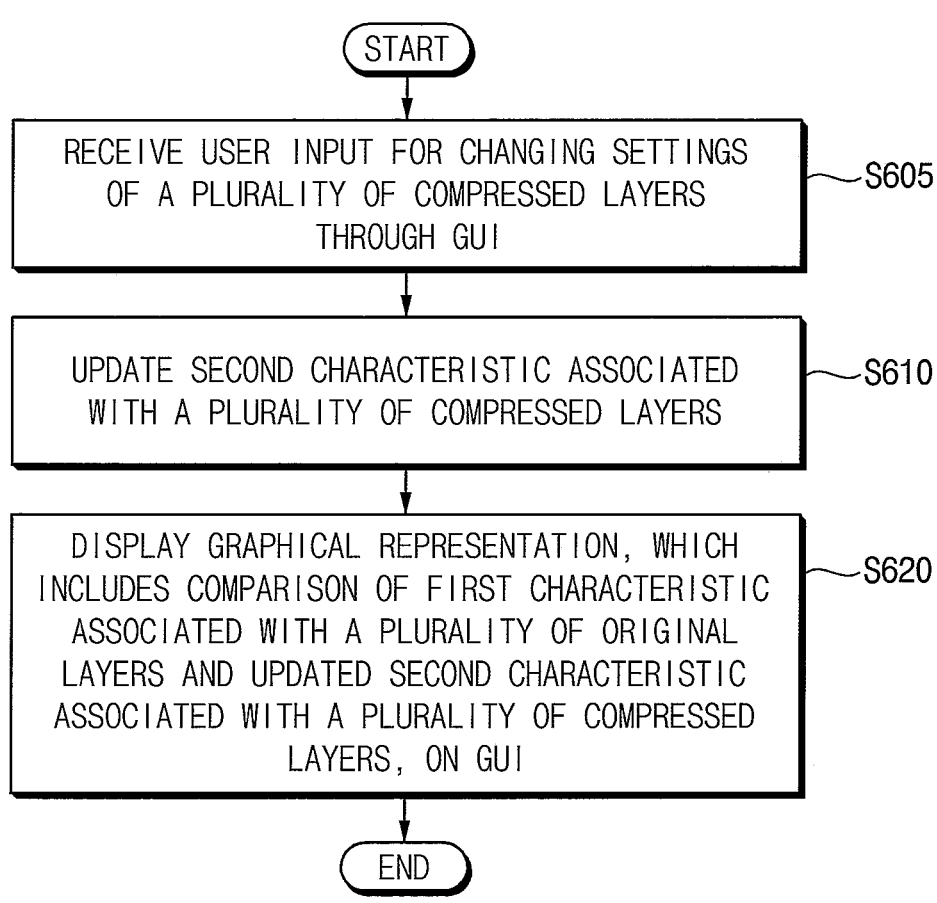
FIG. 22 is a flowchart illustrating an example of displaying a result of a setting change in FIG. 21.
Figure 23A:
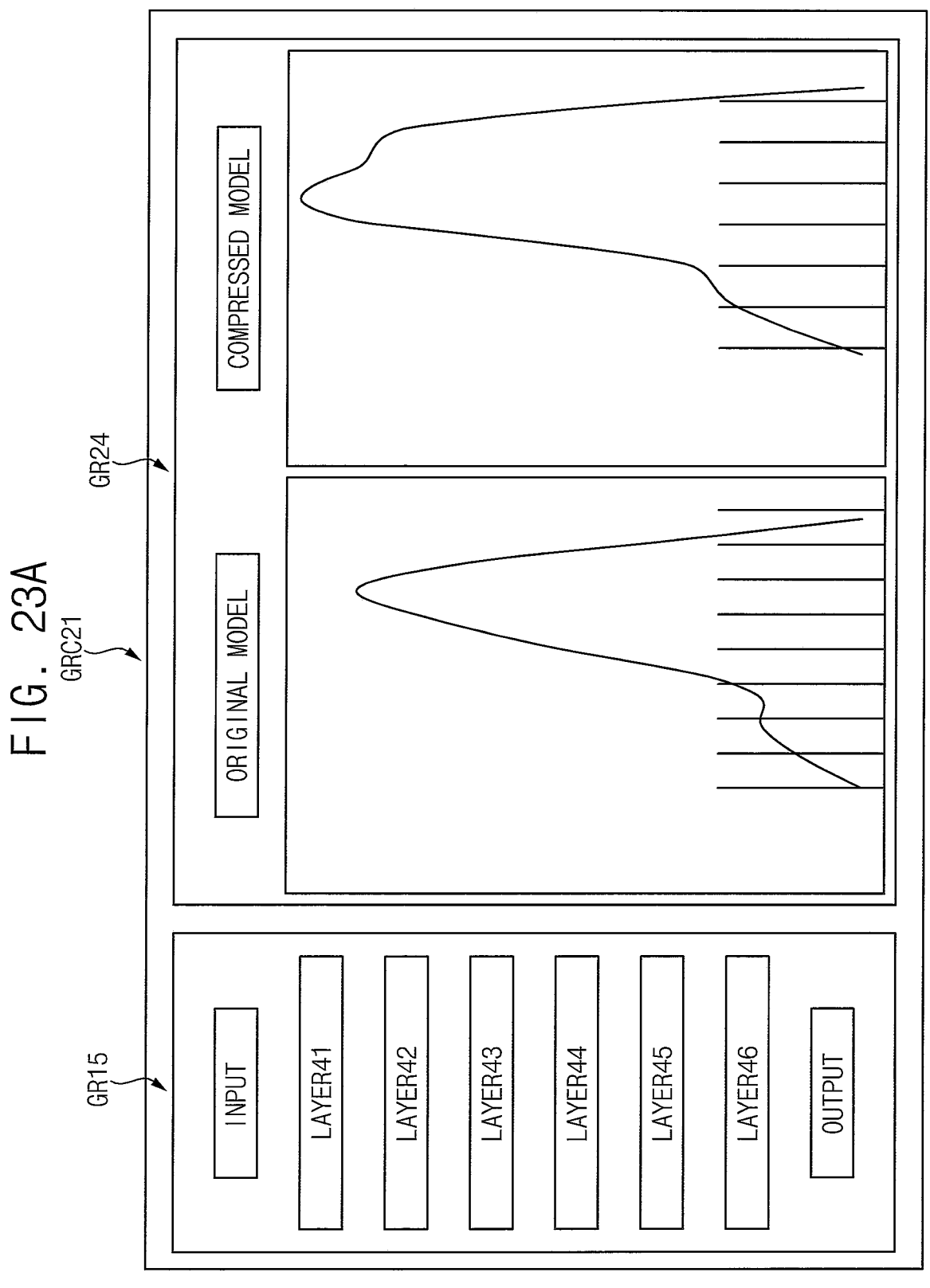
FIGS. 23A, 23B and 23C are diagrams for describing examples of an operation of FIG. 22.
Figure 23B:
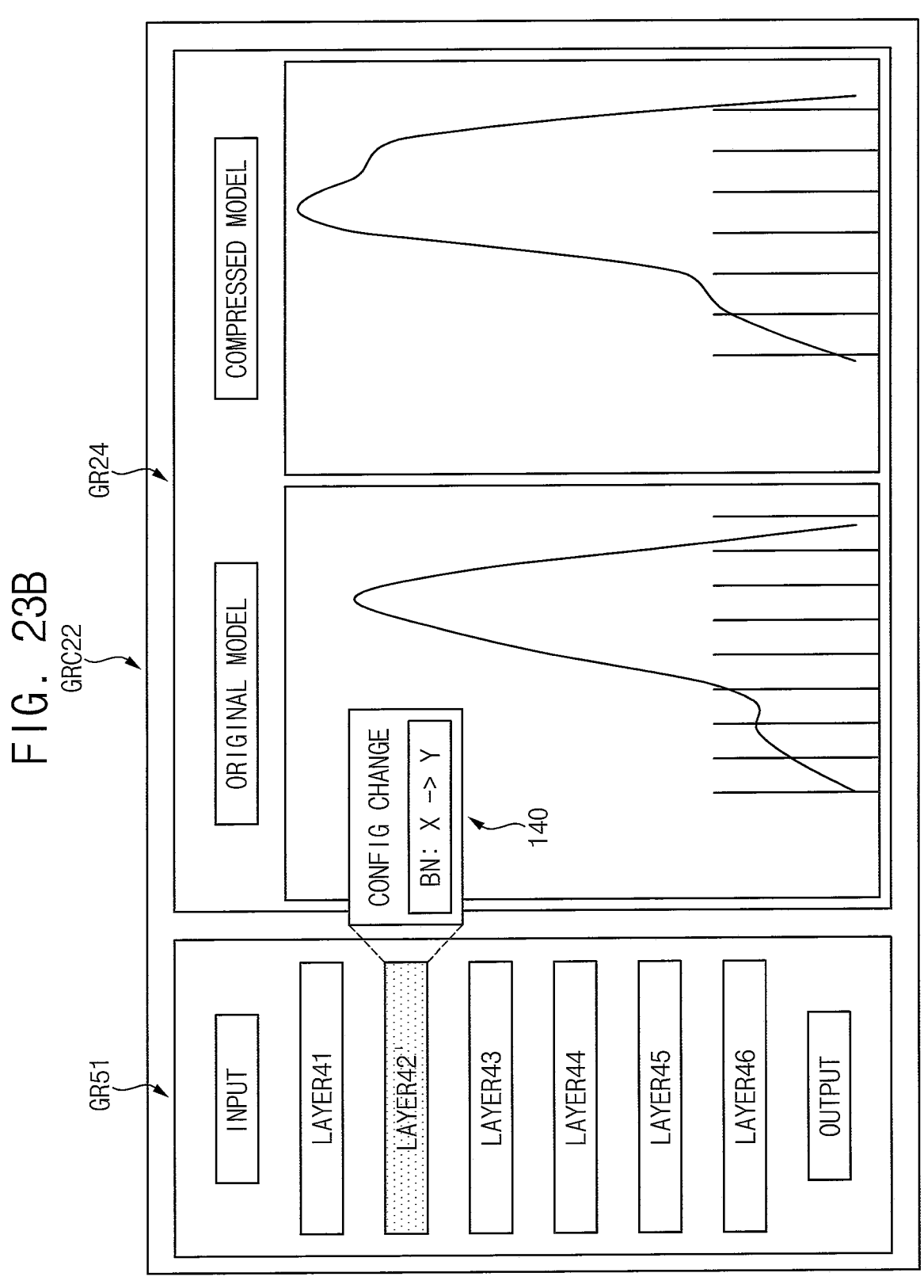
Figure 23C:
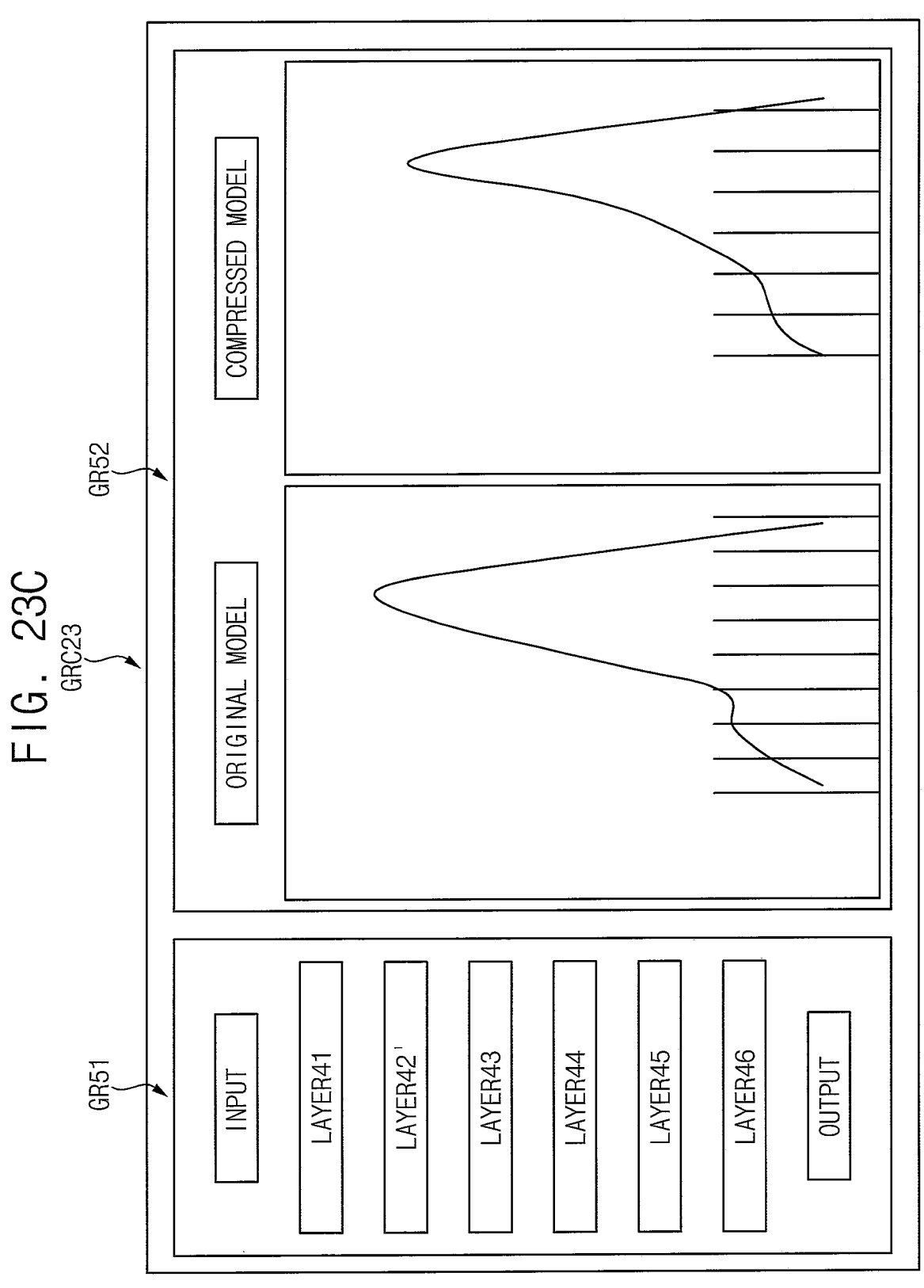

FIG. 22 is a flowchart illustrating an example of displaying a result of a setting change in FIG. 21. FIGS. 23A, 23B and 23C are diagrams for describing examples of an operation of FIG. 22. The descriptions repeated with FIGS. 8, 9A, 9B, 10, 11A, 11B, 11C, 12 and 13 will be omitted.

Referring to FIGS. 21, 22, 23A, 23B and 23C, when displaying the result of the setting change on the GUI (step S600a), a user input for changing settings of the plurality of compressed layers may be received through the GUI (step S605). The second characteristic associated with the plurality of compressed layers may be updated (step S610). Step S610 may be performed based on the user input received in step S605.

A graphical representation, which includes a comparison of the first characteristic associated with the plurality of original layers and the updated second characteristic associated with the plurality of compressed layers, may be displayed on the GUI (step S620). Step S620 may be similar to step S320 in FIG. 10.

For example, as illustrated in FIG. 23A, a graphical representation GRC21 in which a first graphical representation GR15 and a second graphical representation GR24 are combined may be displayed before step S600a is performed. The first graphical representation GR15 may include a network structure of a plurality of compressed layers LAYER41, LAYER42, LAYER43, LAYER44, LAYER45 and LAYER46 between an input and an output of the second neural network model. The second graphical representation GR24 may include a distribution characteristic of the plurality of original layers corresponding to the original model information and a distribution characteristic of the plurality of compressed layers corresponding to the compressed model information.

As illustrated in FIG. 23B, a menu 140 is included in a graphical representation GRC22 in which a first graphical representation GR15 and a second graphical representation GR24 are combined, and based on a user input through the menu 140, a compressed layer LAYER42' in which a setting is changed may be formed and/or provided by step S605 by performing a setting change on the compressed layer LAYER42. For example, the number of bits BN of an input and/or output of the compressed layer LAYER42 may be changed from X to Y, where each of X and Y is an integer greater than or equal to one.

In some example embodiments, the setting change may be performed when it is determined that the performance of the second neural network model obtained as the result of the compression is lower than the performance of the first neural network model before the compression. For example, the setting change may be performed when the distribution characteristic of the compressed layer is worse than the distribution characteristic of the original layer as illustrated in the second graphical representation GR24.

As illustrated in FIG. 23C, a characteristic update may be performed by step S610; a second graphical representation GR52, which includes the distribution characteristic of the plurality of original layers and the updated distribution characteristic of the plurality of compressed layers, may be displayed by step S620; and a graphical representation GRC23 in which the first graphical representation GR51 and the second graphical representation GR52 are combined may be displayed. For example, when the compressed layer LAYER42' in which the setting is changed is used or applied, the updated distribution characteristic of the compressed layer may become better than the distribution characteristic of the original layer.

As described above, the improvements and effects of the performance of the neural network model may be immediately applied and checked based on real-time interaction. In other words, the information required by the user may be displayed through the real-time interaction. For example, the required information may include feature-map distribution, SQNR, signal-to-noise ratio (SNR), MAC count values, OP count values, or the like. Therefore, the development time for the neural network model may be shortened, more detailed results may be checked, and the user may efficiently design while checking the expected performance of the neural network model for each device.

FIG. 24 is a flowchart illustrating a method of optimizing a neural network model according to example embodiments. The descriptions repeated with FIG. 1 will be omitted.

Referring to FIG. 24, in a method of optimizing a neural network model according to example embodiments, steps S100, S200 and S300 in FIG. 24 may be substantially the same as steps S100, S200 and S300 in FIG. 1, respectively.

A result of a scoring is visualized and output by performing the scoring for determining operating efficiency of the second neural network model (step S700). For example, as with step S300, step S700 may be performed using the GUI.

Figure 25:
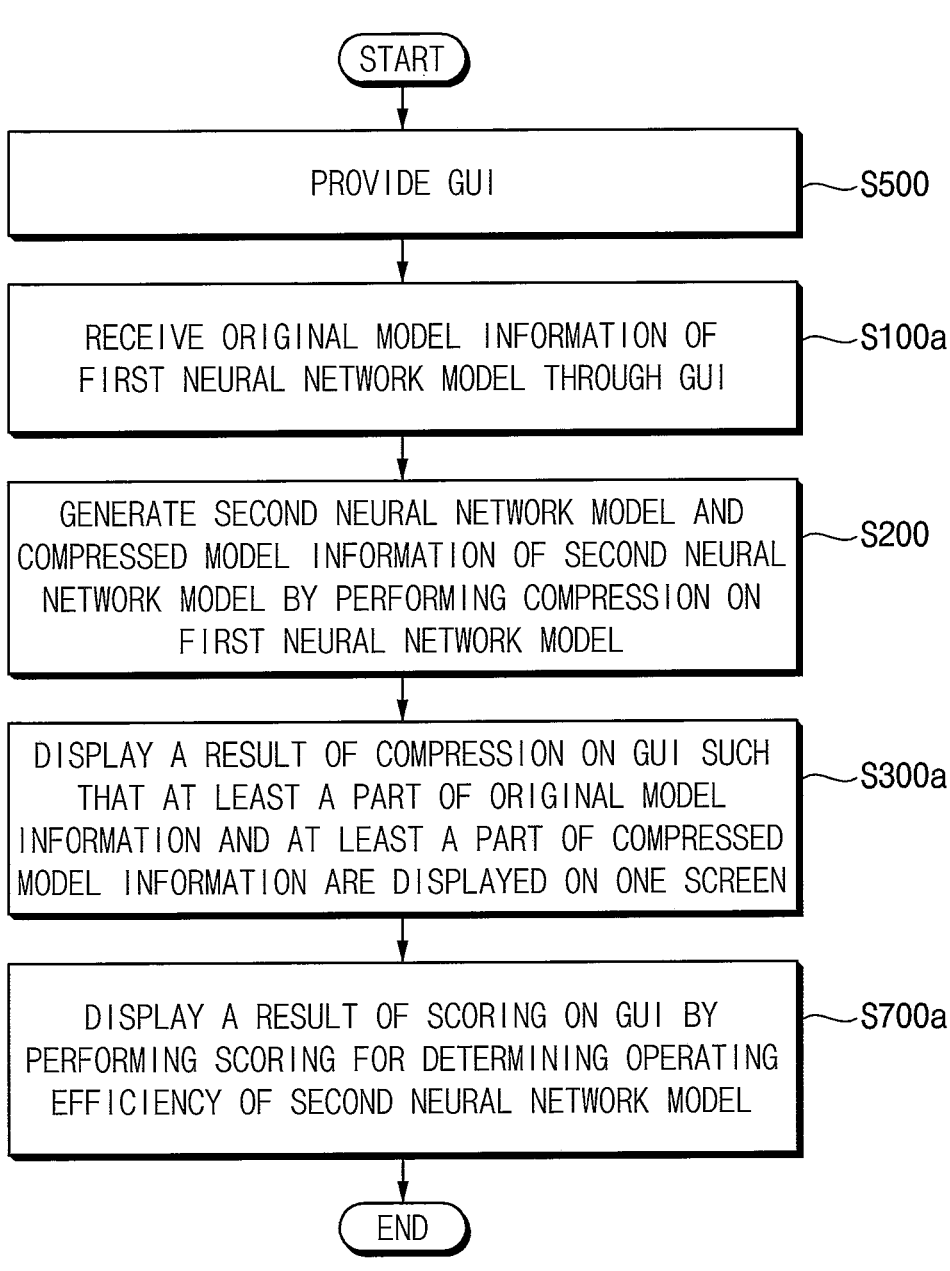
FIG. 25 is a flowchart illustrating an example of a method of optimizing a neural network model of FIG. 24.

FIG. 25 is a flowchart illustrating an example of a method of optimizing a neural network model of FIG. 24. The descriptions repeated with FIGS. 7 and 24 will be omitted.

Referring to FIG. 25, in the method of optimizing the neural network model according to example embodiments, steps S500, S100a, S200 and S300a in FIG. 25 may be substantially the same as steps S500, S100a, S200 and S300a in FIG. 7, respectively.

The result of the scoring is displayed on the GUI by performing the scoring for determining the operating efficiency of the second neural network model (step S700a). Step S700a may be similar to step S700 in FIG. 24.

Figure 26:
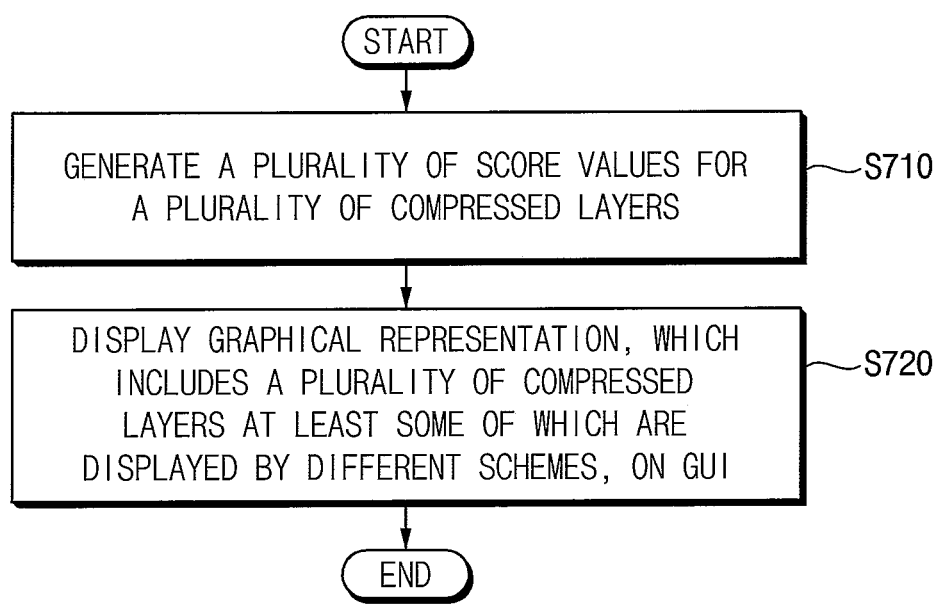
FIG. 26 is a flowchart illustrating an example of displaying a result of a scoring in FIG. 25.
Figure 27A:
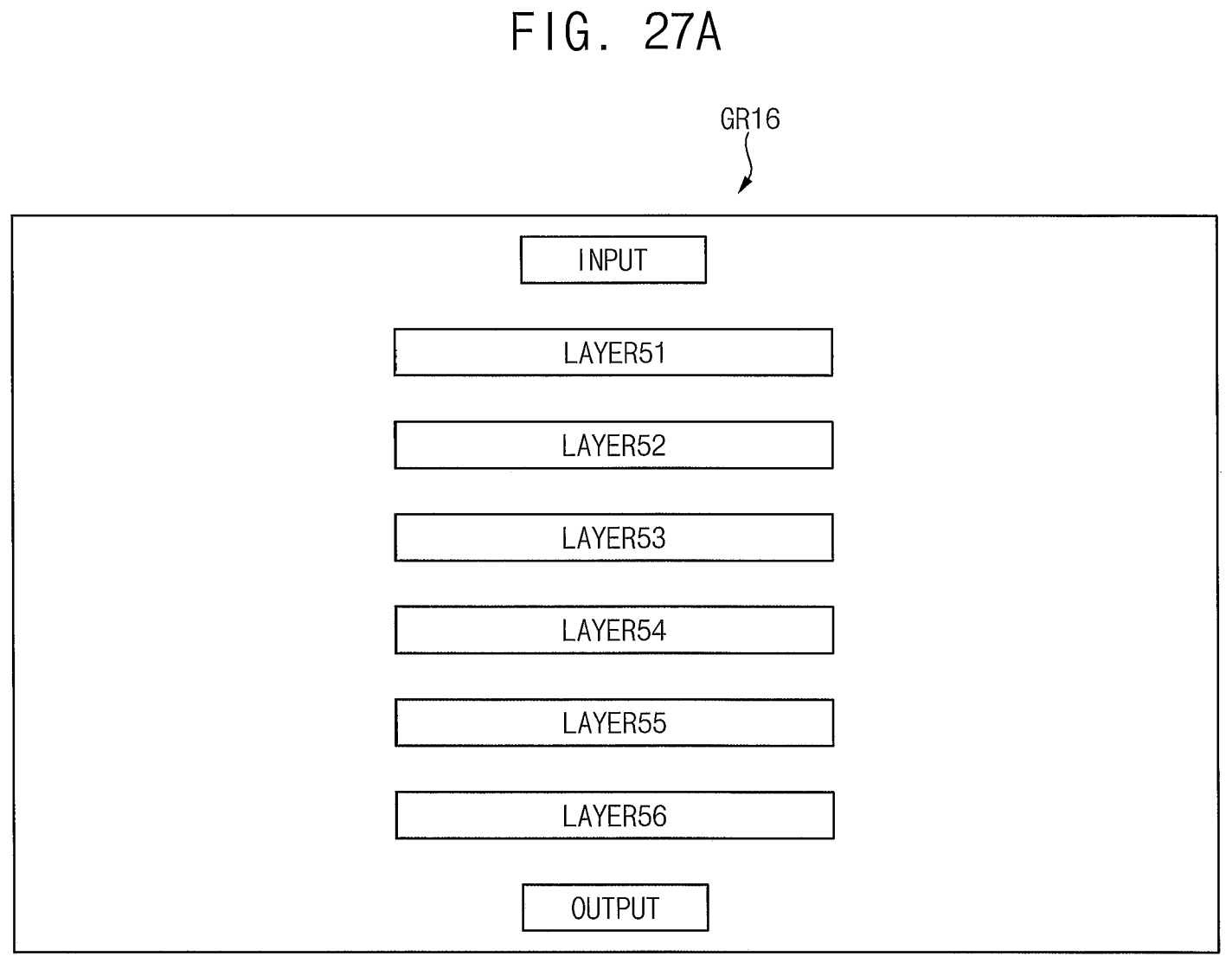
Figure 27B:
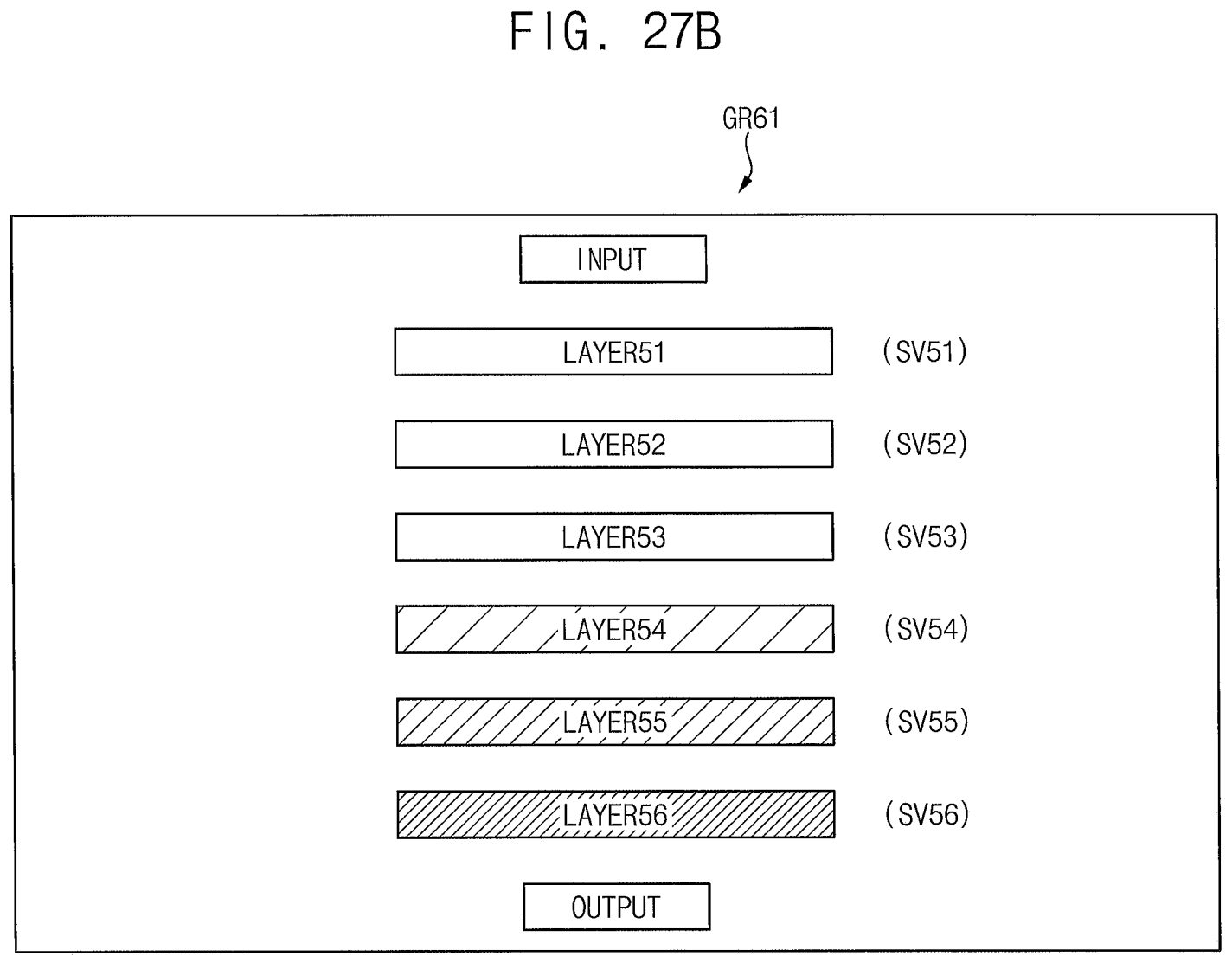

FIG. 26 is a flowchart illustrating an example of displaying a result of a scoring in FIG. 25. FIGS. 27A and 27B are diagrams for describing examples of an operation of FIG. 26. The descriptions repeated with FIGS. 8, 9A and 9B will be omitted.

Referring to FIGS. 25, 26, 27A and 27B, when displaying the result of the scoring on the GUI (step S700a), a plurality of score values for the plurality of compressed layers may be generated (step S710). A graphical representation, which includes the plurality of compressed layers at least some of which are displayed by different schemes, may be displayed on the GUI based on the plurality of score values (step S720).

For example, as illustrated in FIG. 27A, a first graphical representation GR16, which includes a network structure of a plurality of compressed layers LAYER51, LAYER52, LAYER53, LAYER54, LAYER55 and LAYER56 between an input and an output of the second neural network model, may be displayed before step S700a is performed.

As illustrated in FIG. 27B, a plurality of score values SV51, SV52, SV53, SV54, SV55 and SV56 for the plurality of compressed layers LAYER51 to LAYER56 may be generated by step S710, and a graphical representation GR61, which includes some compressed layers LAYER54 to LAYER56 displayed by different schemes based on the plurality of score values SV51 to SV56, may be displayed by step S720. In some example embodiments, the plurality of score values SV51 to SV56 may also be displayed.

In some example embodiments, a layer box that corresponds to a compressed layer having a score value greater than a reference score value may be displayed by a first scheme. A layer box that corresponds to a compressed layer having a score value less than or equal to the reference score value may be displayed by a second scheme different from the first scheme.

In some example embodiments, as illustrated in FIG. 27B, the first scheme may be implemented by displaying a layer box without any separate indication, and the second scheme may be implemented by displaying a separate indication (e.g., hatches) in a layer box. In the example of FIG. 27B, the hatched compressed layers LAYER54 to LAYER56 may indicate layers with relatively low operating efficiency, and it may indicate that the operating efficiency of the layer becomes lower as intervals of the hatches become smaller. However, example embodiments are not limited thereto, and various modifications can be made. For example, it may indicate that the operating efficiency of the layer becomes lower as a color of the layer box become darker.

In some example embodiments, the plurality of score values may be obtained based on at least one of a result of estimating compression performance of the plurality of compressed layers, a result of determining whether the plurality of compressed layers are suitable for a target device, types of the plurality of compressed layers, a result of predicting capacity of the plurality of compressed layers, and memory footprint utilization amount of the plurality of compressed layers. For example, the plurality of score values may be obtained by scoring the above-described indicators and summing the scored indicators using different weights.

In a neural network model, layers with various characteristics and a structure in which several layers are clustered may be combined to form one model. Each layer or structure may or may not be efficient for an operation of a particular device and/or system. As described above, according to example embodiments, an inefficient layer or structure may be detected by performing the scoring, and the interface for displaying the inefficient layer or structure and modifying the inefficient layer or structure by the user may be provided. Accordingly, optimized modeling and improved performance of the neural network model may be implemented.

Figure 28:
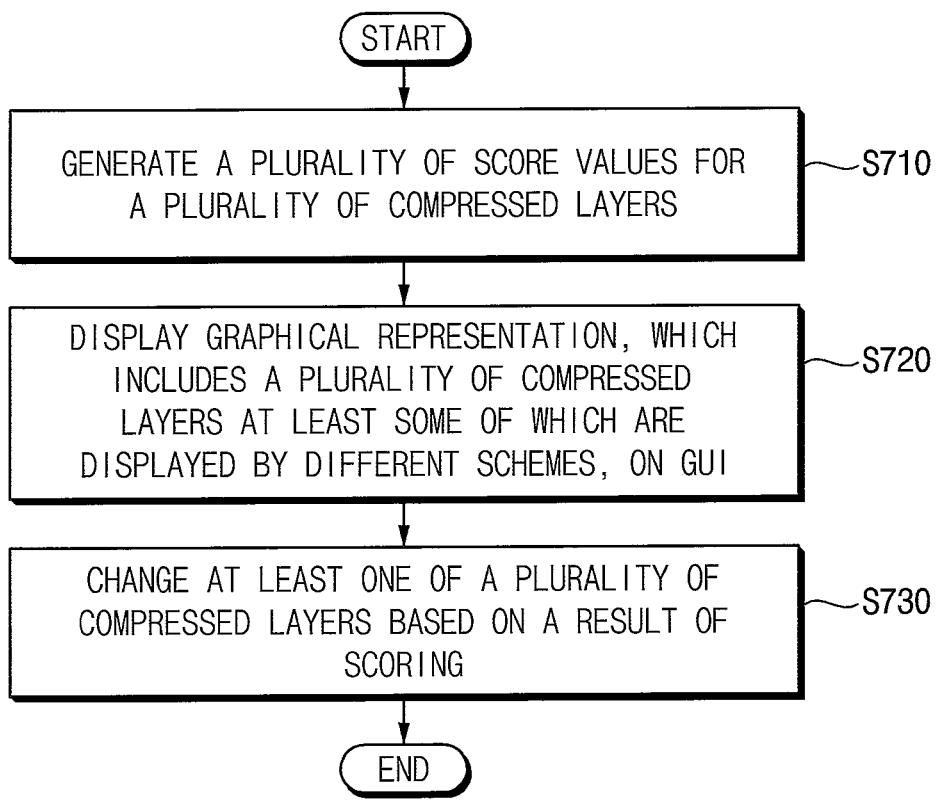
FIG. 28 is a flowchart illustrating an example of displaying a result of a scoring in FIG. 25.
Figure 29A:
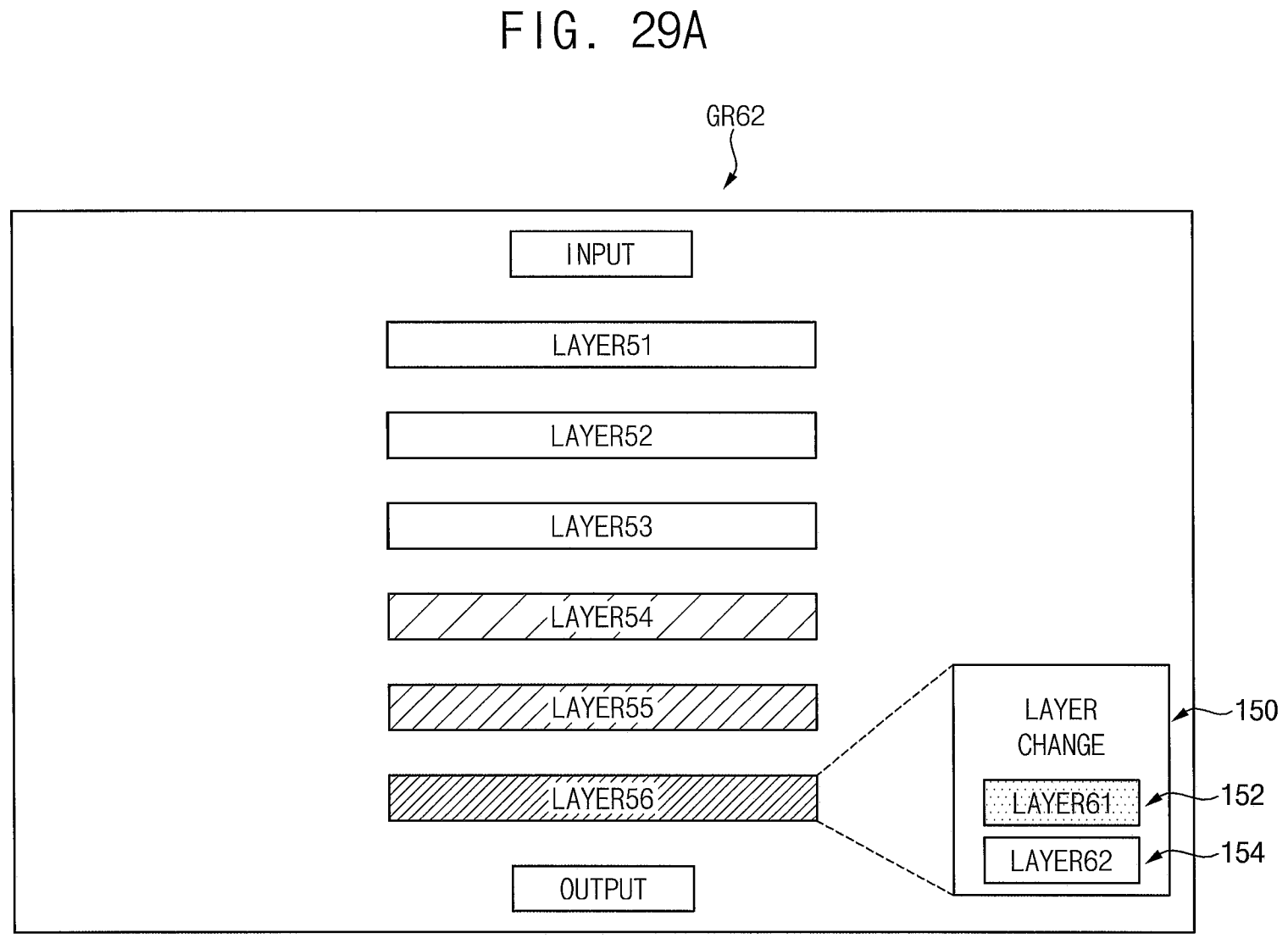
Figure 29B:
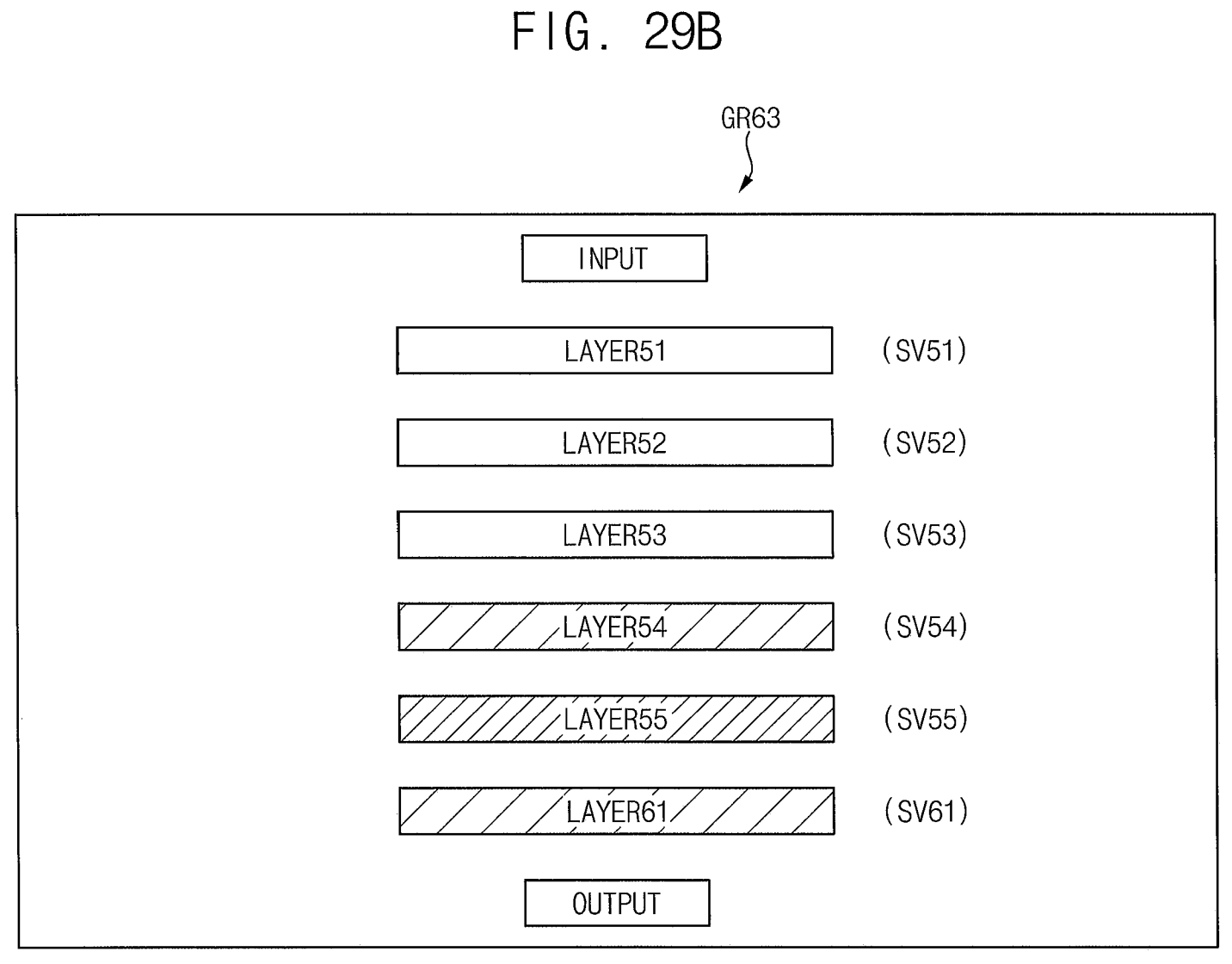

FIG. 28 is a flowchart illustrating an example of displaying a result of a scoring in FIG. 25. FIGS. 29A and 29B are diagrams for describing examples of an operation of FIG. 28. The descriptions repeated with FIGS. 8, 9A, 9B, 28, 29A and 29B will be omitted.

Referring to FIGS. 25, 28, 29A and 29B, when displaying the result of the scoring on the GUI (step S700a), steps S710, S720, and S730 in FIG. 28 may be performed. Steps S710 and S720 of FIG. 28 may be substantially the same as steps S710 and S720 in FIG. 26, respectively.

At least one of the plurality of compressed layers may be changed based on the result of the scoring (step S730).

For example, as illustrated in FIG. 29A, for a compressed layer LAYER56 having the lowest operating efficiency, a menu 150 included in a graphical representation GR62 may be provided, and a compressed layer LAYER61 may be selected from among compressed layers LAYER61 and LAYER62 by selecting one of buttons 152 and 154 included in the menu 150. The compressed layers LAYER61 and LAYER62 may be selected as candidates for replacing the compressed layer LAYER56 to improve the operation efficiency. In an example, the buttons 152 and 154 may be accompanied by an indication (e.g., text or image) that indicates how much the operation efficiency may be improved by each corresponding compression layer LAYER61 or LAYER62 and the type of improved operation efficiency. Based on the selection of the button 154, the compressed layer LAYER56 having the lowest operating efficiency may be changed to the compressed layer LAYER61 by step S730. Compared to the example of FIG. 22 in which only the setting of the compressed layer may be changed, the compressed layer itself may be changed in the example of FIG. 28.

As illustrated in FIG. 29B, a graphical representation GR63, which includes the compressed layers LAYER51 to LAYER55 and LAYER61 and corresponding score values SV51 to SV55 and SV61, may be displayed by step S730. It can be seen that intervals of the hatches in the compressed layer LAYER61 is wider than intervals of the hatches in the compressed layer LAYER56, which indicates that the operation efficiency is improved.

In some example embodiments, a layer to be modified may be selected and/or a region including layers to be modified may be selected by, e.g., dragging. In some example embodiments, more suitable layers or structures may be recommended for the selected layer or region, and one of the more suitable layers or structures may be selected from a recommendation list. In some example embodiments, a layer to be modified may be selected from a layer palette with various layers. As illustrated in FIG. 29B, a graphical representation including the result of the change may be displayed.

In the method of optimizing the neural network model according to example embodiments, the GUI may be provided to visually display the result of the compression on the neural network model and to modify the parameters by units of layers. The tool may be provided to compare and visualize the results before and after the compression on the neural network model. The tool may be provided to visualize criterions for evaluating the result of the compression. The tool may be provided to match information changed after the compression with original information. The tool may be provided to reconstruct and visualize the network graph as necessary. The tool may be provided to display a changeable layer for each target device and to suggest the change scheme. The tool may be provided to display and modify suggested improvement points and necessary information for the model design and improvement and to display the expected improvement performance in real time.

Figure 30:
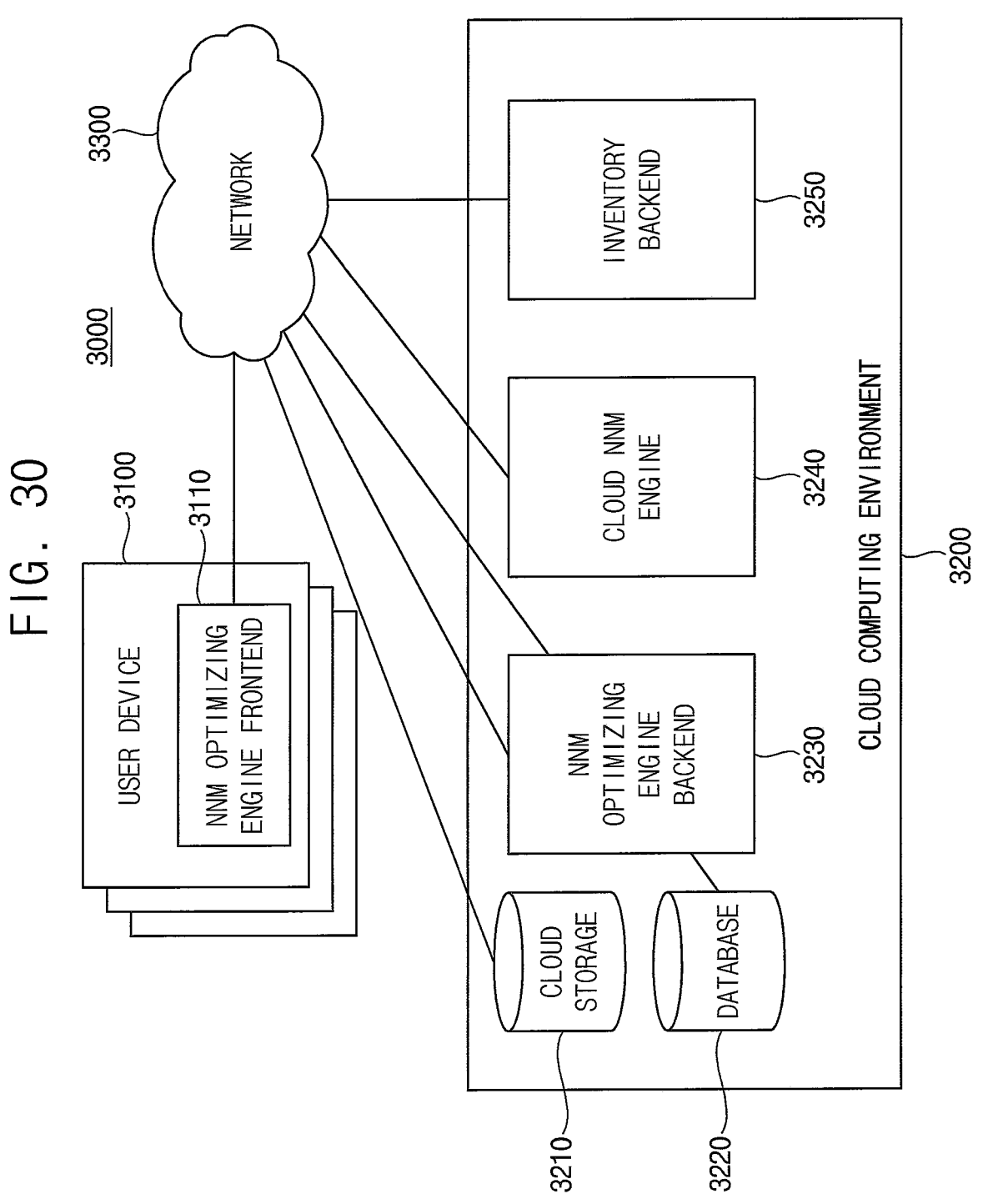
FIG. 30 is a block diagram illustrating a system that performs a method of optimizing a neural network model according to example embodiments.

FIG. 30 is a block diagram illustrating a system that performs a method of optimizing a neural network model according to example embodiments.

Referring to FIG. 30, a system 3000 may include a user device 3100, a cloud computing environment 3200 and a network 3300. The user device 3100 may include a neural network model (NNM) optimizing engine frontend 3110. The cloud computing environment 3200 may include a cloud storage 3210, a database 3220, an NNM optimizing engine backend 3230, a cloud NNM engine 3240 and an inventory backend 3250. The method of optimizing the neural network model according to example embodiments may be implemented on a cloud environment, and may be performed by the NNM optimizing engine frontend 3110 and/or the NNM optimizing engine backend 3230.

The inventive concept may be applied to various electronic devices and systems that include the deep learning, ANN and/or machine learning systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

In the method of optimizing the neural network model, the neural network model processing system, the method and the electronic system according to example embodiments, the neural network model may be optimized by performing the compression on the neural network model that is pre-trained, rather than by performing the training on the neural network model, and the GUI for optimizing the neural network model may be provided. Accordingly, the results before and after the compression on the neural network model may be easily compared by layers and/or channels (that is, on a layer-by-layer basis or channel-by-channel basis), the additionally provided information may be used for the network design and improvement; the efficient network development may be achieved using the summarized and highlighted information by the layer grouping; the network design optimized for the specific system may be achieved by modifying the model using the information associated with the target device; and the time required for the model design and improvement may be reduced using the model update guideline presented visually and the predictive results after the modification displayed based on the real-time interaction.

The foregoing is illustrative of example embodiments and is not to be construed as limiting. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims and their equivalents. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

What is claimed is:

1. A method of optimizing a neural network model, the method comprising:

receiving original model information about a first neural network model that is pre-trained, the first neural network model including a plurality of original layers;

generating a second neural network model and compressed model information about the second neural network model by performing a compression on the first neural network model, the second neural network model including a plurality of compressed layers; and outputting, on a screen, at least a part of the original model information and at least a part of the compressed model information, wherein the outputting includes:

displaying a first graphical representation on a graphical user interface (GUI), the first graphical representation including a network structure of the plurality of compressed layers and a plurality of layer boxes corresponding to the plurality of compressed layers; displaying, on the GUI that displays the first graphical representation, a first menu including indicators of two or more from a signal-to-quantization-noise power ratio (SQNR), a latency, a power consumption, and a utilization amount;

receiving, via the GUI, a first user input to select one of the indicators from the first menu, and grouping the plurality of compressed layers according to a reference value associated with the selected indicator; and displaying, based on a result of grouping, a second graphical representation on the GUI, the second graphical representation including a plurality of layer group boxes corresponding to a plurality of compressed layer groups, a compressed layer group of the plurality of compressed layer groups including two or more compressed layers that are grouped according to the reference value associated with the selected indicator, wherein the plurality of layer group boxes are representations in a reduced form in which a number of the plurality of layer group boxes is less than a number of compressed layers that are grouped into the plurality of layer group boxes, and compressed layers that are grouped are not individually represented, and based on a second user input, via the GUI, to select a reduced form of a representation of one of the plurality of layer group boxes, individual representations of two or more compressed layers grouped into a compressed layer group corresponding to the selected reduced form of the representation are displayed in an extended form, and wherein, in the second graphical representation, a compressed layer that does not satisfy a predetermined criterion of a performance for the selected indicator is not grouped into any compressed layer group and is individually represented in a layer box separate from the plurality of layer group boxes.

2. The method of claim 1, wherein the displaying comprises:

displaying, via the GUI, the at least the part of the original model information and the at least the part of the compressed model information.

3. The method of claim 1, wherein:

the outputting further includes displaying a third graphical representation on a GUI, the third graphical representation including a comparison of a first characteristic associated with the plurality of original layers and a second characteristic associated with the plurality of compressed layers.

4. The method of claim 3, wherein the first characteristic and the second characteristic are displayed by at least one of a unit of a layer or a unit of a channel.

5. The method of claim 3, wherein the outputting further includes:

receiving, through the GUI, a third user input with respect to a first compressed layer among the plurality of compressed layers, and wherein, based on the third user input, the third graphical representation is displayed such that a comparison of a characteristic of a first original layer among the plurality of original layers and a characteristic of the first compressed layer is displayed, the first original layer corresponding to the first compressed layer.

6. The method of claim 5, wherein the outputting further includes:

receiving, through the GUI, a fourth user input for selecting at least one target device to execute the plurality of compressed layers; and displaying a fifth graphical representation on the GUI based on the fourth user input, the fifth graphical representation indicating whether the plurality of compressed layers are suitable for the selected at least one target device.

7. The method of claim 6, wherein the at least one target device includes at least one of a central processing unit (CPU), a neural processing unit (NPU), a graphic processing unit (GPU), a digital signal processor (DSP), or an image signal processor (ISP).

8. The method of claim 3, further comprising:

changing a setting of at least one compressed layer of the plurality of compressed layers, and outputting a result of the changing the setting.

9. The method of claim 8, further comprising:

receiving, through the GUI, a fifth user input for changing the setting of the at least one compressed layer of the plurality of compressed layers; and updating the second characteristic based on the fifth user input, wherein the outputting the result of the changing the setting includes displaying a sixth graphical representation on the GUI, the sixth graphical representation including a comparison of the first characteristic and the updated second characteristic.

10. The method of claim 3, further comprising:

scoring the plurality of compressed layers for an operating efficiency, and outputting a result of the scoring.

11. The method of claim 10, wherein the outputting the result of the scoring includes:

generating a plurality of score values for the plurality of compressed layers; and displaying, on the GUI, a seventh graphical representation, in which the plurality of compressed layers are displayed according to different schemes based on the plurality of score values.

12. The method of claim 11, wherein:

the seventh graphical representation includes a plurality of layer boxes corresponding to the plurality of compressed layers, a third layer box that corresponds to a compressed layer having a score value greater than a reference score value is displayed according to a third scheme, and a fourth layer box that corresponds to a compressed layer having a score value less than or equal to the reference score value is displayed according to a fourth scheme different from the third scheme.

13. The method of claim 11, wherein the scoring includes scoring the plurality of score values based on at least one of a result of estimating a compression performance of the plurality of compressed layers, a result of determining whether the plurality of compressed layers are suitable for a target device, types of the plurality of compressed layers, a result of predicting capacity of the plurality of compressed layers, or a memory footprint utilization of the plurality of compressed layers.

14. The method of claim 10, further comprising:

changing at least one of the plurality of compressed layers based on the result of the scoring.

15. The method of claim 1, wherein the first menu includes indicators of the SQNR, the latency, the power consumption, and the utilization amount.

16. The method of claim 1, wherein the first menu further includes selections for changing predetermined reference values respectively associated with the two or more indicators included in the first menu, wherein the method comprises receiving, via the GUI, a user input to change a predetermined reference value of the selected indicator, and wherein the displaying the plurality of layer boxes of the first graphical representation on the GUI is performed based on the changed predetermined reference value of the selected indicator.

17. The method of claim 1, wherein the outputting further includes:

displaying, on the GUI that displays the first graphical representation, a second menu including a second menu including indicators of two or more from a signal-to-quantization-noise power ratio (SQNR), a latency, a power consumption, and a utilization amount; and receiving, via the GUI, a user input to select one of the two or more indicators from the second menu, and based on the selected indicator, and displaying a third graphical representation that includes the plurality of layer boxes in a manner such that a first layer box that corresponds to a compressed layer satisfying a predetermined reference value of the selected indicator is displayed according to a first scheme, and a second layer box that corresponds to a compressed layer not satisfying the predetermined reference value of the selected indicator is displayed according to a second scheme different from the first scheme.

18. A method of optimizing a neural network model, the method comprising:

receiving original model information about a first neural network model that is pre-trained and includes a plurality of original layers;

generating a second neural network model and compressed model information about the second neural network model by performing a compression on the first neural network model, the second neural network model including a plurality of compressed layers;

displaying a first graphical representation on a graphical user interface (GUI), the first graphical representation including a network structure of the plurality of compressed layers;

receiving, through the GUI, a first user input with respect to a first compressed layer among the plurality of compressed layers;

displaying a second graphical representation on the GUI based on the first user input, the second graphical representation including a comparison of a characteristic of a first original layer among the plurality of original layers and a characteristic of the first compressed layer, the first original layer corresponding to the first compressed layer;

receiving, through the GUI, a second user input for changing a setting of a second compressed layer among the plurality of compressed layers;

updating a characteristic of the second compressed layer based on the second user input;

displaying a third graphical representation on the GUI based on the second user input, the third graphical representation including a comparison of a characteristic of a second original layer among the plurality of original layers and the updated characteristic of the second compressed layer, the second original layer corresponding to the second compressed layer;

generating a plurality of score values for the plurality of compressed layers;

displaying a fourth graphical representation on the GUI, the fourth graphical representation including the plurality of compressed layers that are displayed according to different schemes based on the plurality of score values; and displaying a fifth graphical representation on the GUI, the fifth graphical representation including the plurality of compressed layers at least one of which is changeable based on the plurality of score values, wherein the first graphical representation includes a plurality of layer boxes corresponding to the plurality of compressed layers, and wherein the displaying the first graphical representation includes:

displaying, on the GUI that displays the first graphical representation, a first menu including indicators of two or more from a signal-to-quantization-noise power ratio (SQNR), a latency, a power consumption, and a utilization amount; and receiving, via the GUI, a third user input to select one of the indicators from the first menu, and grouping the plurality of compressed layers according to a reference value associated with the selected indicator, wherein the method further comprises:

displaying, based on a result of grouping, a sixth graphical representation on the GUI, the sixth graphical representation including a plurality of layer group boxes corresponding to a plurality of compressed layer groups, a compressed layer group of the plurality of compressed layer groups including two or more compressed layers that are grouped according to the reference value associated with the selected indicator, wherein the plurality of layer group boxes are representations in a reduced form in which a number of the plurality of layer group boxes is less than a number of compressed layers that are grouped into the plurality of layer group boxes, and compressed layers that are grouped are not individually represented, and based on a second user input, via the GUI, to select a reduced form of a representation of one of the plurality of layer group boxes, individual representations of two or more compressed layers grouped into a compressed layer group corresponding to the selected reduced form of the representation are displayed in an extended form, and wherein, in the sixth graphical representation, a compressed layer that does not satisfy a predetermined criterion of a performance for the selected indicator is not grouped into any compressed layer group and is individually represented in a layer box separate from the plurality of layer group boxes.

19. A method of providing a graphical user interface (GUI) related to optimizing a neural network model, the method comprising:

receiving first model information about a first neural network model that is pre-trained, the first neural network model including a plurality of original layers;

generating a second neural network model and second model information about the second neural network model by performing a data processing on the first neural network model, the second neural network model including a plurality of compressed layers; and providing a graphical user interface (GUI), which displays a graphical representation including at least a part of the first model information and at least a part of the second model information in comparison with each other, wherein the providing the GUI includes:

displaying a first graphical representation on the GUI, the first graphical representation including a network structure of the plurality of compressed layers and a plurality of layer boxes corresponding to the plurality of compressed layers;

displaying, on the GUI that displays the first graphical representation, a first menu including indicators of two or more from a signal-to-quantization-noise power ratio (SQNR), a latency, a power consumption, and a utilization amount;

receiving, via the GUI, a first user input to select one of the indicators from the first menu, and grouping the plurality of compressed layers according to a reference value associated with the selected indicator; and displaying, based on a result of grouping, a second graphical representation on the GUI, the second graphical representation including a plurality of layer group boxes corresponding to a plurality of compressed layer groups, a compressed layer group of the plurality of compressed layer groups including two or more compressed layers that are grouped according to the reference value associated with the selected indicator, wherein the plurality of layer group boxes are representations in a reduced form in which a number of the plurality of layer group boxes is less than a number of compressed layers that are grouped into the plurality of layer group boxes, and compressed layers that are grouped are not individually represented, and based on a second user input, via the GUI, to select a reduced form of a representation of one of the plurality of layer group boxes, individual representations of two or more compressed layers grouped into a compressed layer group corresponding to the selected reduced form of the representation are displayed in an extended form, and wherein, in the second graphical representation, a compressed layer that does not satisfy a predetermined criterion of a performance for the selected indicator is not grouped into any compressed layer group and is individually represented in a layer box separate from the plurality of layer group boxes.

\* \* \* \* \*